United States Patent
Kalmanek, Jr. et al.

(10) Patent No.: US 7,151,772 B1
(45) Date of Patent: Dec. 19, 2006

(54) METHOD FOR PERFORMING LAWFULLY-AUTHORIZED ELECTRONIC SURVEILLANCE

(75) Inventors: Charles Robert Kalmanek, Jr., Short Hills, NJ (US); William Todd Marshall, Chatham, NJ (US); Partho Pratim Mishra, Millbrae, CA (US); Douglas M Nortz, Red Bank, NJ (US); Kadangode K. Ramakrishnan, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/469,792

(22) Filed: Dec. 22, 1999

Related U.S. Application Data

(63) Continuation-in-part of application No. 08/746,364, filed on Nov. 8, 1996, now abandoned.

(51) Int. Cl.
*H04L 12/28* (2006.01)
*H04L 12/56* (2006.01)

(52) U.S. Cl. ...................................... 370/390; 370/432

(58) Field of Classification Search ................ 370/390, 370/389, 391, 392, 351, 352, 522, 524, 432; 379/114.22, 114.01, 114.21, 114.23, 120, 379/126, 127.01, 127.05, 386, 448, 372, 379/207.02, 257, 229, 230
See application file for complete search history.

(56) References Cited

U.S. PATENT DOCUMENTS

| | | | |
|---|---|---|---|
| 5,610,905 A * | 3/1997 | Murthy et al. ............... | 370/401 |
| 5,710,971 A * | 1/1998 | Armbruster et al. ........ | 455/12.1 |
| 6,078,648 A * | 6/2000 | Albers et al. .................. | 379/35 |
| 6,229,887 B1 * | 5/2001 | Albers et al. ................ | 379/219 |
| 6,614,781 B1 * | 9/2003 | Elliott et al. ................. | 370/352 |
| 6,757,290 B1 * | 6/2004 | Kalmanek et al. .......... | 370/401 |

OTHER PUBLICATIONS

Federal Communications Commission, FCC News, "FCC Adopts CALEA Technical Standards", Nov. 16, 1999, pp. I-3.
Eric Baer, Federal Communication Commission, FCC 99-229, Aug. 31, 1999, pp. 1-37.
Eric Baer, Federal Communication Commission, FCC 99-230, Aug. 31, 1999, pp. 1-71.

* cited by examiner

*Primary Examiner*—Ajit Patel

(57) ABSTRACT

Lawfully-authorized electronic surveillance is performed. A call associated with a first party to be surveilled is verified, on a per-call basis. Packets associated with the call are multicast to a second party and to a surveillance receiver.

10 Claims, 33 Drawing Sheets

METHOD FOR PERFORMING LAWFULLY-AUTHORIZED ELECTRONIC SURVEILLANCE

CROSS-REFERENCE TO RELATED APPLICATIONS

This application is a continuation-in-part and claims the benefit of priority of the following commonly assigned patent application filed on Nov. 8, 1996, now abandoned which is incorporated herein: U.S. Ser. No. 08/746,364 entitled "Promiscuous Network Monitoring Utilizing Multicasting within a Switch".

This application is related to and claims the benefit of priority of the following pending, commonly assigned patent applications filed on Aug. 4, 1999, all of which are incorporated herein by reference: U.S. Ser. No. 09/366,676 entitled "A Method for Exchanging Signaling Messages in Two Phases"; U.S. Ser. No. 09/366,207 entitled "A Method for Allocating Network Resources"; U.S. Ser. No. 09/366,208 entitled "A Method for Performing Gate Coordination on a Per-Call Basis"; U.S. Ser. No. 09/366,210 entitled "A Method for Establishing Call State Information without Maintaining State Information at Gate Controllers"; and U.S. Ser. No. 09/366,678 entitled "A Method for Providing Privacy by Network Address Translation".

This application is also related to the following commonly assigned patent applications filed on the same day, all of which are incorporated herein by reference: "A Method for Simulating a Destination Ring Back" Ser. No. 09/468,902; "A Method for Call Forwarding without Hairpinning and with Split Billing", Ser. No. 09/469,221: and "A Method for Performing Segmented Resource Reservation" Ser. No. 09/469,791.

BACKGROUND OF THE INVENTION

The present invention generally relates to electronic surveillance within a telecommunication network. More specifically, the present invention relates to lawfully-authorized electronic surveillance within a telecommunication network.

Law enforcement personnel often require the electronic surveillance of telephone calls involving a particular individual, including when that individual is the calling party and when that individual is the called party. This electronic surveillance is traditionally referred to in the law enforcement community as a "wire tap".

A telecommunication service provider can be required to provide various types of information for various types of calls when performing lawfully-authorized electronic surveillance. The particular information related to the surveilled call that is provided to the law enforcement authorities is typically specified by such legislation as the Communications Assistance for Law Enforcement Act of 1994 (CALEA). Generally speaking, upon request from a law enforcement authority, a telecommunication service provider needs to provide call-identifying information and call content to the law enforcement authority for calls related to a particular subscriber. Call-identifying information includes, for example, dialing or signaling information that identifies the origin, direction, destination or termination of each communication. Note that the call content can include voice associated with the call (e.g., the content on the bearer channel), but not call content associated with data (e.g., data files or graphics). The type of calls to be electronically surveilled can include, for example, a typical two-party call and a multiple-party call such as a conference call.

Satisfying the requirements for lawfully-authorized electronic surveillance becomes increasingly more difficult as telecommunication networks use increasingly more complicated technologies. Such increasingly complicated technologies include, for example, packet-switching to transport voice and/or data, and various protocols that allow for varied quality-of-service based on the particular level of service to which a subscriber subscribes.

When these more complicated technologies are used by a telecommunication service provider, problems arise relating to, for example, distinguishing between packets associated with the bearer channel (which can be lawfully surveilled under CALEA) and packets associated with other types of information, such as non-voice data content being transmitted (which cannot be lawfully surveilled under CALEA).

Similarly, telecommunication services that provide varied quality-of-service are typically based on packet-switched technologies. In a telecommunication system having at least one network using packet-switch technologies, links can be point to point without having a single place within that packet-switched network through which all packets associated with a surveilled party can electronically surveilled. In other words, a surveilled party can use a telecommunication device at an untrusted location (i.e., not under the service provider's control) yet be connected to a trusted network (i.e., under the service provider's control) that uses packet-switched technology. Consequently, performing lawfully-authorized electronic surveillance within the trusted network that uses packet-switched technology is problematic because no single point exists within that trusted network through which all packets pass.

SUMMARY OF THE INVENTION

Lawfully-authorized electronic surveillance is performed. A call associated with a first party to be surveilled is verified, on a per-call basis. Packets associated with the call are multicast to a second party and to a surveillance receiver.

DETAILED DESCRIPTION

Figure 1:
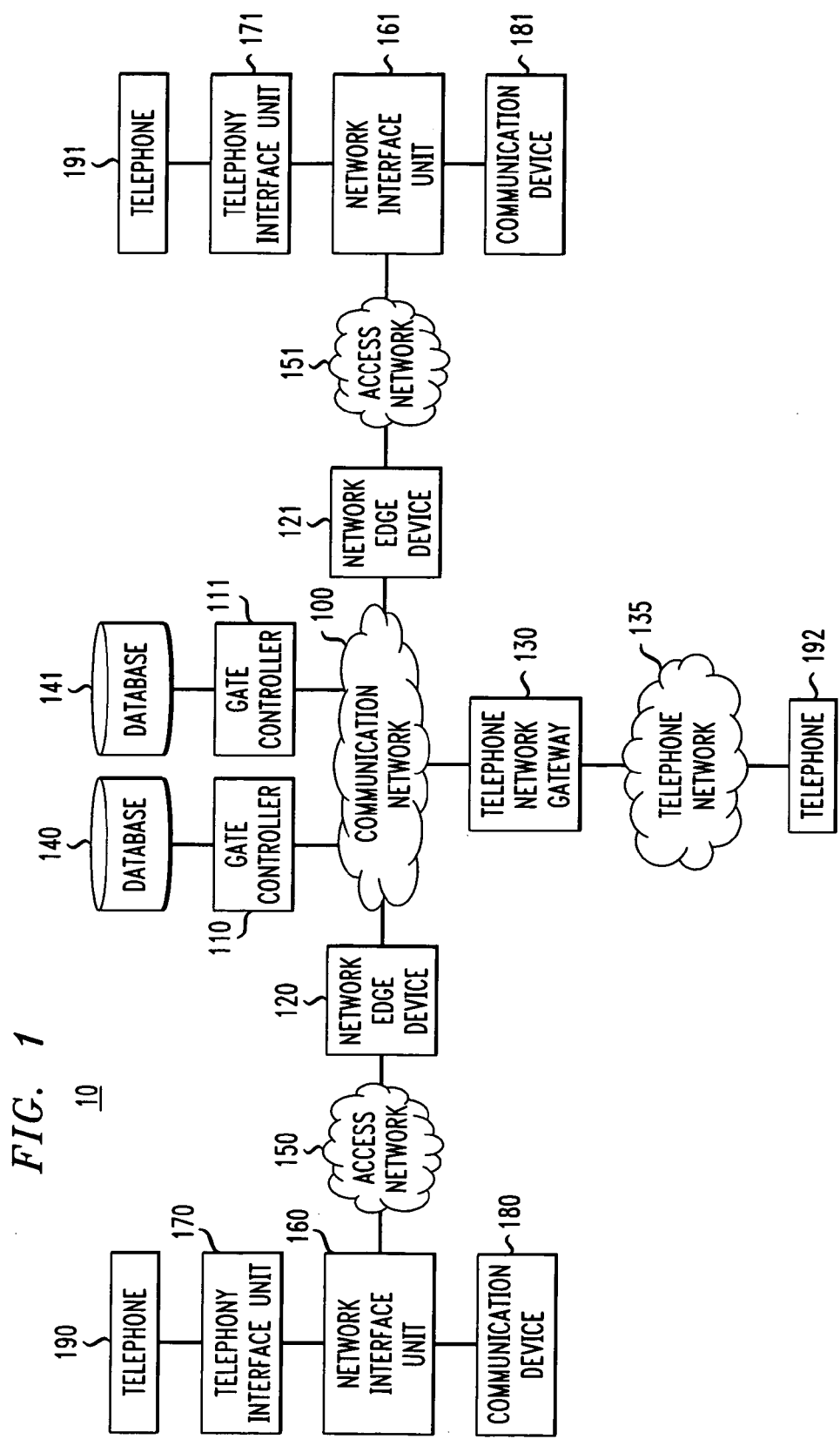
FIG. 1 illustrates a network, according to an embodiment of the present invention.

Embodiments of the present invention relate to a communications system having a combination of different types of networks, such as a data network(s) (based on, for example, packet switching), a telephone network(s) (such as the Plain Old Telephone Network (PSTN)), and/or a cable network(s). Such a communications system can include intelligent end-terminals that allow a service provider to provide various types of services involving the different types of networks and to exploit the capabilities of the end-terminals. For example, packet telephony can be implemented in embodiments of the present invention where voice can be received and transmitted by a telephone or a communication device (such as a personal computer) connected to the data network via a cable network.

Embodiments of the present invention relate to call authorization, call signaling, network resource management and end-to-end signaling between communication devices (e.g., telephones, personal computers, etc.). Existing telephone services with a service quality consistent with current standards can be supported while a broader range of packet-enabled communications services can also be supported. Embodiments of the present invention allow pricing and billing of communications services to differ based on the differences in service quality (e.g., bandwidth, delay and/or latency) for the various calls.

Embodiments of the present invention also allow the intelligent end-points to participate in supporting features of the provided services. These intelligent end-points can be, for example, telephony-capable computers and gateways that interface conventional telephones to the data network. By exploiting the intelligence of these end-points in supporting the features of provided services, functionality (e.g., tasks associated with signaling) historically maintained solely by the network can be efficiently divided among the communication network entities and the intelligent end-points connected to the communication network.

In addition, embodiments of the present invention protect against theft of service, and minimize the cost and complexity associated with providing reliable service. Unlike known telephone networks, embodiments of the present invention do not require high-availability network servers that maintain the state of each individual call. Rather, embodiments of the present invention can maintain state information only in the edge routers and the end-points that are directly involved in a particular call.

The following discussion is separated into sections for clarity. First, a system overview of a communication network, according to an embodiment of the present invention, is discussed in Section 1 entitled "System Overview". Then, separate aspects of embodiments of the present invention are considered: Section 2 entitled "Two-Phase Resource Reservation", Section 3 entitled "Two-Phase Signaling", Section 4 "Gate Coordination on a Per-Call Basis", Section 5 entitled "Network Address Translation", Section 6 entitled "Simulating Destination Ring Back", Section 7 entitled "Call Forwarding", Section 8 entitled "Lawfully-Authorized Electronic Surveillance" and Section 9 entitled "Segmented Resource Reservation". Finally, Section 10 entitled "Protocol Description" details the protocols for the signaling messages and Section 11 entitled "Signaling Architecture Call Flows" describes the call flows for the signaling architecture both of which are applicable to the various aspects of embodiments of the present invention.

1. System Overview

FIG. 1 illustrates a network according to an embodiment of the present invention. Network 10 includes communication network 100 which is connected to gate controller 110 and gate controller 111, network edge devices 120 and 121, and telephone network gateway 130. Gate controllers 110 and 111 are connected to database storage 140 and 141, respectively. Network edge devices 120 and 121 are connected to access networks 150 and 151, respectively. Access networks 150 and 151 are connected to network interface units 160 and 161, respectively. Network interface units 160 and 161 are connected to telephone interface units (TIUs) 170 and 171, respectively, and communication devices 180 and 181, respectively. TIUs 170 and 171 are connected to telephones 190 and 191, respectively. Telephone network gateway 130 is connected to telephone network 135 which, in turn, is connected to telephone 192.

Communication network 100 can be a network that supports, for example, Internet Protocol (IP) signaling, IP media transport, and/or asynchronous transfer mode (ATM) media transport. Access networks 150 and 151 can be networks of wires or fibers capable of carrying voice and/or data transmissions. The telephone network 135 can be, for example, the Plain Old Telephone System (PSTN).

Network interface units 160 and 161 can be, for example, cable modems designed for use on a television coaxial cable circuit. Network interface units 160 and 161 allow communication devices 180 and 181, respectively, to connect to access networks 150 and 151, respectively. Network interface units 160 and 161 also allow TIUs 170 and 171, respectively (and in turn telephones 190 and 191, respectively), to connect to access networks 150 and 151, respectively.

Network edge devices (NEDs) 120 and 121 are devices located at the edge of the communication network 100 that connects the communication network 100 to the access networks 150 and 151, respectively. The network edge devices can be, for example, routers or bridges or similar equipment that can connect communication network 100 to access networks 150 and 151. Because NEDs 120 and 121 can be specifically implemented as, for example, routers at the network edge, these units are also referred to herein as edge routers (ERs).

Network edge devices 120 and 121 can implement resource management and admission control mechanisms that allow the communication network 100 to provide assurances of bounded per-packet loss and delay required to assure an authorized quality of service for a call. In other words, network edge devices (e.g., network edge devices 120 or 121) can obtain authorization from an associated gate controller (e.g., gate controller 110 or 111, respectively) on a call-by-call basis before providing access to, for example, enhanced quality of service across the communication network. Said another way, the network edge devices can ensure that enhanced quality of service for a call of a particular party has been authorized and for which usage accounting is being done. Network edge devices can generate accounting records for calls because these devices track the resource usage within the communication network 100 for the calls. Network edge devices can also implement Network Address Translation to support address privacy for called parties and/or calling parties, as described more fully below.

TIUs 170 and 171 are gateways between telephones and packet-carrying networks, such as access networks 150 and 151 and communication network 100. TIUs 170 and 171 can digitize, compress and packetize voice signals from telephone 190 and 191, respectively, to convert analog voice into data packets for transport over the communication network 100, and vice versa. TIUs 170 and 171 can be, for example, a simple stand-alone telephony device that incorporates the broadband interface, a high-speed data cable modem that incorporates the interface unit (i.e., TIUs and their associated network interface units can be combined into a single device), or an advanced digital set-top box that incorporates the broadband interface. TIUs 170 and 171 can be for example broadband interfaces for telephones; consequently, these units are also referred to herein as broadband telephony interfaces (BTIs).

TIUs contain sufficient processing and memory to perform signaling and call control functions. More specifically, TIUs 170 and 171 each include a processor and is capable of detecting changes in state information (e.g., hook state detection), collecting dialed digits (e.g., dual-tone multifrequency (DTMF) signals), and participating in the implementation of telephone features for telephones 190 and 191, respectively. TIUs 170 and 171 can also participate in end-to-end capability negotiation as described below.

Note that the term "end-to-end" refers the association between two end points for a call. For example, where a call involves a calling party and a called party using telephones, the end-to-end association for the call can be between the two telephony interface units. Thus, end-to-end messages for example would include messages originating at one telephone interface unit and terminating at the other telephony interface unit where the messages are opaque to other network entities that merely forward the messages (possibly after performing network address translation as described below). For example, end-to-end messages can be routed between telephone interface units with messages being forwarded by the network edge devices and without the message being routed through the gate controllers. Alternatively, for example, where a call involves a calling party using a telephone and a called party using a communication device (such as a personal computer), the end-to-end association for the call can be between the calling party telephony interface unit and the called party network interface unit.

TIUs can maintain information for calls while in progress, thereby implementing certain service features locally. For example, call waiting can be implemented locally, by detecting hook flash and controlling the active call. Similarly, return call can be implemented locally by retaining state information in the TIUs about the most recent calls.

Note that TIUs 170 and 171 are considered to be "untrusted" devices in the sense that the TIUs can operate locally-stored software and are not necessarily under the direct control of the service provider (e.g., the entity operating the communication network 100). Because the TIUs are untrusted devices, information passed to the TIUs can be first encrypted before it is given to the TIUs to guarantee privacy. For example, state information can be passed from the gate controllers 110 and/or 111 to the TIUs which store the state information for their later use (thereby avoiding the need to maintain state information for a call at the gate controllers) by first encrypting the state information; the state information retrieved from the TIUs can be verified subsequently via known encryption techniques.

In addition to encrypting the state information for the TIUs to maintain, a cryptographic hash function can be applied to the state information to detect the integrity of the state information (i.e., detect whether the state information has been altered by an untrusted entity). By applying a cryptographic hash value to the state information, a hash value is produced which can be sent to and maintained by the TIUs. As a result, when the state information is retrieved from a TIU, the cryptographic hash function can be applied to this retrieved state information; if the same hash value is produced, then the retrieved state information has not been altered at, for example, the TIU. The cryptographic hash functions can be, for example, a modification detect codes (MDCs) or message authentication codes (MACs).

Gate controllers 110 and 111 are adjunct platforms that have access to authentication databases and customer profile information on database storage 140 and 141, respectively. Gate controllers 110 and 111 implement a set of service-specific control functions to support communication services, such as authentication and authorization, number translation and call routing, service-specific admission control, and signaling and service feature support.

The gate controllers can authenticate signaling messages and authorize requests for service so that communication services and certain service features are only provided to authorized subscribers. In other words, upon receiving a setup request message from a calling party, the gate controller can authenticate the identity of the calling party and authorize the service sought by the calling party.

The gate controllers can translate dialed telephone numbers to communication network addresses (such as, for example, IP addresses) based on call routing logic. For example, an originating gate controller (e.g., gate controller 110) can translate a dialed telephone number to a communication network address associated with the terminating gate controller (e.g., gate controller 111). The terminating gate controller can subsequently translate the communication network address to the terminating end-point (e.g., BTI 171) to which the call should be routed. In an alternative embodiment, a single dial telephone number can be mapped to multiple communication network addresses, for example, to allow the signaling and media end-points associated with a call to be distinct.

The gate controllers can implement a broad range of service-specific admission control policies for the communication services. For example, the gate controllers can provide precedence for particular call (e.g., 911 emergency calls). The gate controllers can perform admission control to implement overload control mechanisms similar to those used in the convention telephone network (e.g., telephone network 135), for example, to restrict the number of calls to a particular location or to restrict the frequency of call setup to avoid signaling overload. These mechanisms can be invoked either dynamically or under administrative control.

The gate controllers can perform signaling and service feature support where the service features cannot be supported solely by the TIUs. For example, certain service features such as call transfer require changing the end-points participating the calls; in such a case, the gate controllers change the gate parameters because call transfer requires reauthorization by the gate controllers. Service features that depend on the privacy of the calling information, such as caller-ID blocking, are implemented by the gate controllers. In addition, service features that require users to receive a consistent view of feature operation even when a TIU is inoperative are implemented by the gate controllers. For example, the gate controllers can control call forwarding when a TIU for a call is inoperative.

Gate controllers can be organized in domains where each gate controller is associated with a set of TIUs and the network edge devices that serve those TIUs. Although the TIUs are not trusted entities, a trust relationship exists between an network edge device and its associated gate controller because the gate controller acts as a policy server controlling when the network edge device can provide enhanced quality of service. A trust relationship can also exist between gate controllers.

A gate controller can act as a simple transaction server so that a failure of a gate controller does not affect associated calls that are in process. In one embodiment, a gate controller domain can include a primary and a secondary gate controller. If the primary gate controller fails, only calls in a transient state are affected (i.e., calls that are being established including, for example, where network resources are being allocated). The TIUs associated with those affected calls in a transient state will try to be established on the secondary gate controller after a time-out period has elapsed. All active calls (i.e., calls in progress) are unaffected by the failure of a primary gate controller because the gate controller does not retain state information for these stable, active calls. As a result, gate controllers easily and efficiently scale as more gate controllers for the communication network are required.

Telephone network gateway 130 can include a combination of a trunking gateway (not shown) and a signaling, gateway (not shown). The trunking gateway can convert between a data format used on the data network 100 and the pulse code modulation (PCM) format typically used for transmission over the telephone network 135. The signaling gateway can provide signaling internetworking between signaling protocols of embodiments of present invention described below and conventional telephony signaling protocols such as ISUP/SS7 (i.e., Integrated Services Digital Network User Part/Signaling System 7). In an alternative embodiment, a media gateway control protocol can be used to control the operation of a media gateway separate from a signaling gateway.

Although not shown in FIG. 1, additional network entities (not shown) can be included in the network 10. For example, the gate controllers can use other servers to implement the authorization or the translation functions. Similarly, three way calling can be supported using audio bridges in the network 10.

Note that although a limited number of network entities are shown in FIG. 1 for simplicity of presentation, other network entities can be included in network 10. For example, although only a sole network interface unit (e.g., a cable modem) is shown connected to a sole network interface unit, multiple network interface units are likely connected to each access network. Similarly, although only a few network edge devices, a few gate controllers and a sole telephone network gateway are shown connected to the communication network 100, many such devices can be connected to the communication network 100. Many other variations to the network 10 shown in FIG. 1 are possible.

2. Two-Phase Network Resource Reservation

In embodiments of the present invention, network resources for a call between a calling party and a called party are allocated. The network resources for the call are reserved based on a reservation request. The network resources are reserved before any one network resource from the reserved network resources is committed. The reserved network resources for the call are committed when a called party indicates acceptance for the call.

The term "network resources" is used herein as the facilities of a communications network required for a call and any auxiliary services associated with that call. Network resources can include, for example, the capabilities or capacities of equipment within the communications network needed to establish and maintain a call at an appropriate quality of service. The equipment within the communications network can include, for example, routers, bridges and gateways within the communications network.

The called party "indicates acceptance" for the call in a number of ways. For example, where the called party is using a telephone 190, the called party can indicate acceptance for the call by picking up the telephone hand set thereby causing an off-hook condition. Where the called party is using a communication device 181 (e.g., a personal computer), the called party can indicate acceptance by making an appropriate selection with the communication device 181 that initiates handshake signaling (i.e., a personal computer equivalent for an off-hook condition). Where the called party has an answering machine, the answering machine timer can expire to connect the call.

Network resources are "reserved" in the sense that the network resources required for a particular call can be identified before the called party is actually connected to the calling party. These network resources can be reserved through the appropriate signal messages collectively referred to herein as a "reservation request". After the appropriate network resources have been reserved based on the reservation request, these network resources are committed when the called party indicates acceptance for the call. By committing the network resources only when the called party indicates acceptance for the call, the accounting for the call can, for example, accurately track the time of the actual call while excluding the time of the call setup.

Network resources are "committed" in the sense that an available network resource operates such that the voice information between the calling party and the called party is transported. Before the network resources are committed, the network resources are allocated for the call but are not configured to actually carry the voice information for the call. By committing the reserved network resources once the called party indicates acceptance for the call, the network resources are not wastefully configured before they are actually needed. This can be particularly relevant for portions of the communication network where resources are limited, such as, for example, the upstream resources within the cable network.

The term "quality of service" is used herein to include, but not limited to, the measure of telecommunication service quality provided during a call. The quality of service can be specified by a calling party, a called party or the service provider of the communications network, or any combination thereof. In other words, the quality of service is "authorized" in the sense that the calling party and/or the called party specify a quality of service for the call and the service provider can verify the specified quality of service for the call. For example, a calling party transferring data (e.g., rather than transferring solely voice) may subscribe for a service with a quality of service having a large bandwidth and small latency; in such an example, a service provider can verify the service subscription for the particular quality of service associated with the call for that particular calling party.

Figure 2:
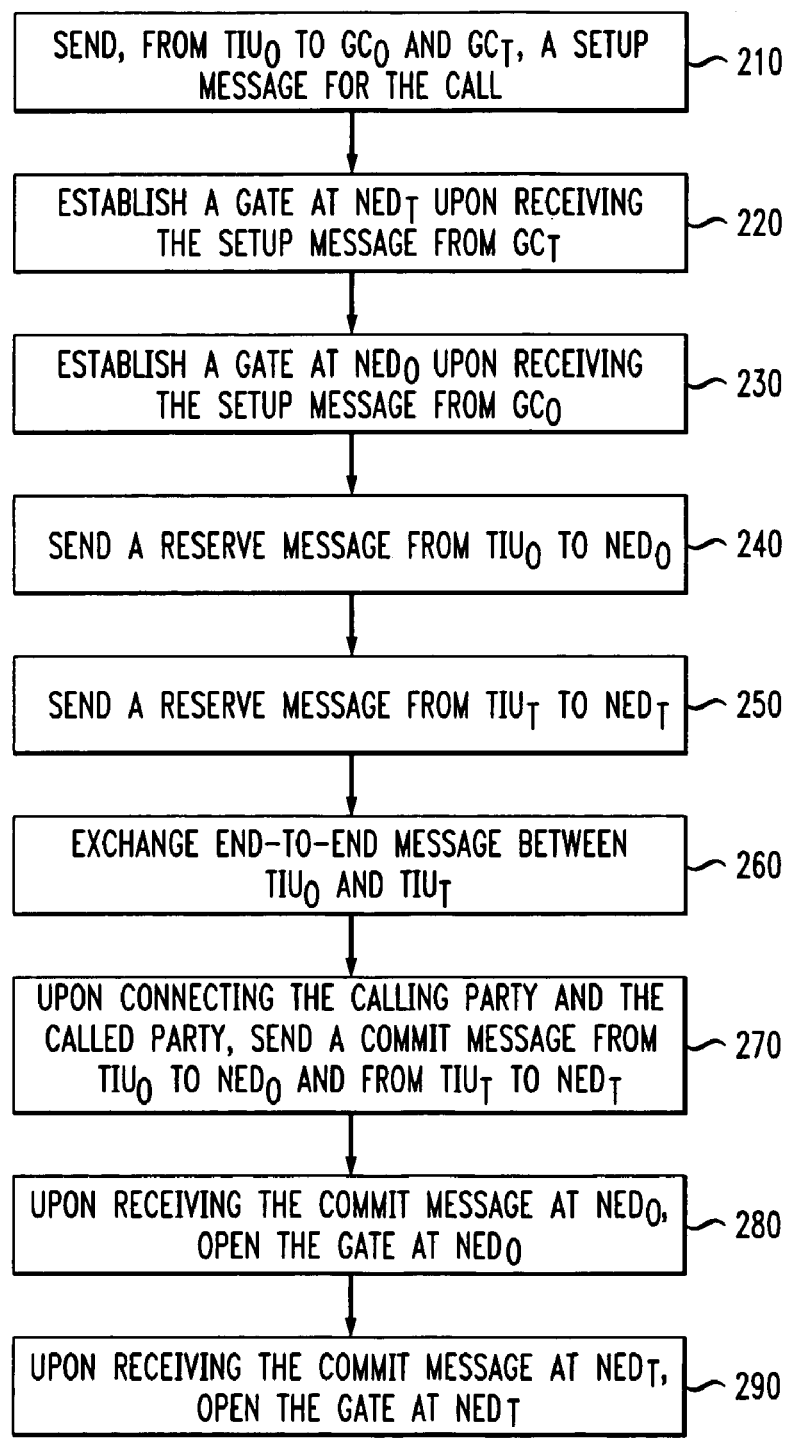
FIG. 2 illustrates a flow chart to reserve network resources for a call, according to an embodiment of the present invention.

FIG. 2 illustrates a flow chart to reserve network resources for a call, according to an embodiment of the present invention. FIG. 2 is a simplified view of the connection process to better illustrate the two-phase allocation of network resources. This process is in two phases in the sense that network resources are first reserved and then committed in separate and distinct phases. In other words, network resources are reserved first; once the reservation process is complete, then the reserved network resources can be committed. Other aspects of the overall process will be described in further detail in other sections below.

Note that components of the communications networks shown in FIG. 1 are referred to in FIG. 2 for convenience with the shorthand notation: originating TIU 170 ($TIU_O$), originating network edge device 120 ($NED_O$), originating gate controller 110 ($GC_O$), terminating gate controller 111 ($GC_T$), terminating network edge device 121 ($NED_T$), and terminating TIU 171 ($TIU_T$).

At step 210, a setup message for a call between a calling party and a called party is sent from the originating TIU 170 to the originating gate controller 110 and the terminating gate controller 111. For example, upon receiving the setup message at the originating gate controller 110, the setup message (possibly modified with additional information) can be forwarded to the terminating gate controller 111 through communication network 100. In one embodiment, the setup message can be, for example, in the form of the SETUP message described below in Section 10 entitled "Protocol Description".

At step 220, a gate for the call is established at the terminating network edge device 121 upon receiving the setup message from terminating gate controller 111. A "gate" is a call-admission control mechanism that uses, for example, known packet filters at the edge routers. At step 230, another gate for the call is established at the originating network edge device 120. In one embodiment, the gates can have associated time limits on the gate duration; such a features can allow the calls to be limited where, for example, the calls are established with a pre-paid calling card that has a limited amount of calling time that is pre-paid.

Note that by establishing the gates at the originating and terminating network edge devices rather than at the corresponding gate controllers, the state information for the call is maintained at a network entity through which the call is routed. In other words, state information for a call can be maintained without maintaining the state information at a gate controller. Consequently, if a gate controller fails after the gates have been established for a call, the call can be maintained. The establishment of gates for a call are discussed more fully below in the Section 4 entitled "Gate Coordination on a Per-Call Basis".

At step 240, a reserve message is sent from the originating TIU 170 to the originating NED 120. At step 250, a reserve message is sent from the terminating TIU 171 to the terminating NED 121. The reserve messages sent by the originating TIU 170 and terminating TIU 171 are a part of the reservation process where an allocation of network resources is requested but the network resource need not yet be assigned or committed. Allocating the network resources includes the verifying that the quality of service desired by a TIU is no greater than the quality of service authorized by the corresponding gate controller; the gate controller authorizes a quality of service for a call using the authentication databases and customer profile information on the associated database storage (e.g., database storage 140 and 141).

To provide telephone-grade service over network 10, the network 10 can provide bounded per-packet loss and delay for the voice packets of a call by performing active resource management both in the access network 150 and 151, and communication network 100. Because the network edge devices (e.g., NEDs 120 and 121) within the connection path for a call may have capacity constrained links, reservation requests for a call (and any associated messages) are forwarded end to end, thereby ensuring that network resources are available end to end. In one embodiment, because the access networks 150 and 151 may be capacity constrained (at least in the upstream direction), resource management is performed on a per-call basis for the access networks 150 and 151.

Resource management in the communication network 100, however, can be performed on a per-call basis or on a coarse-grained resource basis (i.e., resources within the communication network 100 can be reserved for multiple calls at a given time). Resource management within portions of the communication network 100 may be performed on a per-call basis because some network edge devices with the communications network 100 may not have sufficient processing capacity to process a large number of reservation messages typical for high volume call traffic. Alternatively, resource management within portions of the communication network 100 may be performed on a multiple-call basis if these portions of the communication network 100 are adequately provisioned (i.e., sufficient capacity has been reserved by a multiple-call reservation); in such cases, network edge devices within these portions of communication network 100 need not perform per-call admission control. Consequently, in an embodiment of the present invention, some network edge devices do per-flow admission control to interpret reservation requests while other network edge devices that are in capacity-rich regions of the data network 100 are provisioned to simply forward these messages without interpretation.

Embodiments of the present invention can perform resource reservation in the communication network 100 in a uni-directional manner which thereby compensates for routing asymmetries. Thus, when the originating TIU 170 sends a reservation request to the originating NED 120 and when the originating TIU 170 receives back an acknowledgment for the reservation request, two aspects of the connection are confirmed. First, adequate bandwidth for the call is available in both directions over the access networks 150 and 151. Second, adequate bandwidth for the call is available over the communication network 100.

Steps 210 through 240 describe the process of reserving the network resources. At this point, the network resources to be used for the call are reserved, but none of these network resources are yet committed.

At step 250, end-to-end messages are exchanged between the originating TIU 170 and the terminating TIU 171. As previously discussed above, the term "end-to-end" refers the associated between two end points associated with a call. So, where a call involves a calling party and a called party using telephones, the end-to-end association for the call can be between the two telephony interface units; thus, end-to-end messages would include messages originating at one telephone interface unit and terminating at the other telephony interface unit.

The end-to-end messages can include, for example, a ring message from the originating TIU 170 to the terminating TIU 171, a ring back message from the terminating TIU 171 to the originating TIU 170, and a connect message from the terminating TIU 171 to the originating TIU 170. The ring message can signal the terminating telephone 191 to ring thereby indicating an incoming call. The ring back message can signal the originating TIU 170 that the terminating telephone 190 is ringing. The connect message can signal to the originating TIU 170 that the called party has indicated acceptance for the call by, for example, going off-hook. Note that these end-to-end messages can be routed between the originating TIU 170 and the terminating TIU 171 without being routed through the originating gate controller 110 or terminating gate controller 111.

At step 270, upon the calling party and the called party being connected (e.g., upon an off-hook condition by the called party and a connect message being sent), a commit message is sent from the originating TIU 170 to the originating NED 120 and from the terminating TIU 171 to the terminating NED 121.

At step 280, upon receiving the commit message at the originating NED 120, the gate established at the originating NED 120 in step 230 is opened. Similarly, at step 290, upon receiving the commit message at the terminating NED 121, the gate established at the terminating NED 120 in step 220 is opened. At this point when the gates are opened at the originating NED 120 and the terminating NED 121, the reserved network resources are committed. The commit process can include a verification by the NED that the actual quality of service sought by the associated TIU is no greater than the quality of service reserved during the reservation process.

The gate at the originating edge router and the gate at the terminating edge router for each call are opened almost simultaneously (e.g., within a few hundred milliseconds of each other) because, under normal operating conditions, the calling party and the called party send respective Commit message to their respective network edge devices substantially simultaneously. Similarly, under normal operating conditions, the calling party and the called party end the call and send respective release messages to their respective network edge devices substantially simultaneously. Gate coordination prevents billing for incomplete calls and prevents theft of service by two colluding BTIs.

By separating the reservation process from the commit process, embodiments of the present invention advantageously ensure that network resources are available before actually ringing the far-end telephone (e.g., the telephone of the called party). This, of course, advantageously ensures that usage recording is not initiated until the far-end telephone goes off hook. Consequently, call billing excludes calls that are not completed (e.g., where the called party does not answer) and excludes the portion of calls that occur before the called party answers.

Although FIG. 2 describes an embodiment for reserving network resources where the calling party and the called party were using telephones 190 and 191, respectively, through TIUs 170 and 171, respectively, the process can be analogized for a calling party and/or called party using a communication device 180 and/or 181, respectively.

Note that the state information for a call can be maintained without maintaining the state information at a gate controller. From the perspective of the originating gate controller, a gate setup message for a call (e.g., a GATE-SETUP message described in Section 10 below) is received through a network edge device connecting a trusted network to an untrusted network. The state information for the call (e.g., contained within a GATEALLOC message described in Section 10 below) is formatted at the gate controllers based on the setup message for the call. The state information for the call is sent to the originating network edge device without maintaining the state information at the originating gate controller and at the terminating network edge device without maintaining the state information at the terminating gate controller.

Note that the term "maintained" as used herein in reference to the state information is intended to include storing and using the state information while the call is being establishing, the call is in progress and the is being released. Although the state information may be temporarily stored at the gate controllers, the state information is not maintained at the gate controller because the gate controllers do not do not use the state information (e.g., for call processing) while the call is being establishing, the call is in progress and the call is being released. In fact, the gate controllers need not stored the state information after the state information has been provided to the network edge routers because the state information for the call is accessed at the gate controllers, not the gate controllers.

3. Two-Phase Signaling

In embodiments of the present invention, signaling messages are exchanged for a call between a calling party to a called party in two phases. The signaling messages are exchanged in two phases in the sense that the messages for setting up the call are exchanged in one phase and the messages for connecting the call are exchanged in a separate and distinct second phase. By separating the messages for setting up the call from the messages for connecting the call, the later messages can be exchanged end to end without being routed through the gate controllers that set up the call.

Note this concept of two-phase signaling is distinct from the concept of two-phase network resource reservation in the sense that the two-phase signaling can be performed in combination with or independent of the two-phase network resource reservation. In other words, when done in combination, the messaging for the two-phase signaling can be interleaved with the messaging for the two-phase network resource reservation; when done independently, the messages for each can be distinct. The two-phase network resource reservation relates to reserving network resources without committing them, then committing those reserved resources. The two-phase signaling relates to performing signaling to set up the call, then once the call is setup (e.g., thereby confirming the authorized quality of service), exchanging end-to-end messaging.

A setup message having a destination address is forwarded from the calling party to the called party. A setup acknowledgment message is received at, for example, a gate controller from the called party if the destination address corresponds to the called party. The received setup acknowledgment message is sent to the calling party. The calling party and the called party exchange end-to-end messages if the calling party received the forwarded setup acknowledgment message and if at least one from the group of the called party and the calling party sent a reserve message to an associated network edge device.

Figure 3:
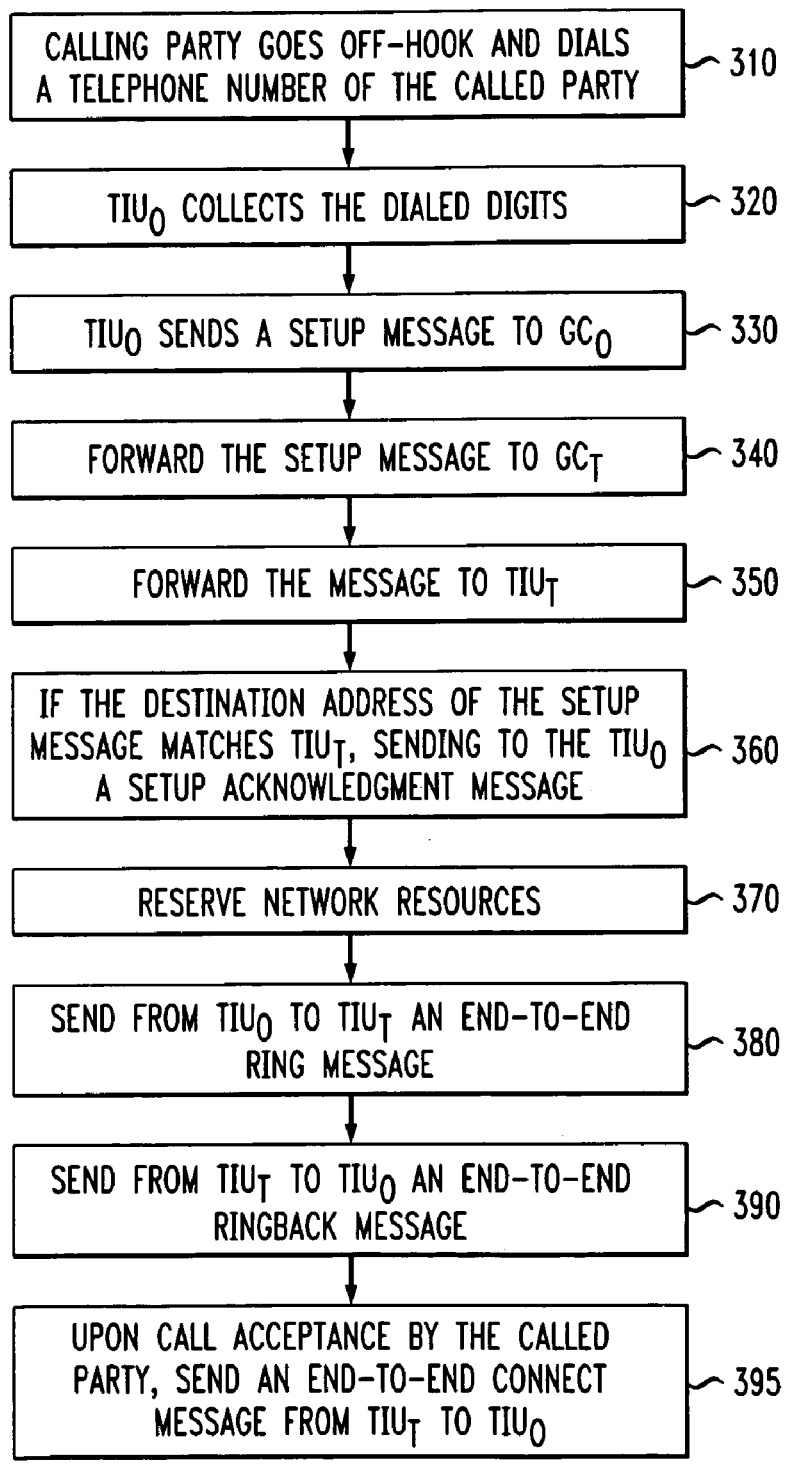
FIG. 3 illustrates a flow chart for performing two-phase signaling in call connection, according to an embodiment of the present invention.
Figure 4:
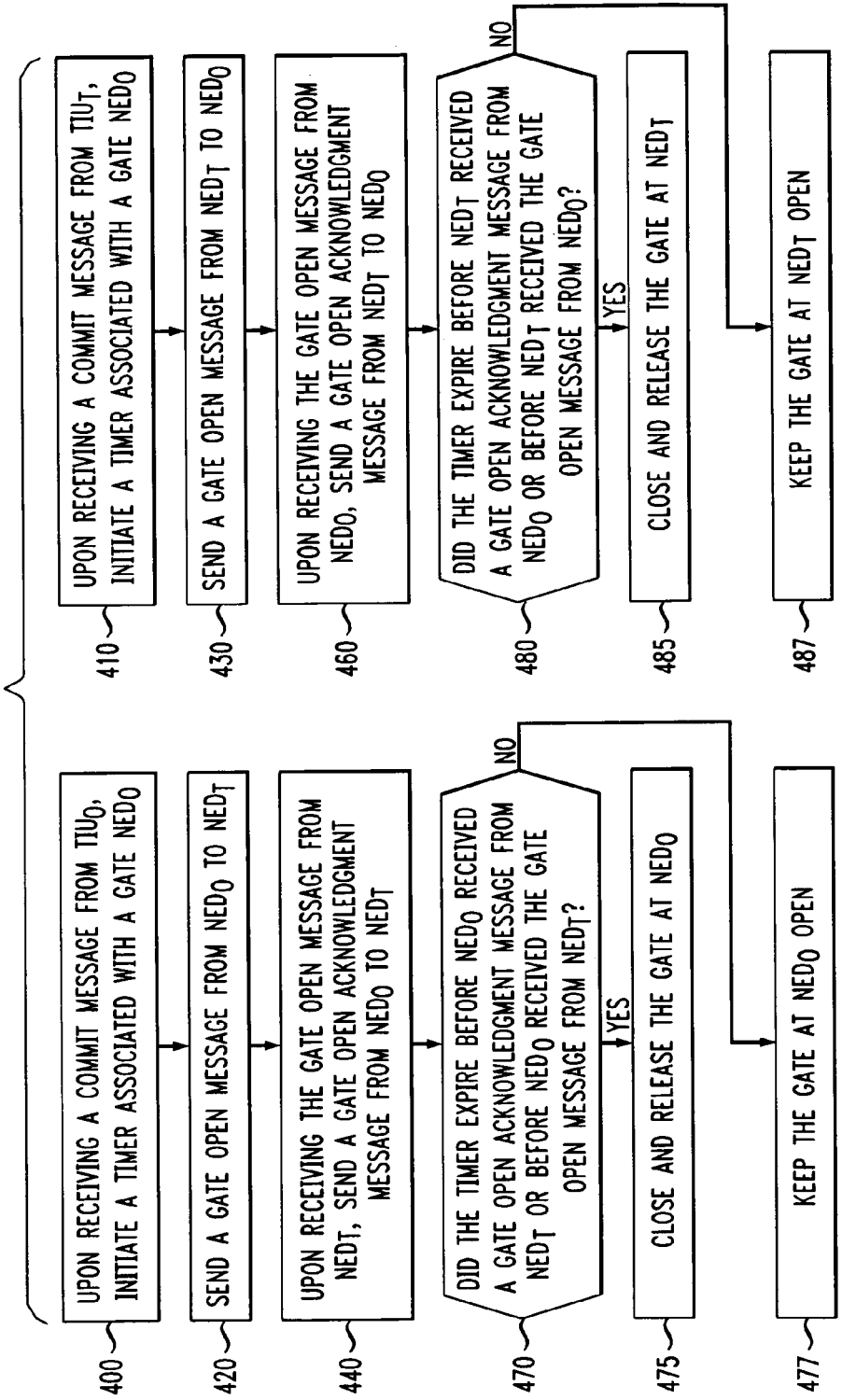
FIG. 4 illustrates a flow chart for disconnecting a call, according to an embodiment of the present invention.

FIG. 3 illustrates a flow chart for performing two-phase signaling in call connection, according to an embodiment of the present invention. At step 310, the calling party goes off-hook and dials a telephone number of the called party. For convenience, FIG. 3 will be discussed where the calling party is using telephone 190 and the called party is using telephone 191. Of course, any number of arrangements are possible, such as the calling party using communication device 180. At step 320, the originating TIU 170 collects the dialed digits.

At step 330, the originating TIU 170 sends a setup message to the originating gate controller 110. The setup message can be sent through network interface unit 160, access network 150, NED 120 and communication network 100. In one embodiment, the setup message can be, for example, in the form of the SETUP message described below in Section 10 entitled "Protocol Description".

At step 340, the setup message is forwarded from the originating gate controller 110 to the terminating gate controller 111. At step 350, the setup message is forwarded from the terminating gate controller 111 to the terminating TIU 171. (After receiving the setup message, the originating gate controller 110 and the terminating gate controller 111, can establish a gate at the originating NED 120 and a gate at the terminating NED 121 as described in Section 2 above.)

At step 360, if the destination address of setup message corresponds to the terminating TIU 171, a setup acknowledgment message is sent to the TIU 170. The setup acknowledgment message can be sent, for example, through terminating gate controller 111 and originating gate controller 110. In one embodiment, the setup acknowledgment message can be, for example, in the form of the SETUPACK message described below in Section 10 entitled "Protocol Description".

At step 370, the network resources for the call are reserved. As described above in Section 2 entitled Two-Phase Network Resource Reservation, a reserve message is sent from the originating TIU 170 to the originating NED 120 and from the terminating TIU 170 to the terminating NED 121 when an allocation of network resources is requested but the network resource need not yet be assigned or committed.

At steps 380 through 395, end-to-end messages are exchanged between the originating TIU 170 and the terminating TIU 171 if the calling party received the setup acknowledgment message sent to the originating TIU 170 in step 360 and if the calling party or the called party sent a reserve message to its NED. In other words, end-to-end messages relating to the connection of the call are exchanged only after the reservation messages have been exchanged and the reservation process is complete. This ensures that service is only provided to calling and called parties that have been authorized and authenticated for the call. This also ensures that the call is established for a specifically authorized quality of service and that the call is billed appropriately.

At step 380, a ring message is sent from the originating TIU 170 to the terminating TIU 171. The ring message can signal the terminating telephone 191 to ring thereby indicating an incoming call.

At step 390, a ring back message is sent from the terminating TIU 171 to the originating TIU 170. The ring back message can signal the originating TIU 170 that the terminating telephone 190 is ringing.

At step 395, a connect message is sent from the terminating TIU 171 to the originating TIU 170. The connect message can signal to the originating TIU 170 that the called party has indicated acceptance for the call by, for example, going off-hook. These end-to-end messages can be routed between the originating TIU 170 and the terminating TIU 171 without being routed through the originating gate controller 110 or terminating gate controller 111 because state information for the call can be maintained without maintaining it at the gate controllers 110 and 111. In addition, these end-to-end message can be routed through NEDs 120 and 121 opaquely.

Note that by separating the signaling for a call relating the reservation process and relating to connect process, the concept of the traditional dedicated phone line for a telephone user can be replaced with a process that authenticates the calling party and called party, and authorizes a desired quality of service on a per-call basis. In other words, only authenticated users reserved network resources for an authorized quality of service before these network resources are connected. Consequently, calls having varying qualities of service can be provided and appropriately billed on a call-by-call basis.

Furthermore, by separating the signaling for a call into signals relating to the reservation process and signals relating to the connect process, the gate controllers are involved in the signaling process where only needed: during the reservation process. After the reservation process is complete, the originating and terminating gate controllers pass the state information for the call to, for example, the originating and terminating TIUs without maintaining the state information at the gate controllers. The gate controllers no longer need be involved in the call and messaging related to the connection process can be sent end-to-end without being routed through the gate controllers. In other words, the gate controllers are involved only during the initial start of the call but not during the call duration. This results in a reduction of the message load by, for example, approximately a factor of three. Consequently, the amount of memory need in the gate controllers is greatly reduced. Moreover, the gate controllers can be constructed without the typically stringent requirements for reliability.

4. Gate Coordination on a Per-Call Basis

As discussed in the preceding section, reserved network resources can be committed upon the originating and terminating network edge devices receiving commit messages indicating that the call has been connected. At this point, gates associated with a call between a calling party and a called party can be opened in a coordinated fashion. A timer associated with a first gate opened at an originating network edge device is initiated. A first gate open message is sent from the originating network edge device to the terminating network edge device. The first gate at the originating network edge device is released if the timer expires before at least one from the group of: (1) an acknowledgment based on the sent first gate open message is received from the terminating network edge device, and (2) a second gate open message is received at the originating network edge device from the terminating network edge device after the terminating network edge device has opened a second gate associated with the called party.

At step 400, a timer associated with a gate at the originating NED 120 is initiated upon receiving a commit message from the originating TIU 170. At step 410, a timer associated with a gate at the terminating NED 121 is initiated upon receiving a commit message from the terminating TIU 171. As described above in Section 2 entitled "Two-Phase Network Resource Reservation", the commit message is sent from a TIU to the associated NED upon the called party indicating an acceptance for the call (e.g., by a connect message being sent from the terminating TIU to the originating TIU). The order steps 400 and 410 depends on the order in which the NEDs receive the commit messages from their associated TIUs.

At step 420, a gate open message is sent from the originating NED 120 to the terminating NED 121. At step 430, a gate open message is sent from the terminating NED 121 to the originating NED 120. In one embodiment, the setup acknowledgment message can be, for example, in the form of the GATEOPEN message described below in Section 10 entitled "Protocol Description". The order in which steps 420 and 430 are performed depends on the order in which steps 400 and 410 are performed. A gate open message is sent from one NED to the other NED to notify that other NED when a gate for the call has been opened.

At step 440, a gate open acknowledgment message is sent from originating NED 120 to terminating NED 121 upon the originating NED 121 receiving the gate open message sent during step 430 by terminating NED 120. At step 450, a gate open acknowledgment message is sent from terminating NED 121 to originating NED 120 upon the terminating NED 120 receiving the gate open message sent during step 420 by originating NED 120. In one embodiment, the setup acknowledgment message can be, for example, in the form of the GATEOPENACK message described below in Section 10 entitled "Protocol Description". The order in which steps 440 and 450 are performed depends on the order in which the gate open acknowledgment message are received.

At conditional step 470, a determination is made as to whether the timer for the gate at the originating NED 120 expired before (1) the originating NED 120 received the gate open acknowledgment message from the terminating NED 121, or (2) the originating NED 120 received the gate open message from the terminating NED 121. If the timer expired before either condition is satisfied, then the process proceeds to step 475 where the gate at the originating NED 120 is closed and released. If the timer did not expire before either condition is satisfied, then the process proceeds to step 477 where the gate at the originating NED 120 is allowed to remained open.

At conditional step 480, a determination is made as to whether the timer for the gate at the terminating NED 121 expired before (1) the terminating NED 121 received the gate open acknowledgment message from the originating NED 120, or (2) the terminating NED 121 received the gate open message from the originating NED 120. If the timer expired before either condition is satisfied, then the process proceeds to step 485 where the gate at the terminating NED 121 is closed and released. If the timer did not expire before either condition is satisfied, then the process proceeds to step 487 where the gate at the terminating NED 121 is allowed to remained open.

A gate is "closed" in the sense that the call is no longer active although the gate for the call remains established for possible later use. For example, in a call having a call waiting feature, a first party can be connected to two other parties and two gates (one per call) will be established at the network edge device associated with the first party. In such a case, as the first party switches between the calls the temporarily inactive call will have an associated gate that is closed; this closed gate can be reopened upon the call being reactivated.

A gate is "released" in the sense that the call is no longer active and the gate for the call is deleted from the associated network edge device. In such a case, for a call to be started, the entire network resource reservation process and commit process (see, e.g., the discussed relating to FIG. 2) have to be repeated.

The timer at a gate ensures that the other gate related to the call is also opened within the timer period so that billing for the call is accurate and so that theft of service can be prevented. Without such gate coordination, either a service provider could bill a party for a call where only one gate was opened (even if the calling party was not connected to the called party) or a service provider could be susceptible to theft of service for a call where only one gate was opened. Considering the latter, theft of service could occur without gate coordination, for example, by two colluding TIUs: where the originating TIU can initiate a call and only the terminating TIU sends a local commit message, the single gate would not be released for up to several minutes because the far-end telephone could be ringing; the originating BTI could then steal service during this time. By sending the gate open message from the network edge device with an open gate to the network edge device without a corresponding peer gate, the second gate for the call is sure to be established even if a commit message is not received from the associated TIU (as could be the case if a theft of service was attempted).

Figure 8:
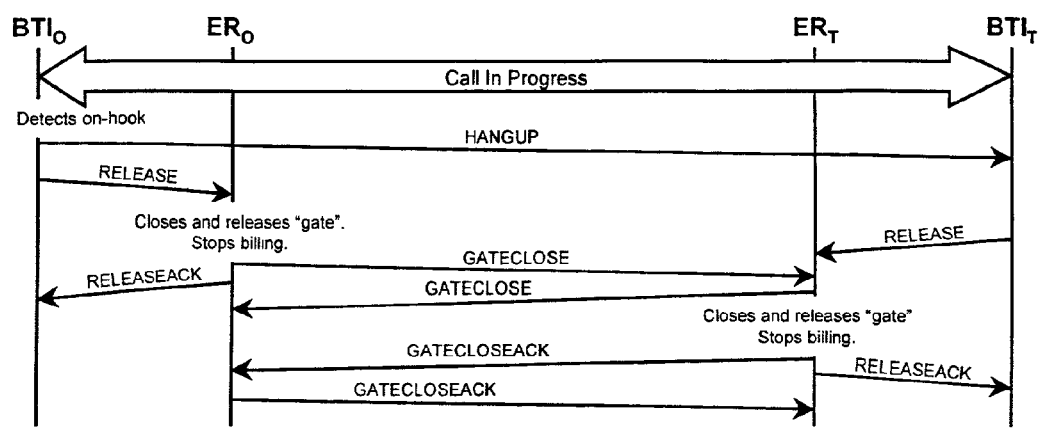
FIG. 8 shows the call flow for a normal call termination, according to an embodiment of the present invention.

Gate coordination can also be performed at the end of a call. Just as a gate open message and a gate open acknowledgment message is sent to the network edge device where the peer gate is established, a gate close message and a gate close acknowledgment message can be sent upon a gate closing to the network edge device where the peer gate is open. In other words, when a call is ended by either the calling party or the called party, the party ending the call has its gate closed and the peer gate is informed of the closure so that the peer gate is also closed. An example of the message exchange for a gate closing is shown in FIG. 8 and the associated discussion in Section 11 entitled "Signaling Architecture Call Flows".

By coordinating the gate closings, again theft of service by a malfunctioning or malicious TIU can be prevented. Consider the case where the originating TIU 170 calls terminating TIU 171 and pays for the call. If either the calling party or the called party end the call, the gates at both the originating NED 120 and the terminating NED 121 need to be closed. Because the originating TIU 170 is being billed for the call, the calling party has an incentive to issue a release message to close the gate at the originating NED 120. The terminating TIU 171, however, cannot be trusted to send the release message to close the gate at the terminating NED 121. A gate close message sent from the originating NED 120 can close the gate at the terminating NED 121 to prevent the terminating TIU 171 from placing another call and having that call billed to the party associated with TIU 170.

5. Network Address Translation

Because the TIUs are untrusted entities, any information that a calling party or a called party desires to keep private, such as caller ID information or address information, should be accessible to the network 10 but not to other untrusted entities. This section describes the use of network address translations and encryption techniques that allow gate controllers to send state information to TIUs where it is maintained in a form that renders the private information opaque.

In one embodiment, a call between a calling party and a called party is connected. Information associated with the call is sent from the calling party to the called party without the called party receiving a source address that indicates at least one from the group of a logical identity of the calling party and a geographical identity of the calling party.

The term "logical identity" is used to herein to include, for example, any aspect of the source address or destination address that indicates the specific identity of a calling party or the called party. The term "geographic identity" is used to herein to include, for example, an aspect of the source address or destination address that indicates the particular geographic location of a calling party or called party. Even where a network address has been modified or altered to protect the logical identity of a calling party or called party, the remaining aspects of the network address can reveal the general geographic location of the party. In an embodiment of the present invention, information is sent from one party to another party without revealing either the logical identity nor the geographic identity of a party.

Figure 5:
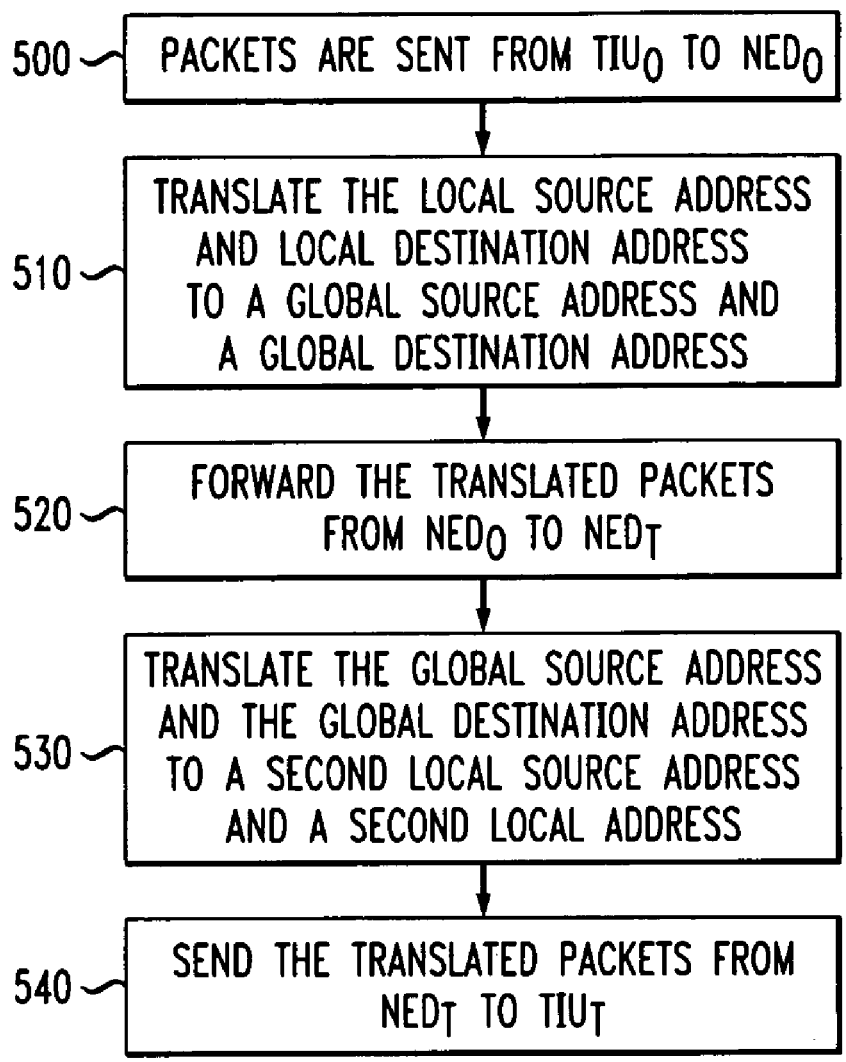
FIG. 5 illustrates a flow chart for translating a network address, according to an embodiment of the present invention.

FIG. 5 illustrates a flow chart for translating a network address, according to an embodiment of the present invention. At step 500, packets having the source address and the destination are sent from the originating TIU 170 through the originating network interface unit 160 towards the originating NED 120. The source address and the destination address locally identify the calling party and the called party, respectively. These addresses are "local" in the sense that they are associated with particular portions of networks (also referred to herein as "address domains"), such as portions of the access network 150 and/or communication network 100 and/or other access networks (not shown in FIG. 1). These local addresses are not sent outside of their respective address domains. To send packets outside of the address domain, the destination needs to be identified by a global address, as described below. Table 1 illustrates an example of the source address (SA) and the destination address (DA) at this point.

TABLE 1

| | |
|---|---|
| SA | 10.10.1.5 |
| DA | 10.10.1.27 |

At step 510, the packets received at NED 120 are translated from local addresses for the address domain within access network 150 to global addresses. Not only can the destination address be translated into a global address, but the source address can also be translated into a global address. Table 2 illustrates a translation table for the call used at NED 120. Note that the global addresses used for the call can be assigned dynamically, for example, on a call-by-call basis so that when a call has ended, the global address can be reused for another, unrelated call.

TABLE 2

| | Local Address | Global Address |
|---|---|---|
| SA | 10.10.1.5 | 135.4.1.7 |
| DA | 10.10.1.27 | 135.4.2.15 |

At step 520, the packets are forwarded from the originating NED 120 to the terminating NED 121. At this point, the packets have the global address shown in Table 2.

At step 530, the packets received at the terminating NED 121 are translated from global addresses to addresses that are local to the address domain for which the terminating access network 151 is included. Table 3 illustrates a translation table for the call used at NED 121 for translating the global addresses to local addresses.

TABLE 3

| Global Address | Local Address | |
| --- | --- | --- |
| 135.4.1.7 | 10.10.100.19 | SA |
| 135.4.2.15 | 10.10.100.7 | DA |

At step 540, the packets translated by the terminating NED 121 are sent through access network 151 to the terminating TIU 171. Table 4 illustrates the source address and the destination address for the packets for the call as the packets are transmitted across terminating access network 151, through terminating network interface unit 161 to the terminating TIU 171.

TABLE 4

| SA | 10.10.100.19 |
| --- | --- |
| DA | 10.10.100.7 |

The translated packets are received at the terminating TIU 171 without revealing the logical identity and the geographic identity of calling party. Note that the called party only has access to the global source address and the global destination address which themselves are translations. Because the source address of calling party has been translated twice, once at the originating NED 120 and once at the terminating NED 121, address information about the calling party has been altered beyond recognition to the calling party.

Once the call is completed, the translation tables at the originating NED 120 and the terminating NED 121 can be deleted, and the global addresses can be released for reuse in another call. For example, if the network address translation is incorporated into the functionality of the respective gates, the global addresses can be released when the gates are released. In another embodiment, the global addresses can be released after a time period of inactivity.

FIG. 5 illustrates the process by which packets are sent from the originating TIU 170 to the terminating TIU 171. Similarly, packets sent from the terminating TIU 171 to the originating TIU 170 can be translated at the terminating NED 121 (reverse of the translation shown in Table 3) and again at the originating NED 120 (reverse of the translation shown in Table 2). Thus, the source address and the destination address of the packets can be sent from the terminating TIU 171 to the originating TIU 170 without revealing the logical identity and the geographic identity of called party.

The double translation of network addresses can be provided as a service to a subscriber by a service provider. In other words, a call can be connected where the calling party and/or the called party subscribe to the double translation service. FIG. 5 illustrates the case where the privacy of both the calling party and the called party address information is maintained: both the source address and the destination address of packets for the call are translated as the packets are sent from the calling party to the called party and as packets for the call are sent from the called party to the calling party.

The double translation service can be provided to one party (i.e., only the calling party or the called party) without providing the service to the other party. In such a case, for example where only the calling party has subscribed to the double translation service, the first source address for packets sent from the originating TIU 170 are translated at the originating NED 120 into a global source address, and the global address for these packets are translated at the terminating NED 121 into a second local source address. As packets are sent from the terminating TIU 171, the second local source address is translated at the terminating NED 121 into the global source address, and the global source address is translated into the first source address at the originating NED 120.

In other words, where only one party has subscribed to the double translation service, the address associated with that party is translated twice. Consequently, the logical identity and the geographic identity of that party is maintained in privacy from the other party for the call.

The translation tables at the originating NED 120 and the terminating NED 121 can be set up for a specific call and then can be deleted at the end of the call. This further ensures the privacy of the calling party and/or called party because the global addresses are not repeated. Furthermore, by releasing the global addresses at the end of a call, the global addresses can be reused for another call having a different calling party and/or called party. Consequently, any potential shortage in the number of global addresses can be alleviated because the number of active calls at one time is much less than the number of total calling parties and called parties.

6. Simulated Destination Ring Back

In another embodiment of the present invention, a ring back signal for a call between a calling party and a called party can be simulated. A ring back message associated with the call is received. The calling party is associated with a first network. The called party is associated with a second network. A prestored ring back signal is selected from a set of prestored ring back signals based on the ring back message and/or a called number for the call. The selected prestored ring back signal is associated with the second network and is different from a second prestored ring back signal associated with the first network. The prestored ring back signal is sent to the calling party.

The prestored ring back signal can be, for example, a signal that is indicative of the network associated with the called party rather than a signal that otherwise would be originated by that network. For example, a ring back signal indicative of a foreign network (i.e., a network located in a foreign country) can be stored at the originating telephone interface unit (TIU). In this case, when a ring back message is received at the originating TIU indicating that the telephone and/or communication device of the called party is ringing, for example, the prestored ring back signal indicative of the foreign network can be sent to the calling party from the originating TIU.

Similarly, a signal indicative of a foreign network can be stored at a terminating TIU and sent to the originating TIU. In such a case, the ring back signal prestored at terminating TIU can simulate the ring back signal for that foreign country rather than relying on the actual foreign-network-originated ring back signal.

The prestored ring back signal can be, for example, an audio signal heard through a telephone receiver speaker or through a speaker of a communication device (e.g., a personal computer). Alternatively, the prestored ring back signal can have any other type of form so that a ring back status is communicated to the calling party. The prestored ring back signal can be, for example, text or a graphic representation on video monitor display.

Although the discussion herein regarding call forwarding is generally in reference to the TIUs, the discussion is also applicable for calls involving a communication device(s). In such a case, the functionality described herein as being resident in the TIUs, can be resident in a communication device. The term "interface unit" collectively refers to either a TIU or a communication device.

Figure 33:
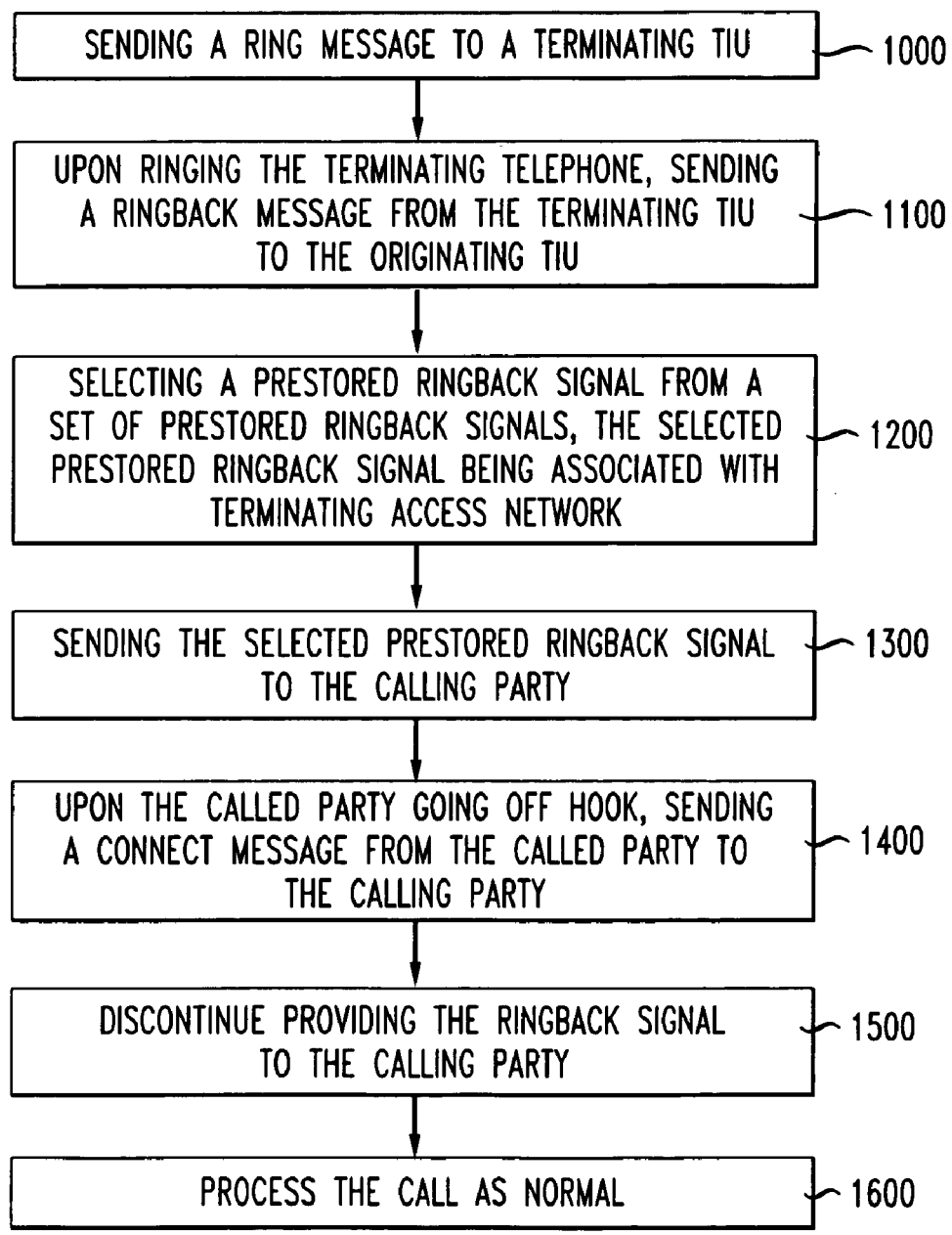
FIG. 33 illustrates a flow chart for simulating a ring back signal for a call, according to an embodiment of the present invention.

FIG. 33 illustrates a flow chart for simulating a ring back signal for a call, according to an embodiment of the present invention. At step 1000, a ring message is sent from an originating interface unit (e.g., telephone 190 or communication device 180) to a terminating interface unit (e.g., TIU 191 or communication device 181). At step 1100, a ring back message is sent from the terminating TIU 171 to the originating TIU 170 upon ringing the terminating telephone 191 and/or communication device 181.

The ring message and the ring back message are part of the end-to-end messaging for a call once the set up of the call has been completed (i.e., once network resources for the call are reserved) but before the network resources for the call are committed. In other words, as described above in Section 3 "Two-phase Signaling," signaling messages are exchanged in two phases: messages for setting up the call, and then the messages for connecting the call. The ring message and the ring back message are part of the end-to-end messaging that occurs between the call setup messaging and the call commitment messaging. The ring message and the ring back message are end-to-end messages in the sense that these messages can be sent between the terminating telephone interface unit and the originating telephone interface unit without being routed through a gate controller (e.g., gate controller 110 or 111).

Thus, the ring message is sent from the originating TIU 170 to the terminating TIU 171 in step 1000 after the messages for setting up the call are completed. For example, the ring message can be sent from the originating TIU 170 to the terminating TIU 171 after a setup acknowledgment message is received at the originating TIU 170 (see, e.g., FIG. 6).

The originating TIU 170 can determine the called party location (e.g., access network 151), the characteristics of the terminating TIU 170 and/or the state of the originating TIU 170. The characteristics of the terminating TIU 170 can include the particular equipment type and particular features available at the terminating TIU 170. The state of the originating TIU 170 can include, for example, whether the called party has another active call via calling waiting.

The originating TIU 170 determines the called party location (e.g., access network 151), the characteristics of the terminating TIU 171 and/or the state of the originating TIU 171 based on the ring back message and/or the called number. The ring back message can include an indicator that identifies the terminating access network where the called party is located. This indicator allows the originating TIU is properly select the prestored ring back signal associated with the access network where the called party is located, as described in connection with step 1200. The indicator also can indicate the characteristics of the terminating TIU 171 and/or the state of the originating TIU 171. Similarly, the called number can indicate the called party location and/or the characteristics of the terminating TIU 171. The called number (or called address) can be that dialed by the calling party (i.e., the dialed number) or one subsequently translated, for example, at the originating TIU 170. The called number can be looked up in a database of the originating TIU 170 to determine the called party location and/or the characteristics of the terminating TIU 171.

At step 1200, a prestored ring back signal is selected from a set of prestored ring back signals. The set of prestored ring back signals can be associated with the access networks connected to communication network 100, the various types of terminating TIUs and/or the various states in which a terminating TIU can be. Access networks connected to communication network 100 can include access network 151 and other access networks shown in FIG. 1. Each access network can have an associated ring back signal particular to that access network. For example, an access network in a foreign country will typically have a ring back signal particular for that foreign access network. Thus, when the called party is located in that foreign country's access network, the calling party will typically hear the ring back signal particular for that access network. Similarly, a particular equipment type for a terminating TIU can have a particular associated ring back signal. Finally, the particular state of a terminating TIU can have a particular associated ring back signal; for example, when the terminating TIU has another active call through call waiting, the associated ring back signal can be indicative of a terminating TIU active on another call.

At step 1300, the selected prestored ring back signal is sent to the calling party. The calling party can be located at, for example, telephone 190 and/or communication device 180. Upon receiving the selected prestored ring back signal, the calling party can receive the simulated ring back signal through telephone 190 and/or communication device 180 as if the ring back signal was generated by the terminating access network 151 and passed through the communication network 100 and access network 150. Consequently, the simulated ring back signal can replicate the characteristics of a ring back signal otherwise generated by a terminating access network without requiring the actual ring back signal to be generated by the terminating access network.

At step 1400, a connect message is sent from the terminating TIU 171 to the originating TIU 170 when the called party answers and creates an off-hook condition. The connect message is part of the end-to-end messaging for a call.

At step 1500, the ring back signal playback to the calling party is discontinued upon receiving the connect message at the originating TIU 170 in step 1400. In other words, upon receiving the connect message, the fact that an off-hook condition has occurred at the called party location is confirmed at the originating TIU 170. Consequently, the ring back signal need no longer be provided to the calling party.

At step 1600, the call is processed as normal. In other words, once the connect message is received at the originating TIU 170, the end-to-end messaging is complete and the call commitment messaging can be exchanged, as described above in Section 3.

By allowing the ring back signal to be simulated at the originating TIU 170, the ring back signal need not be sent from the terminating access network 151, through the communication network 100 to the originating access network 150. Rather the ring back signal can be retrieved from storage at the originating TIU 170 and provided to the calling party. This is particularly advantageous because the ring back signal can be provided to the calling party without the call yet actually being connected. In other words, although traditional communication systems require the network resources for the call to be committed and the call to be connected, that is not necessary here because the ring back signal can simulated locally. Thus, where the ring back signal is to be provided to the calling party before the call is actually connected, a simulated ring back signal provides the same type of ring back signal to the calling party without actually requiring the transmission of the actual ring back signal through the various networks.

In an alternative embodiment, rather than simulating the ring back signal at the originating TIU 170, the ring back signal can be simulated at a terminating location. In this embodiment, the terminating location can select the appropriate prestored ring back signal locally and then send the ring back signal to the originating TIU 170. For example, where the called party is located at telephone 192, which is connected to telephone network 135 (e.g., the Public-Switched Telephone Network (PSTN)), the ring back signal can be prestored and selected from a database within, for example, telephone network gateway 130. For another example, where the called party is located at the terminating TIU 171, the ring back signal can be prestored and selected from a database within the terminating TIU 171. In each case, a unidirectional portion of the call (i.e., from the called party to the calling party) can be established so that the selected ring back signal can be sent to the calling party. (Note that this differs from the above-described embodiment where the ring back message is sent to the originating TIU before the call is connected; in such an embodiment, a connection need not yet be established.) Once the originating TIU 170 receives a subsequent connect message from the called party (i.e., when the called party goes off-hook), the other uni-directional portion of the call (i.e., from the calling party to the called party) can be established and the call can be processed as normal.

7. Call Forwarding

A call forwarding service allows a call destined from one address (or telephone number) to be redirected to another address (or telephone number). The call is forwarded by connecting the call between an originating location and a forwarding location without connecting the call through a terminating location. The originating location is associated with a calling party. The terminating location is associated with a dialed number. The terminating location and the forwarding location are associated with the called party. A bill for the call is apportioned between the calling party and the called party. The bill portion for the calling party is a function of the originating location and the terminating location. The bill portion for the called party is a function of the terminating location and the forwarding location.

The term "originating location" refers to the location through which the calling party accesses the communication network, for example, a telephone or communication device. The term "terminating location" refers to the location from which the call is forwarded. The terminating location can be the location to which the calling party initially directed the call; for example, the terminating location can be that defined by the dialed number indicated by the calling party. Alternatively, the terminating location can indicate a server within the communication network 100 that determines a subsequent location of the called party (e.g., by ringing various devices such as a pager and/or mobile phone where the called party may be located).

The "forwarding location" refers to the location to which the call is forwarded; the forwarding location is typically previously indicated by the called party as the location to which the call should be forwarded when a call is directed to the terminating location and certain conditions are met (e.g., no answer or busy).

For example, referring to FIG. 1, the originating location can be either telephone 190 or communication device 180; the terminating location can be either telephone 191 or communication device 181; and the forwarding location can be a telephone or communication device (not shown in FIG. 1) connected to communication device 100 through a network edge device (NED); this NED can be, for example, a NED not shown in FIG. 1 or this NED can be the originating NED (in the case where the forwarding location is associated with a device connected to the originating NED) or the terminating NED (in the case where the forwarding location is associated with a device connected to the terminating NED).

The call forwarding service can have many variations of call forwarding such as time-of-day, caller-dependent, always, busy and no-answer. The options for call forwarding can be as complex as the programming and configuration in the terminating TIU is able to support. Except for a few cases, all options are implemented by the terminating TIU's response to the setup message received from terminating gate controller on arrival of a new call (as described below, e.g., in connection with step 720 of FIG. 34). The terminating TIU itself can determine the proper forwarding location for the call based on the current state of the terminating telephone (such state information can be stored in the associated terminating TIU) and on the caller-id information (if present). The setup acknowledgment message from the terminating TIU to the terminating gate controller can indicate the address (or telephone number) of the forwarding location. The forwarding TIU is also capable of optionally informing the called party in various ways that an incoming call has been forwarded, e.g., by a ping-ring or a short alerting tone.

The terminating TIU can initiate the call forwarding service after accepting the call. This can occur, for example, in the no answer case, where the phone rings for some pre-determined number of rings before the forwarding happens. This can be implemented by a call transfer function (described below in Section 11.3.5), where the terminating TIU can tell the terminating gate controller to redirect the current call to a new location. That new location can be, for example, a cellular phone, pager, voicemail, or some other location, and can depend on the identity of the caller as determined by the caller-id. Once again, the configuration and logic that determines the proper destination can be based on the TIU's programming and configuration.

When a terminating TIU is unavailable due to, for example, a power outage or facility failure, these call forwarding features can be implemented by a gate controller. A user profile can be maintained at the gate controller (in addition to the TIU) which specifies the call handling to be done when the TIU is unavailable. This type of redundancy can be a separate value-added service provided by the gate controllers and selected by a subscriber. This feature of the gate controller can be invoked when a setup message sent to a terminating TIU does not result in any acknowledgment (as described below in connection with steps 800 through 830 in FIG. 35); the gate controller can then forward the call according to this pre-determined profile.

A master copy of this user profile can reside in the TIU and can be sent to the gate controller whenever the user profile is changed by a subscriber. In one embodiment, the user profile can be stored in a flash memory, or can be stored in a head-end configuration database and loaded into the TIU after every power-up sequence.

Although the discussion herein regarding call forwarding is generally in reference to the TIUs, the discussion is also applicable for calls involving a communication device(s). In such a case, the functionality described above as being resident in the TIUs, can be resident in a communication device. The term "interface unit" collectively refers to either a TIU or a communication device.

Figure 34:
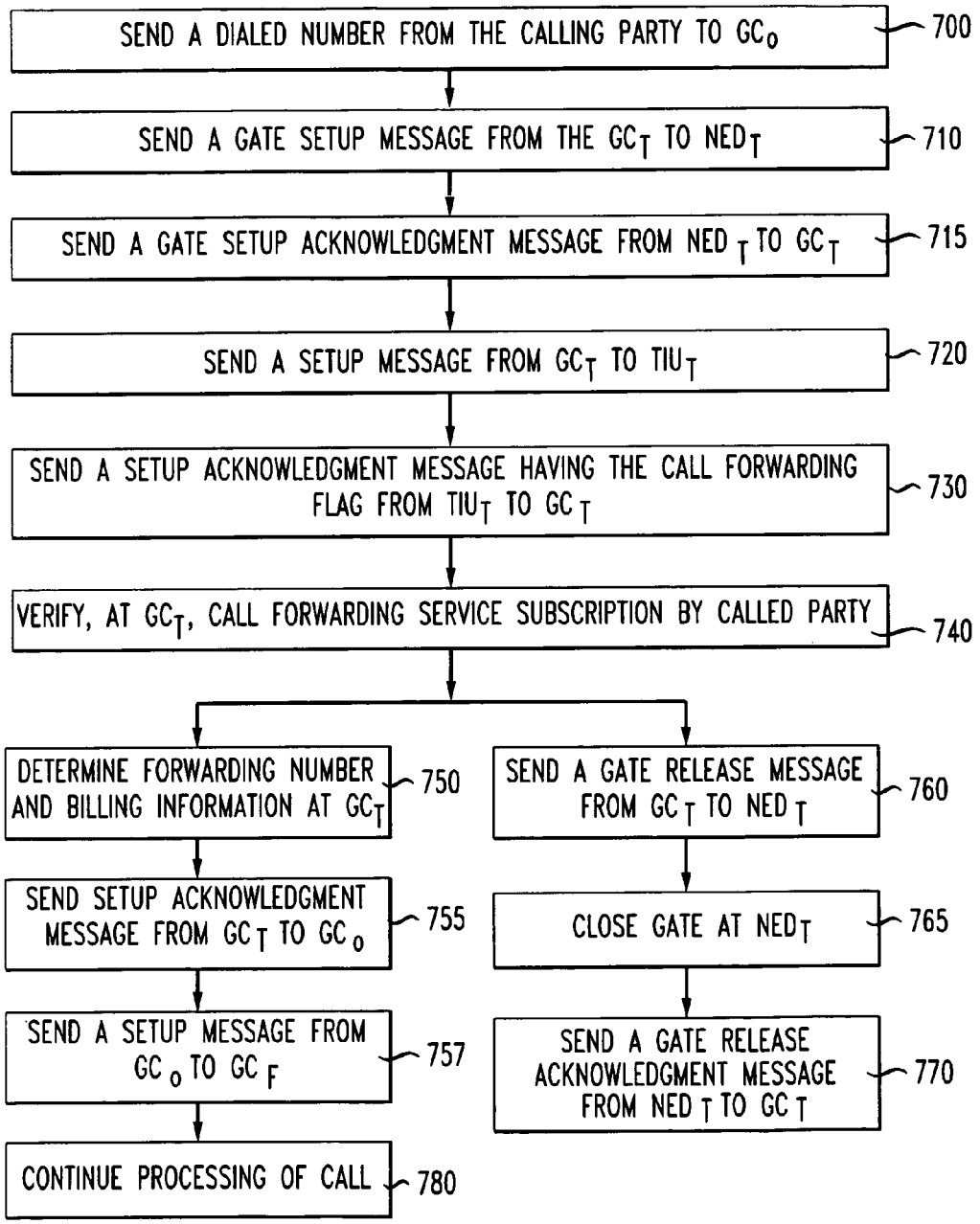
FIG. 34 illustrates a flow chart for call forwarding of all calls when the terminating TIU is available, according to an embodiment of the present invention.

FIG. 34 illustrates a flow chart for call forwarding of all calls when the terminating TIU is available, according to an embodiment of the present invention. At step 700, a dialed number is sent from the calling party to the originating gate controller 110. The calling party can be located for example from the telephone 190 or communication device 180.

At step 710, a gate setup message is sent from the terminating gate controller 111 to the terminating NED 121. Upon receiving the gate setup message at the terminating NED 121, a gate setup acknowledgment message is sent from the terminating NED 121 to the terminating gate controller 111.

At step 720, a setup message is sent from the terminating gate controller 111 to the terminating TIU 171. The terminating TIU 171 itself can determine the proper forwarding location for the call based on the current state of the telephone (such state information is stored in the associated terminating TIU 171) and on the caller-id information (if present). At step 730, a setup acknowledgment message having the call forwarding flag is sent from terminating TIU 171 to terminating gate controller 111. The setup acknowledgment message sent from the terminating TIU 171 to the terminating gate controller can indicate the address (or telephone number) of the forwarding location.

At step 740, terminating gate controller 111 verifies that the called party has subscribed to the call-forwarding service. This verification process is initiated because the call forward flag within the setup acknowledgment message is set.

At step 750, terminating gate controller 111 determines the forwarding number and billing information appropriate for the call. The terminating gate controller 111 determines the forwarding number in one of two possible ways. In one case, when the terminating TIU 171 has provided the forwarding number to the terminating gate controller 111 (for example, by retrieving the forwarding number from local storage at the terminating TIU 171), the terminating gate controller 111 can "determine" the forwarding number in the sense of further processing the forwarding number (e.g., further address translation). In another case, when the terminating TIU 171 is unavailable (for example, due to power outage or facility failure), the terminating TIU 171 cannot provide a forwarding number to the terminating gate controller 111. In this case, the terminating gate controller 111 determines the forwarding number via a user profile that can be maintained at the terminating gate controller 111.

Billing information is also determined at the terminating gate controller 111. The billing information can be determined at the terminating gate controller 111 rather than at the terminating TIU 171, which may be untrusted by a service provider. Because the terminating gate controller 111 is trusted by the service provider, the bill information can be determined by this trusted entity and forwarded to the proper billing system. Consequently, the bill for the forwarded call can be apportioned between the calling party and the called party properly without a threat of a theft of service.

At step 755, a setup acknowledgment message is sent from terminating gate controller 111 to originating gate controller 110. At step 757, a setup message is sent from originating gate controller 110 to forwarding gate controller (not shown in FIG. 1). At step 780, processing of the call continues as normal. This normal processing can include setting up the gate at the originating NED 120 as described above, for example, in Section 2 entitled "Two-phase Network Resource Reservation". The call can now be routed through the originating NED 120 through communication network 100 to the forwarding NED (not shown in FIG. 1) without having to hairpin the call through terminating NED 121.

Even though the call is routed from the originating NED 120 to the forwarding NED without having to hair pin the call through terminating NED 121, the bill for the call can be apportioned between the calling party and the called party.

At step 760, a gate release message is sent from the terminating gate controller 111 to the terminating NED 121. At step 765, the gate for the call is closed at terminating NED 121. At step 770, a gate release acknowledgment message is sent from the terminating NED 121 to the terminating gate controller 111. Because the call is not going to be hair pinned through terminating NED 121, the gate for the call is closed. By closing this gate, network resources associated with this leg of the call (i.e., the leg of the call between the originating location and the terminating location) are released and made available for other calls and any potential threat of service associated with the terminating NED 121 or terminating gate controller 111 is avoided.

Note that steps 750, 755, 757 and 780 can be done in parallel with steps 760, 765 and 770. These two parallel series of steps can be performed once the call-forwarding-service subscription by the called party is verified at the terminating gate controller 111 as described in connection with step 740.

Although FIG. 34 is a flow chart for call forwarding of all calls when the terminating TIU is available, the flow chart is easily modifiable to address other situations such as call forwarding for all calls even when the terminating TIU is unavailable; when the terminating TIU is busy, but available; when the terminating TIU is busy, but unavailable; or when there is no answer at the terminating TIU and the terminating TIU is unavailable. Note that the flow chart shown in FIG. 34 is related to the call flow shown in FIG. 17 and discussed below in Section 11.3.1.1. Similarly, the call flows shown in FIGS. 18 through 20 and 22 (and the corresponding discussion in Section 11.3.1) relate to call forwarding for all calls even when the terminating TIU is unavailable; when the terminating TIU is busy, but available; when the terminating TIU is busy, but unavailable; or when there is no answer at the terminating TIU and the terminating TIU is unavailable, respectively.

Figure 35:
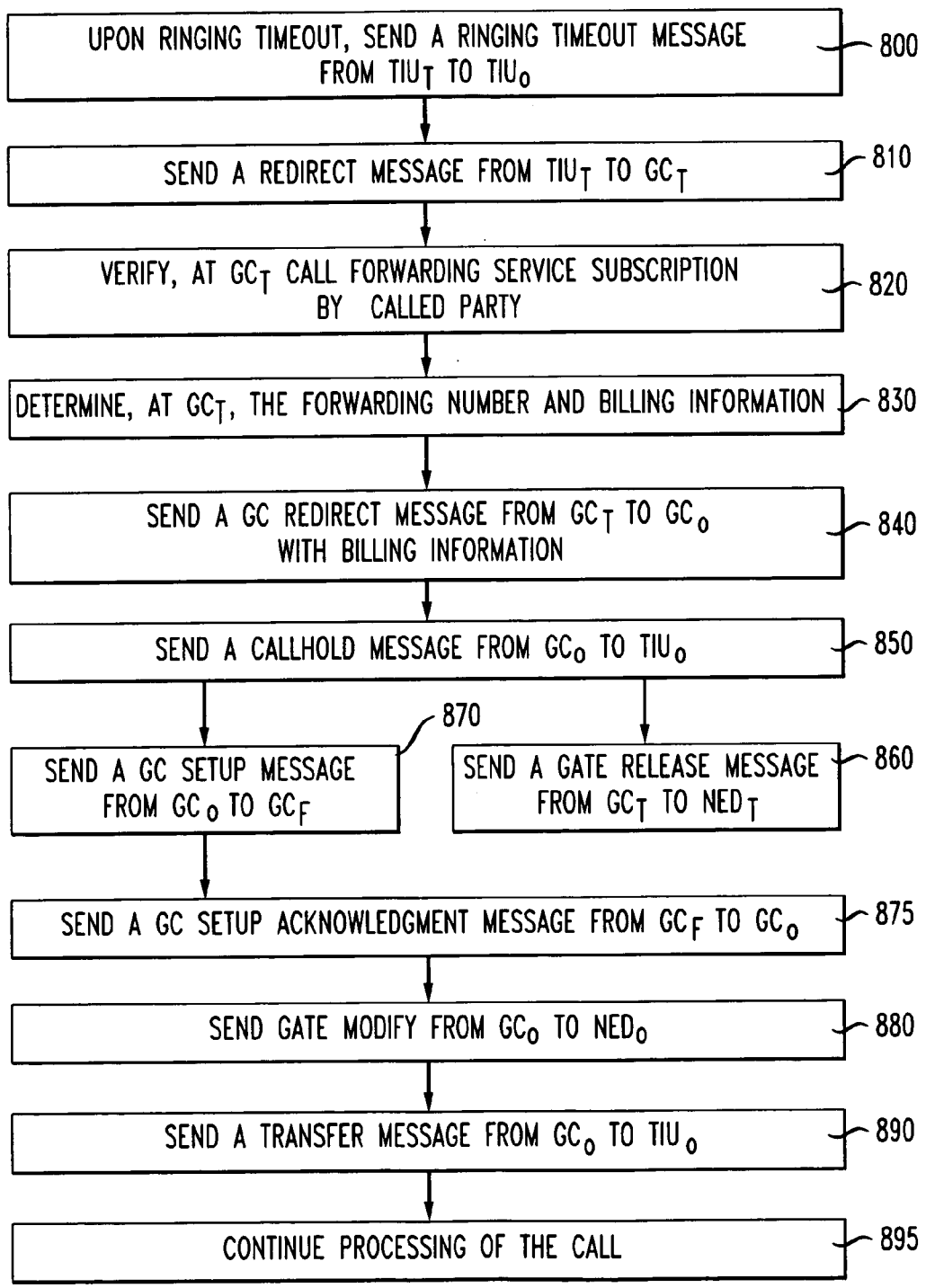
FIG. 35 illustrates a flow chart for call forwarding when the there is no answer at the terminating TIU which is available, according to an embodiment of the present invention.

FIG. 35 illustrates a flow chart for call forwarding when the there is no answer at the terminating TIU which is available, according to an embodiment of the present invention. Note that the flow chart shown in FIG. 35 is related to the call flow shown in FIG. 21 and discussed below in Section 11.3.1.3.

At step 800, upon a ringing time-out due to the called party not answering the call, a ringing-time-out message is sent from the terminating TIU 171 to the originating TIU 170. At step 810, a redirect message is sent from the terminating TIU 170 to the terminating gate controller 110. At step 820, the terminating gate controller 110 verifies that the called party has subscribed to the call-forwarding service. At step 830, upon the verification of the call forwarding service subscription by the called party, the terminating gate controller 110 determines the forwarding number and billing information for the call. Again, the terminating gate controller 111 determines the forwarding number and billing information for the call as described in connection with step 750 of FIG. 34.

At step 840, a gate controller redirect message is sent from the terminating gate controller 111 to the originating gate controller 110. The gate controller redirect message can include the necessary billing information. At step 850, a call hold message is sent from the originating gate controller 110 to the originating TIU 170.

At step 860, a gate release message is sent from terminating gate controller 111 to terminating NED 121. Consequently, the gate is released at the terminating NED 121 thereby releasing the network resources associated with the terminating NED 121 and avoiding any potential threat to services associated with the terminating NED 121. Therefore, the call can be forwarded without having the call hair pinned through terminating NED 121.

At step 870, a gate controller setup message is sent from originating gate controller 110 to the forwarding gate controller. At step 875, a gate controller setup acknowledgment message is sent from the forwarding gate controller to originating gate controller 110. At step 880, a gate modify message is sent from originating gate controller 110 to originating NED 120. At step 890, a transfer message is sent from originating gate controller 110 to originating TIU 170. Consequently, the call can be routed from originating NED 120 through communication network 100 to the forwarding NED. At step 895, processing of the call continues as normal.

Note that in the situation considered in connection with FIG. 35 where the terminating TIU 171 is available but there is no answer, the calling party can no longer be presumed to be unaware of the call being forwarded because the originating TIU 170 receives a call hold message (in step 850) and a transfer message (in step 890). When the terminating TIU 171 is available and there is no answer, the calling party (which is untrusted) may become cognizant of the messages and may conclude that the call is being forwarded. In other words, because the originating TIU 170 is untrusted by the service provider, the service provider can assume that the calling party can become aware of any messages sent to the originating TIU 170. Note that even in this case, the calling party cannot determine to which address (or telephone number) that call is being forwarded. Thus, anonymity of the forwarding location is still preserved.

Note that the process described in connection with FIGS. 34 and 35 share the feature that the call is forwarded through the originating NED 120, which maintains state information for the call. This is particularly advantageous for several reasons. First, anonymity of the forwarding location is preserved and the calling party typically does not know that the call has been forwarded (the exception being where the terminating TIU is available, but there is no answer). Second, the network resources between the originating location and the terminating location are not reserved and, consequently, made unavailable for other calls; this is particularly appropriate because the call is connected without hairpinning it through the terminating location and the network resources between the terminating location and the originating location need not be reserved.

Finally, no need exists to perform loop detection at any location other than the originating gate controller 110. Loop detection is a safeguard typically used in known systems to prevent an infinite loop of the call being forwarded from the terminating location to the forwarded location and again forwarded back to the terminating location, infinitely. It is particularly advantageous that the originating gate controller 110 is the only network entity that need perform the function analogous to loop detection. Said another way, because state information for the call is preserved at the originating gate controller 110, an explicit loop counter is not needed to determine a problematic call forwarding situation between multiple network entities.

The billing information described above in connection with step 750 of FIG. 34 and in connection with steps 830 and 840 of FIG. 35 can be sent to a billing system (connected to or within communication system 100, but not shown in FIG. 1) which can have various arrangements to accomplish the apportionment of the billing between the calling party and the called party. Generally speaking, the bill portion for the calling party is a function of the originating location and the terminating location; the bill portion for the called party is a function of the terminating location and the forwarding location. More specifically, the bill portions for the calling party and the called party can be determined based on equivalent costs of theoretical calls between the various locations.

For example, in one embodiment, the bill for a forwarded call can be apportioned so that the calling party is billed for the equivalent cost of a call between the originating location and the terminating location, and the called party is billed for the equivalent cost of a call between the terminating location and the forwarding location. Such an apportionment is particularly interesting because the calling party is billed for the call as dialed (i.e., the equivalent cost of a call between the originating location and the terminating location), and the called party is billed for the forwarding service whereby the destination of the call is transferred from the terminating location to the forwarding location.

As an illustration, consider a calling party in Washington, D.C. placing a call having a dialed number in San Francisco, Calif. where the destination of the call is redefined as Boston, Mass. (i.e., the call is forwarded from San Francisco, Calif. to Boston, Mass.); in this illustration, the calling party would be billed the equivalent cost of a call between Washington, D.C. and San Francisco, Calif., and the called party would be billed the equivalent cost of a call between San Francisco, Calif. and Boston, Mass. Note that the call in this illustration is actually between Washington, D.C. and Boston, Mass. (and not routed through San Francisco, Calif.). This billing arrangement may be particularly attractive to a service provider because, in cases where most of the cost of the call is associated with the connection between Washington, D.C. and Boston, Mass., the sum of the amount paid by the calling party and the called party may be greater than the actual cost of the call. In other words, the bill amount for the calling party (i.e., the equivalent cost of a call between Washington, D.C. and San Francisco, Calif.) and the bill amount for the called party (i.e., the equivalent cost of a call between San Francisco, Calif. and Boston, Mass.) may be more than the actual cost of the call (i.e., based on the cost of the call between Washington, D.C. and Boston, Mass.).

In another embodiment, the bill for a forwarded call can be apportioned so that the calling party is billed for the equivalent cost of a call between the originating location and the terminating location, and the called party is billed for the actual cost of the call (e.g., the cost for a call between the originating location and the forwarding location) minus the bill amount for the calling party (i.e., the equivalent cost of a call between the originating location and the terminating location). Following the previous example, the calling party would be billed for the equivalent cost of a call between Washington, D.C. and San Francisco, Calif.; the called party would be billed for the cost of the call between Washington, D.C. and Boston, Mass., minus the bill amount for the calling party (i.e., the equivalent cost for a call between Washington, D.C. and San Francisco, Calif.).

Similarly, in another embodiment, the bill for a forwarded call can be apportioned so that the called party is billed for the equivalent cost of a call between the terminating location and the forwarding location, and the calling party is billed for the actual cost of the call (e.g., the cost for a between the originating location and the forwarding location) minus the bill amount for the called party (i.e., the equivalent cost of a call between the terminating location and the forwarding location). Again, following the previous example, the called party would be billed for the equivalent cost of a call between San Francisco, Calif. and Boston, Mass.; the calling party would be billed for the cost of the call between Washington, D.C. and Boston, Mass., minus the bill amount for the called party (i.e., the equivalent cost for a call between San Francisco, Calif. and Boston, Mass.).

8. Lawfully-Authorized Electronic Surveillance

Embodiments of the present invention allow for the efficient electronic surveillance of a call when lawfully authorized. This capability is particularly advantageous where the call being surveilled transmits over a network that uses packet-switched technologies which present different technical challenges from traditional circuit-switched technologies. For example, packet-mode communication allows packetized information for a call to follow different physical paths through the communication network; consequently, surveillance of call(s) in packet-mode communication can be more difficult than traditional circuit-switched communication having a fixed physical path for calls being surveilled.

The particular information related to the surveilled call that is provided to the law enforcement authorities is typically specified by such legislation as the Communications Assistance for Law Enforcement Act of 1994 (CALEA). Generally speaking, upon request from a law enforcement authority, a service provider provides call-identifying information and call content to the law enforcement authority for calls related to a particular subscriber. Call-identifying information can include, for example, dialing or signaling information that identifies the origin, direction, destination or termination of each communication. Note that the call content can include voice associated with the call (e.g., the content on the bearer channel), but typically not data associated with the call (e.g., data files or graphics).

The term "bearer channel" is intended to mean the portion of a call relating to the basic communication channel. The "bearer channel" typically would not include any enhanced or value-added services other than those required by the law enforcement agency (presumably, as specified by the enabling legislation) and those related to bandwidth transmission capability.

Figure 36:
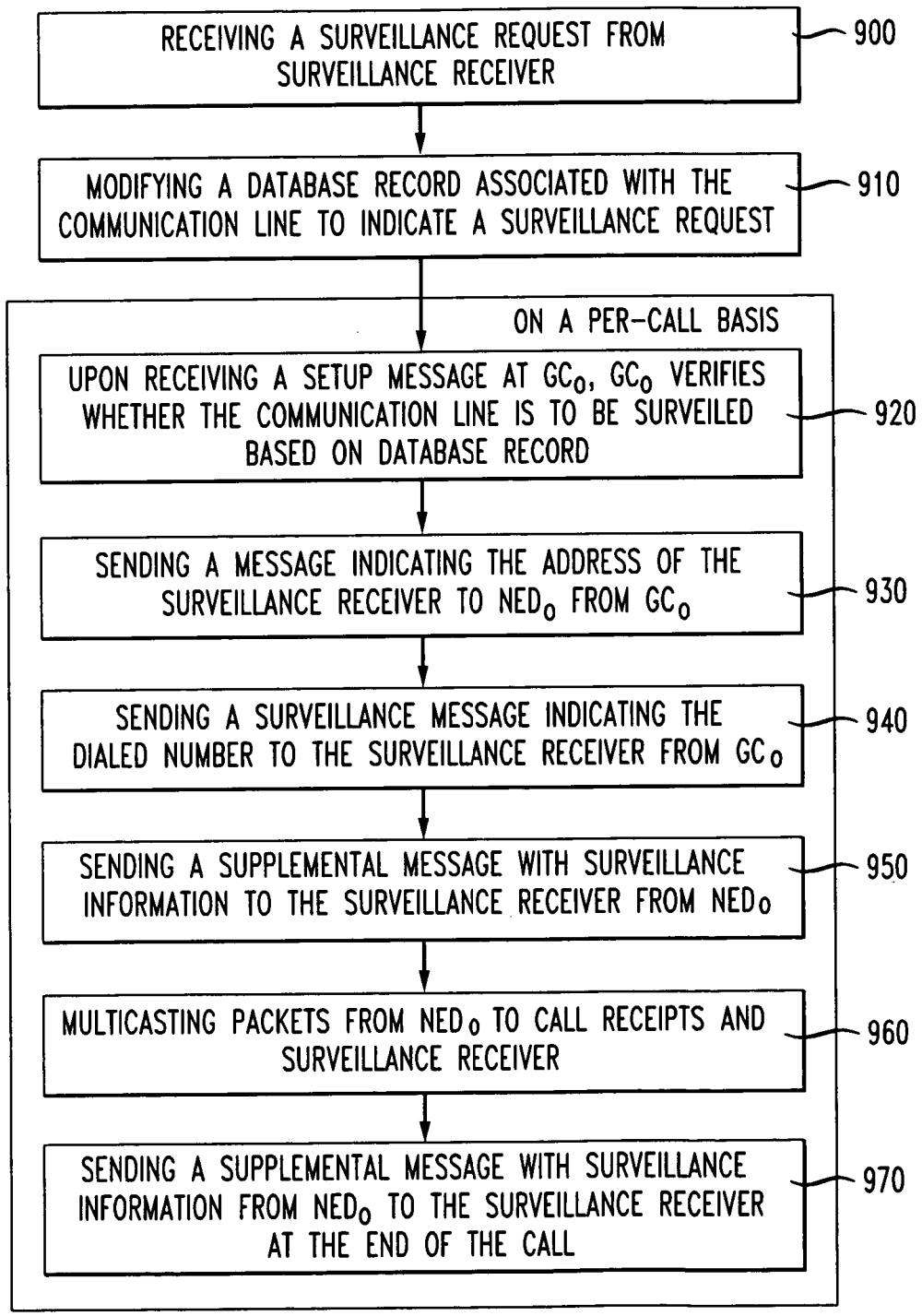
FIG. 36 illustrates a flow chart for performing lawfully authorized electronic surveillance, according to an embodiment of the present invention.

FIG. 36 illustrates a flow chart for performing lawfully-authorized electronic surveillance, according to an embodiment of the present invention. At step 900, a surveillance request from a surveillance receiver is received by the service provider (e.g., the entity operating communication network 100). The request relates to a particular subscriber; calls on the line involving the telephone and/or communication device associated subscriber are to be surveilled.

At step 910, a database record associated with the communication line to be surveilled is modified to indicate that a surveillance request has been made. The database record for this particular communication device can be stored in a database associated with the communication line being surveilled. For example, referring to FIG. 1 where the calling party using telephone 190 and/or communication device 180 is to be surveilled, database storage 140 can contain the database record for that calling party. In other words, where the calling party to be surveilled uses, for example, telephone 190 and/or communication device 180, the originating gate controller 110 is the gate controller associated with that calling party and the database storage 140 is the database associated with that gate controller.

Once a particular communication line associated with a particular party has been identified as requiring surveillance, future calls associated with that line can be surveilled on a continuing, per call basis. As shown in FIG. 36, steps 900 and 910 are typically performed before surveillance for a particular party is performed; steps 920 through 970 are typically performed for each call subsequent to the specification of a party to be surveilled (i.e., steps 900 and 910).

At step 920, upon receiving a setup message at originating gate controller 110 in the normal course of setting up calls as described elsewhere herein, the originating gate controller 110 verifies whether the communication line is to be surveilled; this verification confirms that the call is associated with a subscriber to be surveilled based on the database record associated with that subscriber and modified in step 910. This verification process of step 920 is generally performed on a per call basis.

At step 930, a message indicating the address of the surveillance receiver (not shown in FIG. 1) is sent from originating gate controller 110 to originating NED 120. The message indicating the address of the surveillance receiver can be, for example, a gate open message sent from the originating gate controller 110 to the originating NED 120.

At step 940, a surveillance message indicating the dialed number is sent from originating gate controller 110 to the surveillance receiver (not shown in FIG. 1) which is connected to communication network 100. At step 950, a supplemental message with surveillance information is sent from originating NED 120 to the surveillance receiver at the start of the call. The surveillance information contained within the supplemental message sent in step 950 can be that as required by the law enforcement agency (e.g., an indication of the start of the call).

At step 960, a copy of the packets associated with the call are multicast from the originating NED 120 to the call recipients and to the surveillance receiver. In this embodiment, the call recipients can be, for example, the called party associated with the dialed number for packets being sent from the calling party to the called party. Similarly, the call recipients can be the calling party for those packets being sent from the called party to the calling party. Of course, the call recipients can also include other parties where, for example, the call involves a conference of more than two parties. In other words, packets associated with the call are multicast to the call recipients and to the surveillance receiver regardless of the flow direction of the packets. In one embodiment, only the bearer channel associated with the call is to be surveilled; in this embodiment, only packets associated with the bearer channel are multicast to the call recipients and to the surveillance.

Co-pending and commonly assigned patent application Ser. No. 08/746,364, entitled "Promiscuous Network Monitoring Utilizing Multicasting within a Switch" provides a further details for multicasting packets. More specifically, this co-pending application discusses the process for selecting a subset of packets (e.g., packets associated with a sender or receiver) and multicasting those packets from the sender to the receiver and to a third party. This co-pending application is incorporated herein by reference.

At step 970, a supplemental message with surveillance information is sent from originating NED 120 to the surveillance receiver at the end of the call. Again this surveillance information indicated within this supplemental message sent to step 970 can be that as required by the law enforcement agency (e.g., an indication of the end of the call).

Although FIG. 36 is discussed in reference to a communication line to be surveilled is associated with telephone 190 and/or communication device 180, which are used by the calling party, the process described in FIG. 36 can be easily modified to address other situations. For example, surveillance of the call can be established through either the originating gate controller (e.g., gate controller 110 when the calling party uses telephone 190 and/or communication device 180) or the terminating gate controller (e.g., gate controller 111 when the called party uses telephone 191 and/or communication device 181). Similarly, the network edge device performing the multicasting of packets for the call under surveillance can be the network edge device that is associated with the particular gate controller establishing surveillance (i.e., the originating NED or the terminating NED).

Note also that multicasting can be performed for any packets associated with the call for a particular communication line regardless of the particular direction of those packets. In other words, packets sent from a calling party to the called party can have a copy multicast to the surveillance receiver; similarly packets sent from the called party to the calling party can have a copy multicast to the surveillance receiver.

An additional discussion of the performing electronic surveillance of a call when lawfully authorized, according to an embodiment of the present invention, is discussed below in Section 11.2.10.

9. Segmented Resource Reservation

In embodiments of the present invention, segmented resource reservation is performed for at least one call. Network resources associated with a first network are reserved according to that network's own reservation policy and based on an indication from a calling party. For the at least one call, network resources associated with a second network are reserved according to its own reservation policy and based on an indication from a called party. The second network is coupled to the first network.

The term "network resources" is used herein to refer to the facilities of a communications network required for a call and any auxiliary services associated with that call. Network resources can include, for example, the capabilities or capacities of equipment within the communications network needed to establish and maintain a call at an appropriate quality of service. The equipment within the communications network can include, for example, routers, bridges and gateways within the communications network.

Network resources are "reserved" in the sense that the network resources required for a particular call can be identified before the called party is actually connected to the calling party. These network resources can be reserved through the appropriate signal messages collectively referred to herein as a "reservation request". After the appropriate network resources have been reserved based on the reservation request, these network resources are committed when the called party indicates acceptance for the call.

The term "reservation policy" is used herein to describe the set of rules that define how resources for a given network are reserved. A reservation policy, as used herein, can be particular for a given network; in other words, each network can have its own reservation policy that defines how resources for that network are reserved. A reservation policy can have various characteristics that define a type of reservation made for the network resource; such characteristics can indicate, for example, a uni-directional or a bi-directional capacity within a network. A reservation policy can be specified by, for example, the Multimedia Cable Network System Partners Ltd. (MCNS) protocol entitled Data Over Cable Service Interface Specification (DOCSIS); this protocol, for example, can reserve a constant-bit-rate channel in an access network.

The term "coupled" is used herein to describe the connection of two networks where intervening components, systems or even networks may exist. For example, an access network can be coupled to a communication network in the sense that the access network can be connected to the communication network through a network edge device. Similarly, one access network can be coupled to another access network in the sense that two access networks can be interconnected through a communication network, such as, for example, a backbone network and any intervening network edge devices.

A process for performing segmented reservation of network resources, according to an embodiment of the present invention is described in connection with FIG. 37, and can be related to the process described above in Section 2 entitled Two-Phase Network Resource Reservation and in reference with FIG. 2. More specifically, Section 2 above describes a process where network resources are first reserved and then committed in separate and distinct phases; steps 240 and 250 of FIG. 2, which reference a portion of the process for reserving network resources, are analogous to the process described in greater detail in reference to FIG. 37.

Figure 37:
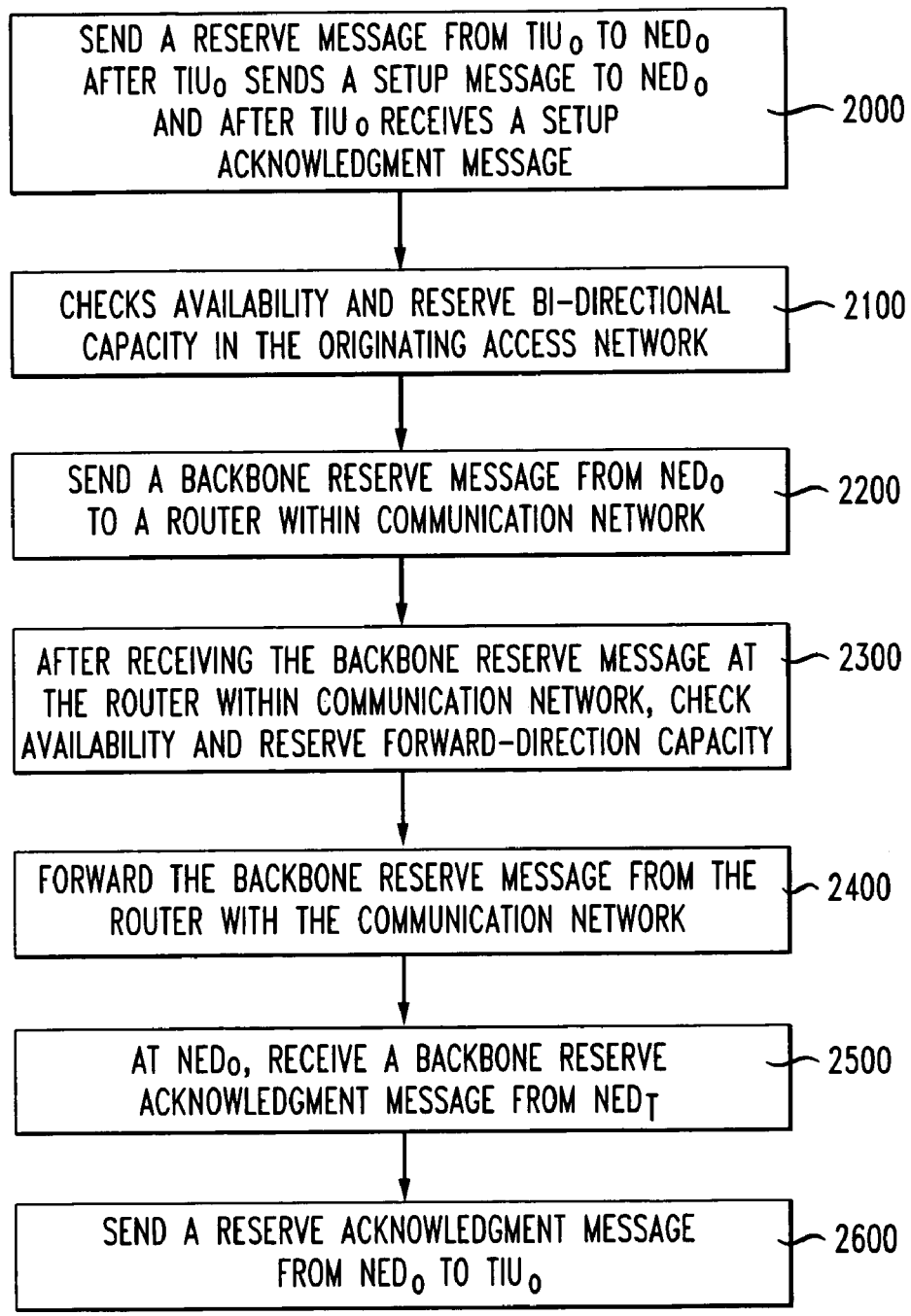
FIG. 37 illustrates a flow chart for performing segmented reservation of network resources, according to an embodiment of the present invention.

Note that FIG. 37 shows a process for segmented reservation of network resources from the perspective of the calling party. A similar process can also occur from the perspective of the called party at a similar point in time. For example, as described below, a reserve message is sent from the originating telephone interface unit (TIU) 170 to reserve network resources within the originating access network 150; at a similar point in time, a reserve message is also sent from the terminating TIU 171 to reserve network resources within the terminating access network 151. For another example, network resources within the communication network 100 are reserved in a forward direction (i.e., a unidirectional capacity reservation for data flow from originating NED 120 to the terminating NED 121) when a backbone reserve message is sent from the originating network edge device (NED) 120; at a similar point in time, network resources within the communication network 100 are reserved in the opposite direction for data flow from the terminating NED 121 to the originating NED 120 when a backbone reserve message is sent from terminating NED 121. In sum, although FIG. 37 is from the perspective of the called party, an analogous process also occurs from the perspective of the called party.

At step 2000, a reserve message is sent from the originating TIU 170 to the originating NED 120, after the originating TIU 170 sends a setup message to the originating NED 120 and receives a setup acknowledgment message from the originating NED 120. As described above in Section 2, entitled "Two-phase Network Resource Reservation", a gate for the call is established at the originating NED 120 upon receipt of the setup message. This gate defines a maximum limit (or upper envelope) of possible network resources that can be reserved for the call(s) of the called party. The gate can define the maximum limit of network resources to be reserved for the originating access network 150. In one embodiment, the gate can define the maximum limit of network resources to be reserved for both the originating access network 150 and the communication network 100.

At 2100, upon receiving the reserve message at the originating NED 120, the NED 120 checks the availability of and reserves bi-directional capacity in the originating access network 150. The network resource capacity reserved in the originating access network 150 is bi-directional in the sense that network resources needed to send and receive data across access network 150 are reserved; in other words, the network resources are reserved for data flow from the originating TIU 170 to the originating NED 120 and for data flow from the originating NED 120 to the originating TIU 170. A reservation policy for access network 150 can be specified by, for example, the Multimedia Cable Network System Partners Ltd. (MCNS) protocol entitled Data Over Cable Service Interface Specification (DOCSIS); this protocol, for example, can reserve a constant-bit-rate channel in an access network.

At step 2200, a backbone reserve message is sent from the originating NED 120 to a router (not shown in FIG. 1) within communication network 100. Communication network 100 can be considered a backbone network in the sense that it interconnects multiple access networks (such as, e.g., access networks 150 and 151) through corresponding network edge devices (such, e.g., originating NED 120 and terminating NED 121, respectively).

At step 2300, after receiving the backbone reserve message at a router within communication network 100, that router checks the availability of and reserves forward-direction capacity (i.e., unidirectional capacity) of resources associated with that router. At step 2400, the backbone reserve message is forwarded from the router within the communication network 100 to other router(s) within communication network 100 between that router and the terminating NED 121. Any subsequent router(s) within communication network 100 that receive the backbone reserve message can locally check the availability of and reserve forward-direction capacity at that router, and then forward the backbone reserve message. This process can be repeated until the relevant routers that can define a link from the originating TIU 170 to the terminating NED 121 have received the backbone reserve message and have reserved forward-direction capacity.

Said another way, capacity within the communication network 100 is reserved for data flow generated by the sender of the backbone reserve message. For example, when a backbone reserve message is sent from the originating NED 120 (in response to a reserve message from the originating TIU 170) through router(s) within the communication network 100 to terminating NED 121, then capacity is reserved within communication network 100 for data flow from the originating NED 120 to the terminating NED 121. Similarly, when a backbone reserve message is sent from the terminating NED 121 (in response to a reserve message from the terminating TIU 171) through router(s) within the communication network 100, then capacity is reserved within communication network 100 for data flow from the terminating NED 121 to the originating NED 120. In sum, the reservation policy for reservations within the communication network 100 can be uni-directional. This reservation policy matches the forwarding model typically used in Internet Protocol (IP) networks in which paths can be asymmetric. In an alternative embodiment, the reservation policy for reservations within the communication network 100 can be bidirectional.

Note that although steps 2300 and 2400 are shown in FIG. 37 with respect to a single call initiated by the calling party through the originating TIU 170, in an alternative embodiment, the steps of reserving network resources within communication network 100 can be performed once for a number of calls or not at all for certain calls. In other words, steps 2300 and 2400 can be optional steps for some calls established at originating NED 120.

The originating NED 120 can select a particular reservation policy for the call within communication network 100 from a set of possible reservation policies. Such possible reservation policies include, for example, reserving network resources within communication network on a per-call basis; in this case, a backbone reservation message is to be sent for each call being established through the originating NED 120. This reservation policy may be particularly appropriate when, for example, the communication network 100 is likely to be congested with heavy traffic. Another possible reservation policy can be reserving network resources within communication network 100 on a multiple call basis; in this case, a backbone reservation message is to be sent for a fraction of the calls established at the originating NED 120. This reservation policy may be particularly appropriate when, for example, the communication network 100 is less likely to be congested with heavy traffic. Another possible reservation policy can be that of not reserving network resources within communication network 100. This reservation policy may be particularly appropriate when, for example, the communication network 100 is known to be sufficiently provisioned for the expected amount of traffic.

In sum, the originating NED 120 can select a reservation policy for the communication network 100 dynamically. Originating NED 120 can select a particular reservation policy for communication network 100 at one time and select a different reservation policy at a different time. Consequently, because the reservation policy of the access network can differ from the reservation policy of the communication network 100, network resources within the access networks can be reserved on a per-call basis while the network resources within the communication network 100 can be reserved on a multiple-call basis.

At step 2500, a backbone reserve acknowledgment message is received at the originating NED 120 from the terminating NED 121. This backbone reserve acknowledgment message is sent from the terminating NED 121 to originating NED 120 through the communication network 100. This backbone reserve acknowledgment message indicates that the appropriate network resources in the send direction (i.e., the unidirectional capacity from the originating NED 120 to the terminating NED 121) within the communication network 100 have been reserved.

At step 2600, a reserve acknowledgment message is sent from the originating NED 120 to the originating TIU 170 upon receiving the backbone reserve acknowledgment message at the originating NED 120. The receipt of the reserve acknowledgment message at the originating TIU 170 indicates that network resources have been reserved in both the send and receive direction within the originating access network 150 and in the send direction (i.e., from the originating TIU 170 to the terminating TIU 171) within the communication network 100.

Note that this uni-directional reservation of network resources within the communication network 100 when initiated by the calling party makes possible that network resources within communication network 100 can be reserved in one direction but not yet in the other direction. In other words, upon receiving the reserve acknowledgment message at the originating TIU 170, the reservation of bidirectional capacity in the originating access network 150 and uni-directional capacity in the communication network 100 is acknowledged, but nothing is known (at the originating TIU 170 or NED 120) about reservations within the terminating access network 151 or in the receive direction (from the calling party's perspective) within the communication network 100.

Subsequent to receiving the reserve acknowledgment message, the originating TIU can send a ring message to the terminating TIU 171. Once network resources within the terminating access network 151 (for a bidirection capacity) and within the communication network 100 in the receive direction (from the calling party's perspective) are reserved, the terminating TIU 171 can send a ring back message to the originating TIU 170. By receiving the ring back message at the terminating TIU 170, the terminating TIU 170 is now aware that network resources within terminating access network 151 and in the receive direction (from the calling party's perspective) within the communication network 100 have been reserved.

Note that because the end-to-end route within communication network 100 (i.e., between the originating NED 120 and the terminating NED 121) may change during the duration of the call, the reserve messages can be periodically transmitted from either or both ends (i.e., from the originating TIU 170 and/or the terminating TIU 171) to refresh the reservation within the communication network 100.

Note also the that reserve message sent from the originating TIU 170 to the originating NED 120 can indicate that the Internet Protocol (IP) source address in the reserve message is that of the originating NED 120 and the IP destination address in the reserve message is that of terminating TIU 171. The originating NED 120 can look up the corresponding global IP addresses (as described above in Section 5 entitled Network Address Translation) and the port numbers for the call. In other words, the originating NED 120 can determine the global address and the port number for this call of the originating TIU 170 and of the terminating TIU 171.

Figure 7:
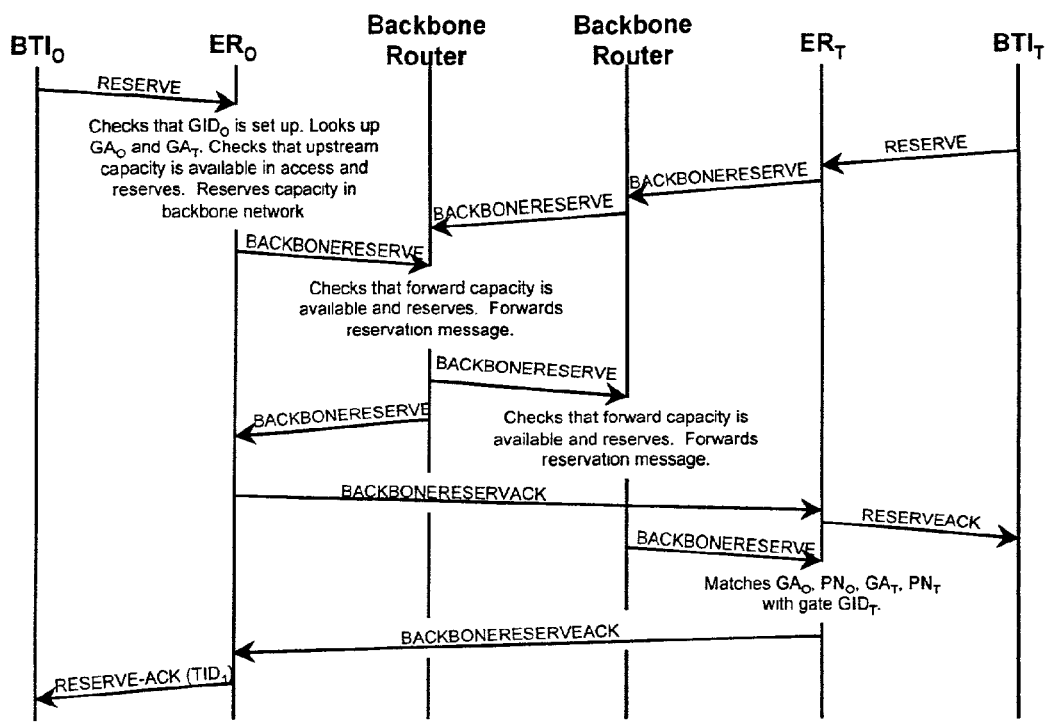
FIG. 7 shows an example signaling call flow for reservation of resources in the segment of the network between the edge routers for a voice call, according to an embodiment of the present invention.

FIG. 37 includes an example for the reserving network resources within the communication network 100 between the originating NED 120 and the terminating NED 121 for a voice call; FIG. 7 (and its associated discussion in Section 11.2.2) shows a corresponding call flow. This is merely one approach for reserving network resources in the communication network 100. It is advantageous that the mechanism (i.e., the reservation policies) for reserving network resources in the access networks is different and separate from that in the communication network 100 which interconnects the access networks. Similarly, the mechanism for reserving network resources within each given access network can differ.

10. Protocol Description

This section contains details of the various protocols associated with embodiments of the present invention. These include the communication between BTI and Gate Controller, between the BTI and Edge Router, between the BTI and other BTIs, between the Gate Controller and Edge Router, between Edge Router and Edge Router, and between Gate Controller and Gate Controller.

All messages are given here in a text-based format, using a type/value structure. This is particularly easy for prototype implementations, and for describing the interactions between network elements. However, if any system components exist where memory is a serious limitation, it is possible that a binary format could be used to conserve buffer space requirements.

A sample message is:
SETUP 0S55072 v1.0; DEST E164 8766; CALLER 8718 Bill Marshall; AUTHID 3312120; CRV 21; CODING 53B,6 ms G.711

Messages consist of a sequence of type/value pairs. Each element of the sequence is separated by a semicolon; a semicolon at the end of the message is optional. The type and value are ascii character strings, separated by white space (e.g. spaces or tabs). Generally every element contains at least two items, the type name and the parameter value, but may contain several white-space separated parameter values.

The first element of every message can be in a standard format. The type of the first element is the message name, the first parameter is the transaction identifier, and the second parameter is the version number (e.g., v1.0 here).

Embodiments of the present invention can use an application-layer retransmission scheme to achieve reliable transport of messages. This can be done independent of any lower layer reliable transmission protocol because the signaling system must also recover from component failures and restart transactions when a component has failed. This often happens after the component has received acknowledged receipt, and has started working on a request; it is up to the application layer to realize that no response is coming and to re-initiate the transaction.

Therefore, the behavior of the network elements can be specified as if the underlying transport is merely UDP/IP, and provides no buffering, flow control, nor error recovery.

All basic message exchanges can be transaction-based. All start with a request message issued by a client, and sent to a server. The client can provide a unique transaction identifier for each separate request, and provide that transaction identifier in the standard place in all messages. The client can insure that the transaction identifier is not reused for any subsequent messages for a period of at least some specified interval (e.g., approximately 30 seconds).

A sample exchange begins with a client forming a request message and sending it to the server:
SETUP 1X64193 v1.0; <other stuff>

The message type is SETUP, the transaction identifier is 1X64193, and the message is using version 1.0. When the server has completed the work requested by this transaction, it sends one of two possible responses:
SETUPACK 1X64193 v1.0; <other stuff>or
SETUPNAK 1X64193 v1.0; <other stuff>.

The server can store all requests it receives for some period of time (e.g., 30 seconds). The server can also store its responses for some period of time (e.g., 30 seconds) in case the responses were lost in transmission and need to be resent.

If a client sends a request but does not receive a response within a reasonable time (which may vary based on message type), it resends the original request, without any modification.

If a server receives a request message that it recognizes as a duplicate (same source, same transaction identifier, same message type, not necessary to compare message content), it either resends its response, if the response has been completed, or sends a pseudo-response:
WORKING 1X64193 v1.0;

The receipt of a WORKING message at the client indicates that the server has received the message, and the response has not yet been sent. It is reasonable for the client to use a longer timer before resending the request again.

In some situations, e.g. the SETUP message, the normal processing time can exceed the timeout period of the client. In that case the server can immediately send the WORKING pseudo-response upon receipt of a request.

Typical timeouts that seem reasonable to use are:
BTI to Edge Router: 0.5 seconds initially, 1 second after WORKING response;
BTI to Gate Controller: 1 second, 2 seconds after WORKING response;
Gate Controller to GC: 1 second, 2 seconds after WORKING response.

10.1 BTI to Gate Controller

The BTI initiates transactions with the Gate Controller to request a new connection to a remote named endpoint, or to request some enhanced service to be performed on an existing connection. In addition to basic connections, this protocol enables all the custom calling features to be implemented, and provides conference control capability.

This protocol can utilize significant intelligence in the BTI, allowing it to completely handle the user interface and to implement new custom services that build on the primitives that exist in the signaling system of embodiments of the present invention.

Messages initiated by the BTI include SETUP, REDIRECT, SPLICE, TRACE, and PROFILE. SETUP is used to initiate a new connection. REDIRECT takes an existing connection and sends it to some other destination. SPLICE takes two existing connections and connects them together. TRACE generates a law-enforcement report of an abusive or harassing call. PROFILE enables the BTI to specify custom call handling services for times when the BTI cannot be contacted (e.g. power failure).

10.1.1 Setup

SETUP is the basic message sent by a BTI to initiate a connection to another endpoint; an example message is:
SETUP 0S55072 v1.0; DEST E164 8766; CALLER 8718; AUTHID 3312120; CRV 21; SIGADDR wtm-bti:7685; DATAADDR wtm-bti:7000 2 2; CODING 53B,6 ms,G.711

DEST specifies the destination of this call. The first parameter in this field gives an address space name to search; valid address spaces are E164 (standard telephone numbers), CINFO (source string from a previous call), and SERVICE (generic network service by name). The second parameter gives the actual telephone number/source string/service name. Further parameters, if given, are passed through and given to the receiving endpoint. Examples of various usages of the DEST element are:

DEST E164 8766 places a new call to a phone number. Second parameter is the number in the customer's dialing plan (e.g. centrex, nanp, etc.)

DEST CINFO <string> places a return call to a previous caller, for example, *69 return call. Second parameter is the string given in a SETUP, SETUPACK, or TRANSFER.

DEST SERVICE bridge 3 places a call to a network service, in this example a bridge service for 3 parties. The second parameter is the name of the network service (e.g. bridge, announcement, etc.) and further parameters are given to that service for further interpretation.

CALLER gives the caller-id value for the line that is originating this call. The Gate Controller must verify that this caller-id is valid based on the AUTHID. Since the BTI is outside out control, we cannot be sure that the call is really coming from the line it claims; however we can ensure that the caller-id specified is one of the possible ones from this BTI.

AUTHID is the authorization code given to this particular BTI from the OAMP system. It is changed periodically, e.g. every ten minutes.

CRV is the Call Reference Value assigned for the BTI's end of this new call. The CRV appears in all messages sent to the BTI, enabling the BTI to correctly assign the message to the proper call, and to properly ignore messages that refer to previous call attempts. Note that multiple race conditions exist if a customer partially completes a call, hangs up, then places another call. The BTI needs some mechanism to ignore stale messages without the need to synchronize with all possible parties prior to processing a new customer request (e.g. give the customer another dialtone).

SIGADDR is the IP system name and port number that the called endpoint should use as a destination for all BTI—BTI messages. This may be the same address and port as is used by the Gate Controller to signal an incoming call, or it may be a separate port for the current call only. If it is the same port, then it is necessary to structure the messages such that the BTI can distinguish GC-BTI messages from BTI—BTI messages, which embodiments of the present invention do.

DATAADDR is the IP system name and port specification that the called endpoint should use as a destination for all voice data packets. The first parameter is a system-name:port-number, where the port number is the lowest port number in a set of consecutive ports. The second parameter gives the size of the set of consecutive ports. The third parameter, if present, gives any alignment requirements of the port numbers if it is necessary to translate them in a PAT server. A typical voice-only telephone call will use two ports, the first for RTP and the second for RTCP, and will require that the first port be even.

CODING specifies a list of possible encapsulations and coding methods that the originator will perform. Each parameter is at least three items separated by commas, where the first item specifies a message size, the second item gives the interval between packets, the third item gives the coding algorithm, and fourth and later items (optional) give additional parameters specific to the coder.

10.1.1.1 SETUP Acknowledgment

The response to a SETUP message is SETUPACK or SETUPNAK. A sample SETUPACK message is:
SETUPACK 0S55072 v1.0; CRV 3712;
SIGADDR 10.0.0.1:5134; DATAADDR 10.0.0.1:5136 2;
CODING 53B,6 ms,G.711; GATEIP 135.207.31.1:7682; GATEID 17S63224; CINFO <string>

CRV gives the Call Reference Value assigned by the remote endpoint to identify all messages associated with the conversation. It must be included in all BTI—BTI messages.

SIGADDR gives the address and port to use as a destination for all BTI—BTI signaling messages.

DATAADDR gives the address and ports to use as a destination for all voice data packets. The second parameter gives the number of consecutive ports allocated for this purpose.

CODING gives the single encapsulation and coding method, of the choices presented in the SETUP message, that is acceptable to the destination BTI. Format of the parameter is identical to that given above.

GATEIP gives the IP address and port number of the Edge Router that contains the gate controlling access service for this connection. This is the destination address to use for all BTI-ER messages.

GATEID gives the identification and authorization token assigned by the Edge Router for the gate allocated for this connection.

CINFO is an encrypted string of information from the Gate Controller, containing a number of items of state information needed by the Gate Controller to properly handle any future requests for advanced features for this call, e.g. 3-way calling, return call, transfer, etc. It must be stored unaltered by the BTI and returned to the Gate Controller unaltered for any of these features.

10.1.1.2 SETUP Error

If the SETUP fails, the Gate Controller will return an error indication to the BTI. A sample SETUPNAK message is:

SETUPNAK 0S55072 v1.0; ERROR Authorization failed

ERROR gives an error message string, which could be displayed if the BTI has some method to do so. Otherwise it provides some useful debugging information.

10.1.2 REDIRECT

The BTI sends a REDIRECT message to its Gate Controller when it wants a current call to be directed to some other destination. A sample REDIRECT message is:

REDIRECT 0S42115 v1.0; DEST E164 8720; CALLER 8766; AUTHID 6929022;
CINFO
135.207.31.2:7650/135.207.31.1:7682/17S63224/ 10.0.12.221:7685/10.0.12.221: 7000-2-2/ 9733608718/21/10.0.12.221:7685

DEST gives the new desired destination of this call. It may be either an E164 number, a service name, or a CINFO string, just as in the SETUP message.

CALLER gives the caller-id value for the line that is making the request. The Gate Controller must verify that this caller-id is valid based on the AUTHID. Since the BTI is outside our control, we cannot be sure that the call is really coming from the line it claims; however we can ensure that the caller-id specified is one of the possible ones from this BTI.

AUTHID is the authorization code given to this particular BTI from the OAMP system. It is changed periodically, e.g. every ten minutes. CINFO is the encrypted string previously supplied by the Gate Controller, which tells the Gate Controller various pieces of information about the current call.

10.1.2.1 REDIRECT Acknowledgment

If the Gate Controller is successful in directing the call to the new destination, it will respond with a REDIRECTACK message. A sample is:

REDIRECTACK 0S42115 v1.0;

10.1.2.2 REDIRECT Error

If the REDIRECT fails, the Gate Controller will return an error indication to the BTI. A sample REDIRECTNAK message is:

REDIRECTNAK 0S55072 v1.0; ERROR Authorization failed

ERROR gives an error message string, which could be displayed if the BTI has some method to do so. Otherwise it provides some useful debugging information.

10.1.3 SPLICE

The BTI sends a SPLICE message to its Gate Controller when it wants two current calls to be connected together. A sample SPLICE message is:

SPLICE 0S42161 v1.0; CALLER 8766; AUTHID 6929022;
CINFO1
135.207.31.2:7650/135.207.31.1:7682/17S63224/ 10.0.12.221:7685/10.0.12.221: 7000-2-2/ 9733608718/21/10.0.12.221:7685;
CINFO2
135.207.31.2:7650/135.207.22.1:7682/5S71731/ 10.3.7.150:7685/10.3.7.150: 7000-2-2/9733608720/ 8839/10.3.7.150:7685

CALLER gives the caller-id value for the line that is making the request. The Gate Controller must verify that this caller-id is valid based on the AUTHID. Since the BTI is outside our control, we cannot be sure that the call is really coming from the line it claims; however we can ensure that the caller-id specified is one of the possible ones from this BTI.

AUTHID is the authorization code given to this particular BTI from the OAMP system. It is changed periodically, e.g. every ten minutes.

CINFO1 is the encrypted string previously supplied by the Gate Controller, which tells the Gate Controller various pieces of information about the first call.

CINFO2 is the encrypted string previously supplied by the Gate Controller, which tells the Gate Controller various pieces of information about the second call.

10.1.3.1 SPLICE Acknowledgment

If the Gate Controller is successful in directing the two calls to each other, it will respond with a SPLICEACK message. A sample is:

SPLICEACK 0S42161 v1.0;

10.1.3.2 SPLICE Error

If the SPLICE fails, the Gate Controller will return an error indication to the BTI. A sample SPLICENAK message is:

SPLICENAK 0S55072 v1.0; ERROR Authorization failed

ERROR gives an error message string, which could be displayed if the BTI has some method to do so. Otherwise it provides some useful debugging information.

10.1.4 TRACE

The BTI sends a TRACE message to its Gate Controller when it to report an abusive or harassing phone call to law enforcement. A sample TRACE message is:

TRACE 0S42115 v1.0; CALLER 8766; AUTHID 6929022;
CINFO
135.207.31.2:7650/135.207.31.1:7682/17S63224/ 10.0.12.221:7685/10.0.12.221: 7000-2-2/ 9733608718/21/10.0.12.221:7685

CALLER gives the caller-id value for the line that is making the request. The Gate Controller verifies that this caller-id is valid based on the AUTHID. Because the BTI is outside the control of the service provider, the service provider cannot be sure that the call is really coming from the line it claims; however the service provider can ensure that the caller-id specified is one of the possible ones from this BTI.

AUTHID is the authorization code given to this particular BTI from the OAMP system. It is changed periodically, e.g. every ten minutes.

CINFO is the encrypted string previously supplied by the Gate Controller, which tells the Gate Controller various pieces of information about the call.

10.1.4.1 TRACE Acknowledgment

If the information in the TRACE message is valid, the Gate Controller will respond with a TRACEACK message. A sample message is:

TRACEACK 0S42115 v1.0;

10.1.4.2 TRACE Error

If the TRACE fails, the Gate Controller will return an error indication to the BTI. A sample TRACENAK message is:

TRACENAK 0S55072 v1.0; ERROR Authorization failed

ERROR gives an error message string, which could be displayed if the BTI has some method to do so. Otherwise it provides some useful debugging information.

10.1.5 PROFILE

The BTI sends a PROFILE message to its Gate Controller when the call is to be forwarded to a pre-determined number to obtain the pre-determined number.

10.1.5.1 PROFILE Acknowledgment

If the PROFILE is valid, the Gate Controller will respond with a PROFILEACK message.

10.1.5.2 PROFILE Error

If the PROFILE fails, the Gate Controller will return an error indication to the BTI. A sample PROFILENAK message is:

PROFILENAK 0S55072 v1.0; ERROR Authorization failed

ERROR gives an error message string, which could be displayed if the BTI has some method to do so. Otherwise it provides some useful debugging information.

10.2 Gate Controller to BTI

The Gate Controller initiates messages to the BTI to inform it of incoming calls, or to inform it of a change in the status of an existing call.

Messages initiated by the Gate Controller include SETUP, TRANSFER, and CALLHOLD. SETUP is used to inform the BTI of an incoming call, and to ask the BTI the proper handling of this new call request. TRANSFER informs the BTI that a current call has been redirected to a new destination. CALLHOLD informs the BTI that the call has been placed on hold and to temporarily release the resources used by this call.

10.2.1 SETUP

The Gate Controller informs a BTI of an incoming call request with a SETUP message. A sample message is:

SETUP 4T93182 v1.0; DEST 9733608766; CALLER 9733608718; CRV 21; SIGADDR 10.0.0.1:4722; DATAADDR 10.0.0.1:4724 2 2; CODING 53B,6 ms,G.711; GATEIP 135.207.22.1:7682; GATEID 21S11018; CINFO <string>

DEST is the destination E164 address, as given by the originator and expanded to a global addressing plan by the Gate Controller.

CALLER (optional) is the caller-id information. This element is only present if the customer has subscribed to some variant of caller-id service. If the customer has subscribed to calling name service as well, the second parameter will contain the name of the caller. If the originator of the call has specified caller-id blocking, the first parameter will contain "anonymous."

CRV is the Call Reference Value assigned by the destination for this call. It must be included in all BTI—BTI messages to properly identify the call.

SIGADDR gives the address and port number for the destination of all BTI—BTI signaling messages.

DATAADDR gives the address and port number for the destination of voice data packets. The second parameter (optional) gives the number of consecutive ports allocated. The third parameter (optional) gives the alignment information for the port numbers.

CODING specifies a list of possible encapsulations and coding methods that the originator will perform. Each parameter is at least three items separated by commas, where the first item specifies a message size, the second item gives the interval between packets, the third item gives the coding algorithm, and fourth and later items (optional) give additional parameters specific to the coder.

GATEIP gives the IP address and port number of the Edge Router that contains the gate controlling access service for this connection. This is the destination address to use for all BTI-ER messages.

GATEID gives the identification and authorization token assigned by the Edge Router for the gate allocated for this connection.

CINFO is an encrypted string containing internal state information of the Gate Controller, which is to be stored in the BTI and returned with any future enhanced service request related to this call, e.g. 3-way calling, call transfer, etc.

10.2.1.1 SETUP Acknowledgment

If the BTI is willing to accept the incoming call specified in the SETUP message, it responds with SETUPACK. A sample SETUPACK message is:

SETUPACK 4T93182 v1.0; CRV 2712; SIGADDR kkrama-bti:7685;
DATAADDR kkrama-bti:7000 2 2; CODING 53B,6 ms,G.711

CRV is the Call Reference Value assigned by the BTI for this call. It is the value that will appear in all BTI—BTI messages to identify the specific call instance.

SIGADDR is the address and port number where the BTI will listen for BTI—BTI signaling messages.

DATAADDR is the address and port numbers where the BTI will accept voice data packets. The second parameter indicates the number of consecutive ports, and the third parameter gives the alignment necessary if the part numbers are translated by a PAT server.

CODING is the encapsulation style and coding method chosen from those offered.

10.2.1.2 SETUP Error

If the BTI is not willing to accept the incoming call, it responds with SETUPNAK. A sample SETUPNAK message is:

SETUPNAK 4T93182 v1.0; ERROR Busy; FORWARD E164 8800

ERROR gives an error message string, which could be displayed if the Gate Controller has some method to do so, and can be passed back to the originating BTI in a SETUP-NAK message.

FORWARD gives the new destination that the call should be directed to, as a result of the call forwarding algorithm implemented within the BTI. The structure of this element is identical to that of the DEST element of the BTI-GC SETUP message.

10.2.2 TRANSFER

The TRANSFER messages is used by the Gate Controller to inform the BTI of a change in destination of an existing call. The BTI must alter some destination parameters to communicate with this new destination. A sample TRANSFER message is:

TRANSFER 0T5087 v1.0; CRV 21; REMCRV 1025; SIGADDR 135.207.31.3:6026; DATAADDR 135.207.31.3:6028 2; CODING 53B,6 ms,G.711; ROLE orig;
CINFO <string>

CRV gives the Call Reference Value of the call that has been transferred. This parameter is intended to help the BTI determine the proper adjustments.

REMCRV is the Call Reference Value assigned by the party at the other end of the call. This value must be used in all BTI—BTI communication.

SIGADDR is the IP address and port for BTI—BTI signaling messages to the other endpoint.

DATAADDR is the IP address and UDP port specification for voice data packets. The second parameter, if present, gives the number of consecutive port numbers assigned for this connection. The third parameter, if present, tells any alignment necessary for the port numbers.

CODING tells the encapsulation scheme and coding method to use for this connection.

ROLE tells whether the BTI should consider itself the originator or terminator of this conversation.

CINFO is an encrypted string of information about the other end of the conversation, to be stored in the BTI, for use for future enhanced services that may be requested.

10.2.2.1 TRANSFER Acknowledgment

If the BTI is able to identify the call given in the TRANSFER message, adjust its internal state, and allocate resources to the new destination, it responds with TRANSFERACK. A sample TRANSFERACK message is:

TRANSFERACK 0T5087 v1.0;

10.2.2.2 TRANSFER Error

If the BTI is not willing to accept the transferred call, it responds with TRANSFERNAK. A sample TRANSFERNAK message is:

TRANSFERNAK 0T5087 v1.0; ERROR Resource reservation to new destination failed

ERROR gives an error message string, which could be displayed if the Gate Controller has some method to do so, and can be passed back to the originating system in a NAK message.

10.2.3 CALLHOLD

The BTI must be placed on hold while gate adjustments are performed. In most cases this is handled by the BTI—BTI HOLD message. In some situations, it must be done by the Gate Controller, and is performed by issuing the CALLHOLD message. A sample CALLHOLD message is:

CALLHOLD 2T10477 v1.0; CRV 21

CRV is the Call Reference Value assigned by the BTI for this conversation.

10.2.3.1 CALLHOLD Acknowledgment

After the BTI has placed itself in a hold status, it responds with CALLHOLDACK. A sample CALLHOLDACK message is:

CALLHOLDACK 2T10477 v1.0;

10.2.3.2 CALLHOLD Error

If the BTI is not able to process the HOLD request, it responds with CALLHOLDNAK. A sample CALLHOLDNAK message is:

CALLHOLDNAK 2T10477 v1.0; ERROR Illegal Call Reference Value

ERROR gives an error message string, which could be displayed if the Gate Controller has some method to do so, and can be passed back to the originating system in a NAK message.

10.3 BTI to Edge Router

Resource allocation messages are exchanged between the BTI and the Edge Router for reservation and release of network resources. These messages all have a reference to a "Gate," which must have been initialized by a Gate Controller prior to the BTI's resource reservation request.

Messages initiated by the BTI include RESERVE, COMMIT, RERESERVE, RECOMMIT, RELEASE, HOLD, and KEEPALIVE. RESERVE is the normal first step in the reservation protocol, where it requests an allocation of resources but does not require them to be assigned. COMMIT requests the actual assignment of resources to this conversation. RERESERVE is used in cases where the BTI already has some resources either reserved or committed to it and is willing to use them to satisfy this new request. RECOMMIT serves a similar function when the resources are to be committed to this new connection. RELEASE is the indication from the BTI that a connection should be terminated. HOLD indicates to the Edge Router that the voice data stream is temporarily stopping, and to stop monitoring the data stream, but to maintain the resources as reserved. KEEPALIVE is sent periodically in the held state to the Edge Router to maintain the resource reservation; a lack of keepalives indicates a (probably undesirable) call termination.

10.3.1 RESERVE

The RESERVE message is sent by the BTI in the first stage of resource allocation. A sample RESERVE message is:

RESERVE 0S55073 v1.0; GATEID 17S63224; BANDWIDTH 53B,6 ms

GATEID is the identification of the gate, as assigned by the Edge Router. Included in this string is the security authorization that indicates the sender is allowed to perform operations on this gate.

BANDWIDTH is the specification of the actual bandwidth desired at this time. It is specified as packet size, in bytes, and inter-packet interval. This value is compared to the value (e.g., in bits per second) by the Gate Controller in the GATESETUP message.

10.3.1.1 RESERVE Acknowledgment

If the resource reservation is successful, meaning bandwidth is available both upstream and downstream in the access network, and bandwidth is available in the forward direction in the backbone network, the Edge Router responds with a RESERVACK message. A sample message is:

RESERVEACK 0S55073 v1.0;

10.3.1.2 RESERVE Error

If the resource reservation fails, the Edge Router responds with a RESERVENAK message. A sample message is:

RESERVENAK 0S55073 v1.0; ERROR No upstream capacity available

ERROR gives an error message string, which could be displayed if the BTI has some method to do so, or can simply result in a fast busy signal.

10.3.2 COMMIT

The COMMIT message is sent by the BTI in the second stage of resource allocation. On receipt of a COMMIT message, the Edge Router resets the gate timer to a smaller interval (for example, approximately 2 seconds). If that timer expires before the COMMITACK is sent, the gate is terminated. A sample COMMIT message is:

COMMIT 0S55074 v1.0; GATEID 17S63224; BANDWIDTH 53B,6 ms

GATEID is the identification of the gate, as assigned by the Edge Router. Included in this string is the security authorization that indicates the sender is allowed to perform operations on this gate.

BANDWIDTH is the specification of the actual bandwidth desired at this time. It is specified as packet size, in bytes, and inter-packet interval. This value is compared to the value (e.g., in bits per second) by the Gate Controller in the GATESETUP message.

10.3.2.1 COMMIT Acknowledgment

If the resource allocation is successful, meaning bandwidth has been allocated in the access network (e.g. via unsolicited grants), and the Edge Router has successfully coordinated with its remote Edge Router at the other end of the call, the Edge Router responds with a COMMITACK message. A sample message is:

COMMITACK 0S55074 v7.0;

10.3.2.2 COMMIT Error

If the resource allocation fails, or the coordination with the remote gate does not complete within the allotted interval, the Edge Router responds with a COMMITNAK message. It is intended that this be a very infrequent event, since it results in the caller hearing first a ringback tone, then turning into a failure tone. Such call defects are limited by the service description to only a few per million completed calls, although deliberate cases of fraud causing this error are not counted. A sample message is:

COMMITNAK 0S55074 v1.0; ERROR Gate coordination failure

ERROR gives an error message string, which could be displayed if the BTI has some method to do so, or can simply result in a fast busy signal.

10.3.3 RERESERVE

The RERESERVE message is sent by the BTI in the first stage of resource allocation when the BTI has a current allocation that the new connection will be re-using. See Section 2 for information about the two stage resource allocation scheme. A sample RERESERVE message is:

RERESERVE 0S42110 v1.0; GATEID 5S71731; PREVGATEID 21S11018; BANDWIDTH 53B,6 ms

GATEID is the identification of the gate, as assigned by the Edge Router. Included in this string is the security authorization that indicates the sender is allowed to perform operations on this gate.

PREVGATEID is the identification of an existing, committed gate, whose resources will be re-used in the current connection.

BANDWIDTH is the specification of the actual bandwidth desired at this time. It is specified as packet size, in bytes, and inter-packet interval. This value is compared to the value (e.g., in bits per second) by the Gate Controller in the GATESETUP message.

10.3.3.1 RERESERVE Acknowledgment

If the resource re-reservation is successful, meaning bandwidth is available both upstream and downstream in the access network, and bandwidth is available in the forward direction in the backbone network, the Edge Router responds with a RERESERVACK message. A sample message is:

RESERVEACK 0S42110 v1.0;

10.3.3.2 RERESERVE Error

If the resource re-reservation fails, the Edge Router responds with a RERESERVENAK message. A sample message is:

RERESERVENAK 0S42110 v1.0; ERROR Illegal previous gate identifier

ERROR gives an error message string, which could be displayed if the BTI has some method to do so, or can simply result in a fast busy signal.

10.3.4 RECOMMIT

The RECOMMIT message is sent by the BTI in the second stage of resource allocation when a previous allocation is to be re-used. See Section 2 for information about the two stage resource allocation scheme. On receipt of a RECOMMIT message, the Edge Router resets the gate timer to a smaller interval (for example, approximately 2 seconds). If that timer expires before the RECOMMITACK is sent, the gate is terminated. A sample RECOMMIT message is:

RECOMMIT 0S42111 v1.0; GATEID 5S71731; PREVGATEID 21S11018; BANDWIDTH 53B,6 ms

GATEID is the identification of the gate, as assigned by the Edge Router. Included in this string is the security authorization that indicates the sender is allowed to perform operations on this gate.

PREVGATEID is the identification of an existing, committed gate, whose resources may be re-used in the current connection.

BANDWIDTH is the specification of the actual bandwidth desired at this time. It is specified as packet size, in bytes, and inter-packet interval. This value is compared to the value (e.g., in bits per second) by the Gate Controller in the GATESETUP message. The value given in the COMMIT can be no greater than that from the value in the RESERVE message.

10.3.4.1 RECOMMIT Acknowledgment

If the resource allocation is successful, meaning bandwidth has been allocated in the access network (e.g. via unsolicited grants), and the Edge Router has successfully coordinated with its remote Edge Router at the other end of the call, the Edge Router responds with a RECOMMITACK message. A sample message is: RECOMMITACK 0S42111 v1.0;

10.3.4.2 RECOMMIT Error

If the resource allocation fails, or the coordination with the remote gate does not complete within the allotted interval, the Edge Router responds with a RECOMMITNAK message. It is intended that this be a very infrequent event, since it results in the caller hearing first a ringback tone, then turning into a failure tone. Such call defects are limited by the service description to only a few per million completed calls, although deliberate cases of fraud causing this error are not counted. A sample message is:

RECOMMITNAK 0S42111 v1.0; ERROR Gate coordination failure ERROR gives an error message string, which could be displayed if the BTI has some method to do so, or can simply result in a fast busy signal.

10.3.5 RELEASE

The BTI sends the RELEASE message to the Edge Router when the call has completed, and the resources are to be released and billing is to stop. A sample message is:

RELEASE 0S55075 v1.0; GATEID 17S63224

GATEID is the identification of the gate that was assigned for this conversation, and which is now to be released.

10.3.5.1 RELEASE Acknowledgment

The Edge Router always responds to a RELEASE message with RELEASEACK. If a gate existed with the indicated identification, then it is closed, its resources released, a billing event is generated, and a GATECLOSE message is sent to the corresponding Edge Router at the other end of the connection. A sample message is:

RELEASEACK 0S55075 v1.0;

10.3.5.2 RELEASE Error

The Edge Router always responds to a RELEASE with a RELEASEACK. There are no error indications generated. If the gate identification does not exist, the Edge Router assumes the gate has already been closed by the remote end.

10.3.6 HOLD

If the BTI wants to place a current call on hold, it must inform the Edge Router that its upstream data stream will stop. Otherwise, the Edge Router will interpret the lack of data as a hangup indication and terminate the call. This is done by a HOLD message. A sample message is:

HOLD 0S55090 v1.0; GATEID 17S63224

GATEID is the identification of the gate, as assigned by the Edge Router. Included in this string is the security authorization that indicates the sender is allowed to perform operations on this gate.

10.3.6.1 HOLD Acknowledgment

If the hold operation is successful, meaning bandwidth has been placed back in the pool of reserved but not yet committed, the Edge Router responds with a HOLDACK message. A sample message is:

HOLDACK 0S55090 v1.0;

10.3.6.2 HOLD Error

If the hold operation fails the Edge Router responds with a HOLDNAK message. A sample message is:

HOLDNAK 0S55090 v1.0; ERROR Gate not yet committed

ERROR gives an error message string, which could be displayed if the BTI has some method to do so, or can simply result in a fast busy signal.

10.3.7 KEEPALIVE

While having a connection on hold, it is necessary for the BTI to periodically inform the Edge Router that it is still alive and healthy, and that the reservation should be maintained. Lack of any traffic from the BTI is taken as evidence that the BTI has failed, or that some access component has failed and that the BTI is unable to request a call termination. The safe strategy is to terminate the call, rather than possibly charge the customer for a length service outage. A sample KEEPALIVE message is:

KEEPALIVE 21C3972 v1.0; GATEID 17S63224

GATEID is the identification of the gate, as assigned by the Edge Router. Included in this string is the security authorization that indicates the sender is allowed to perform operations on this gate.

There is no error control or retransmission of KEEPALIVE messages. The interval between them is engineered to minimize the chances of false error detection.

10.4 Edge Router to BTI

No messages are initiated by the Edge Router.

10.5 BTI to BTI

There are various end-to-end messages that are exchanged in any signaling system, which are used to coordinate the state of the two endpoints in providing consistent service. In embodiments of the present invention, these are implemented as BTI—BTI signaling messages, are sent directly between the two BTIs involved in the conversation. These are formatted such that they can be processed by the same subroutines as the other messages.

Messages exchanged between BTIs include RING, RINGBACK, CONNECT, HANGUP, HOLD, and RINGTIMEOUT. RING is sent from the originator to the destination to indicate that all appears ready and that the destination should ring the phone. RINGBACK is sent from the destination to the originator to indicate that the phone is ringing. CONNECT is sent from the destination to the originator when the called party answers the phone, or immediately after receipt of RING is the called party is ready. HOLD is sent from either BTI to the other to indicate the call will be placed on hold and to release any real-time resources currently held. HANGUP and RINGTIMEOUT are informational messages to indicate state information that the BTI will receive by other mechanisms as well.

10.5.1 RING

The RING message is sent by the originating BTI when it has received the acknowledgment from its Edge Router that resources are available for the call, and therefore it is time to alert the destination user. A sample message is:

RING 3712 v1.0; CRV 3712

CRV (optional) is the Call Reference Value assigned by the destination BTI. It must appear in the message, but may appear either as the transaction identifier, or as a separate element.

The acknowledgment of RING is either RINGBACK or CONNECT, not a separate RINGACK message.

10.5.2 RINGBACK

When a terminating BTI has completed the resource reservation sequence, and has received a RING message from the originating BTI, its proper response is either RINGBACK or CONNECT. RINGBACK is sent if the destination is not yet ready to receive the call, and that the BTI is ringing the phone. CONNECT means the destination is ready now, and that no ringing is needed (e.g. a voice response system). A sample message is:

RINGBACK 21 v1.0; CRV 21; SOURCE local; TYPE callwaiting

CRV (optional) is the Call Reference Value assigned by the originating BTI. It must appear in the message, but may appear either as the transaction identifier, or as a separate element.

SOURCE (optional) specifies whether the audible ringback tone is to be generated locally by the originating BTI, or whether the destination will generate the tone utilizing the data stream. Due to the resource reservation scheme, SOURCE specified as "remote" can only occur when the destination is a trusted network element that does not need a gate to control access to the network. If not specified, ringback tone is generated locally by the BTI.

TYPE (optional) specifies one of several possible ringback audio sequences. Parameter value "callwaiting" means the special tone sequence indicating the callwaiting alert signal has been given. If the parameter is not given, or not understood, it defaults to "normal".

There is no explicit acknowledgment to RINGBACK. However, if the originating BTI does not receive either RINGBACK or CONNECT in response to its RING message, it will retransmit the RING until a response is received.

10.5.3 CONNECT

The CONNECT message is sent by the terminating BTI when the user has answered and the connection should be established. A sample message is:

CONNECT 21 v1.0; CRV 21

CRV (optional) is the Call Reference Value assigned by the originating BTI. It must appear in the message, but may appear either as the transaction identifier, or as a separate element.

Acknowledgment of the CONNECT message occurs via the COMMIT/COMMITACK exchange with the Edge Router.

10.5.4 HANGUP

This is an information message that is sent by either BTI to the other one to indicate the user is terminating the connection. A sample message is:

HANGUP 3712 v1.0; CRV 3712

CRV (optional) is the Call Reference Value assigned by the originating BTI. It must appear in the message, but may appear either as the transaction identifier, or as a separate element.

There is no acknowledgment of the HANGUP message. There are multiple independent mechanisms that determine that a call has completed and will terminate the billing; since the system must recover from access link failures, BTI hardware/software failures, and power failures, each of which may prevent the BTI from sending the HANGUP message. Therefore its use is not critical.

10.5.5 HOLD

If the BTI wants to place a current call on hold, it must inform the other endpoint that its incoming data stream will stop. Otherwise, the other endpoint will interpret the lack of data as a hangup indication and terminate the call. This is done by a HOLD message. A sample message is:

HOLD 21 v1.0; CRV 21

CRV (optional) is the Call Reference Value assigned by the originating BTI. It must appear in the message, but may appear either as the transaction identifier, or as a separate element.

Note that before stopping the data stream, the BTI must also inform its Edge Router that the data stream will stop, else the Edge Router will terminate the call. This is done via a BTI-ER HOLD message.

10.5.5.1 HOLD Acknowledgment

When a BTI has received a HOLD message from the other endpoint, it adjusts its threshold for considering the connection dead, and responds with the acknowledgment. This message is:

HOLDACK 3712 v1.0; CRV 3712

CRV (optional) is the Call Reference Value assigned by the originating BTI. It must appear in the message, but may appear either as the transaction identifier, or as a separate element.

10.5.6 RINGTIMEOUT

This is an information message that is sent by the terminating BTI to the originator to indicate the user has not answered within the interval they configured, and that the call will be forwarded. A sample message is:

RINGTIMEOUT 3712 v1.0; CRV 3712

CRV (optional) is the Call Reference Value assigned by the originating BTI. It must appear in the message, but may appear either as the transaction identifier, or as a separate element.

There is no error recovery for this message. It is informational only, and serves to tell the originating BTI to stop the ringback tone, and that a transfer is imminent. Without this message the originating BTI will still receive a TRANSFER message from the Gate Controller and handle the call in the same way.

10.5.7 KEEPALIVE

While having a connection on hold, it is necessary for the BTI to periodically inform its peer BTI that it is still alive and healthy, and that the connection should be maintained. Lack of any traffic from the BTI is taken as evidence that the BTI has failed, or that some access component has failed and that the BTI is unable to request a call termination. The safe strategy is to terminate the call, rather than possibly charge the customer for a length service outage. A sample KEEPALIVE message is:

KEEPALIVE 3712 v1.0; CRV 3712

CRV (optional) is the Call Reference Value assigned by the other BTI. It must appear in the message, but may appear either as the transaction identifier, or as a separate element.

There is no error control or retransmission of KEEPALIVE messages. The interval between them is engineered to minimize the chances of false error detection.

10.6 Gate Controller to Edge Router

The protocol between the Gate Controller and Edge Router is for purposes of resource control and resource allocation policy. The Gate Controller implements all the allocation policies, and uses that information to manage the set of gates implemented in the Edge Routers. The Gate Controller initializes the gates with specific source, destination, and bandwidth restrictions; once initialized the BTI is able to request resource allocations within the limits imposed by the Gate Controller.

Messages initiated by the Gate Controller include GATEALLOC, GATESETUP, GATEMODIFY, GATERELEASE, and GATEINFO. GATEALLOC allocates a new gate identifier. GATESETUP initializes all the policy and traffic parameters for the gate, and sets the billing information. GATEMODIFY is used to change any or all of the parameters of an existing gate. GATERELEASE signals the end of the connection, and that the gate and all its resources can be made available to any other requestor. GATEINFO is a mechanism by which the Gate Controller can find out all the current state and parameter settings of an existing gate.

10.6.1 GATEALLOC

A GATEALLOC message is sent by the Gate Controller to allocate a new gate, and establish a GateID, but without setting any of the specific parameters needed for gate operation. A GATESETUP must come later with the operation parameters. On receipt of a GATEALLOC, the Edge Router starts a timer (e.g., approximately 120 seconds), and if the gate has not entered the "commit" state in that time it is released. A sample GATEALLOC message is:

GATEALLOC 4T93176 v1.0; OWNER wtm-bti:7685

OWNER specifies the name of the customer this gate will serve.

10.6.1.1 GATEALLOC Acknowledgment

A sample GATEALLOC message is:

GATEALLOCACK 4T93176 v1.0; GATEID 17S63224; CUSTUSAGE 3

GATEID is the string that identifies the gate that was allocated. It consists of at least two parts, with some (edge-router-specified) separator between them: the identity of the gate that was allocated, and a security code that must be given to the Edge Router in order to affect any change in the gate parameters.

CUSTUSAGE tells the Gate Controller the number of simultaneous gates the customer has currently. This is calculated by a scan of all current gates, comparing the OWNER parameter. If the number of gates assigned to a customer is inconsistent with the service subscribed, the Gate Controller can take appropriate action.

10.6.1.2 GATEALLOC Error

Errors in allocating gates are reported by a GATEALLOCNAK message. A sample is:

GATEALLOCNAK 4T93176 v1.0; ERROR No gates available

ERROR gives an error message string, which could be displayed if the Gate Controller has some method to do so, and can be passed back to the BTI in a SETUPNAK message.

10.6.2 GATESETUP

The GATESETUP message is sent by the Gate Controller to the Edge Router to initialize the operational parameters of the gate. A sample GATESETUP message is:

GATESETUP 4T93181 v1.0; OWNER kkrama-bti:7685; SRCIP 10.3.7.151; DESTIP 10.0.0.1:4724; BANDWIDTH
53B,6 ms,G.711;
ROLE term; REMGATEIP 135.207.31.1:7682; REMGATEID
17S63224;
REFID 135.207.31.2:36123E5C:93178;
BILLDATA 5123-0123-4567-8900/9733608718/9733608766

OWNER (optional) gives the name of the customer this gate will serve. If this parameter is not given, then GATEID is mandatory.

GATEID (optional) gives the string that identifies the gate, with security code. If this parameter is not given, then OWNER is mandatory, and a new gate will be allocated.

SRCIP identifies the source IP address that will appear in all the data packets that go through the gate. Note that the source port number is not specified, and is generally not known or always constant.

DESTIP is the destination IP address that will appear in the IP header, and the destination UDP port number that will appear in the UDP header. Only packets that match the SourceIP/DestinationIP/DestinationPort will obtain the higher Quality of Service provided by the gate.

BANDWIDTH specifies the maximum bandwidth that may be requested through this gate. Although the parameter includes the coding style, it is not used by the gate.

ROLE specifies whether the Edge Router is the originator or terminating side of this conversation. This has importance only if the backbone reservation is bi-directional, and only one of the Edge Routers need do the reservation.

REMGATEIP is the address of the Edge Router at the other end of this connection. All ER—ER gate coordination messages are to be sent to this address and port.

REMGATEID is the identity of the gate at the other end of the connection.

REFID is the unique string that is to appear in billing records for this conversation.

BILLDATA is the charging information that is to appear in billing records for this conversation.

10.6.2.1 GATESETUP Acknowledgment

A sample GATESETUPACK message is:

GATESETUPACK 4T93181 v1.0; GATEID 21S11018; CUSTUSAGE 1

GATEID is the string that identifies the gate that was allocated. It consists of at least two parts, with some (edge-router-specified) separator between them: the identity of the gate that was allocated, and a security code that must be given to the Edge Router in order to affect any change in the gate parameters.

CUSTUSAGE tells the Gate Controller the number of simultaneous gates the customer has currently. This is calculated by a scan of all current gates, comparing the OWNER parameter. If the number of gates assigned to a customer is inconsistent with the service subscribed, the Gate Controller can take appropriate action.

10.6.2.2 GATESETUP Error

Errors in establishing gates are reported by a GATESETUPNAK message. A sample is:

GATESETUPNAK 4T93181 v1.0; ERROR No gates available

ERROR gives an error message string, which could be displayed if the Gate Controller has some method to do so, and can be passed back to the BTI in a SETUPNAK message.

10.6.3 GATEMODIFY

The GATEMODIFY message is sent by the Gate Controller to the Edge Router to modify the operational parameters of an existing gate. A sample GATEMODIFY message is:

GATEMODIFY 2T10486 v1.0; GATEID 17S63224; SRCIP 10.3.7.151; DESTIP 10.0.0.1:4724; BANDWIDTH 53B,6 ms,G.711; ROLE term;
REMGATEIP 135.207.31.1:7682; REMGATEID 17S63224; REFID 135.207.31.2:36123E5C:93178;
BILLDATA 5123-0123-4567-8900/9733608718/9733608766

GATEID gives the string that identifies the gate, with security code.

SRCIP identifies the source IP address that will appear in all the data packets that go through the gate. Note that the source port number is not specified, and is generally not known or always constant.

DESTIP is the destination IP address that will appear in the IP header, and the destination UDP port number that will appear in the UDP header. Only packets that match the SourceIP/DestinationIP/DestinationPort will obtain the higher Quality of Service provided by the gate.

BANDWIDTH specifies the maximum bandwidth that may be requested through this gate. Although the parameter includes the coding style, it is not used by the gate.

ROLE specifies whether the Edge Router is the originator or terminating side of this conversation. This has importance only if the backbone reservation is bi-directional, and only one of the Edge Routers need do the reservation.

REMGATEIP is the address of the Edge Router at the other end of this connection. All ER—ER gate coordination messages are to be sent to this address and port.

REMGATEID is the identity of the gate at the other end of the connection.

REFID is the unique string that is to appear in billing records for this conversation.

BILLDATA is the charging information that is to appear in billing records for this conversation.

10.6.3.1 GATEMODIFY Acknowledgment

A sample GATEMODIFYACK message is:

GATEMODIFYACK 2T10486 v1.0; GATEID 17S63224; CUSTUSAGE 1

GATEID is the string that identifies the gate that was allocated. It consists of at least two parts, with some (edge-router-specified) separator between them: the identity of the gate that was allocated, and a security code that must be given to the Edge Router in order to affect any change in the gate parameters.

CUSTUSAGE tells the Gate Controller the number of simultaneous gates the customer has currently. This is calculated by a scan of all current gates, comparing the OWNER parameter. If the number of gates assigned to a customer is inconsistent with the service subscribed, the Gate Controller can take appropriate action.

10.6.3.2 GATEMODIFY Error

Errors in modifying gates are reported by a GATEMODIFYNAK message.

A sample is:
GATEMODIFYNAK 4T93181 v1.0; ERROR Illegal Gate Identification

ERROR gives an error message string, which could be displayed if the Gate Controller has some method to do so, and can be passed back to the BTI in a SETUPNAK message.

10.6.4 GATERELEASE

When a Gate Controller has transferred a connection, it sends a GATERELEASE message to the Edge Router to release any resources held by the endpoint that is now not part of the call. While the behavior is similar to a RELEASE message from the BTI, it results in a different event recorded in the billing system, and it avoids the normal gate coordination (as the corresponding gate at the other end of the original connection has been redirected to another destination). A sample is:
GATERELEASE 4T93181 v1.0; GATEID 17S63224

GATEID is the string that identifies the gate that was allocated. It consists of at least two parts, with some (edge-router-specified) separator between them: the identity of the gate that was allocated, and a security code that must be given to the Edge Router in order to affect any change in the gate parameters.

ERROR gives an error message string, which could be displayed if the Gate Controller has some method to do so, and can be passed back to the BTI in a SETUPNAK message.

10.6.4.1 GATERELEASE Acknowledgment

A GATERELEASE message always gives a response of GATERELEASEACK. A sample is:
GATERELEASEACK 4T93181 v1.0;

10.6.4.2 GATERELEASE Error

A GATERELEASE message always results in a response of GATERELEASEACK. If the GATEID parameter specifies an invalid gate, the Edge Router assumes the gate has already been closed.

10.6.5 GATEINFO

When a Gate Controller wishes to find out the current parameter settings, or current state, of a gate, it sends to the Edge Router a GATEINFO message. A sample is:
GATEINFO 0T5082 v1.0; GATEID 17S63224

GATEID is the string that identifies the gate that was allocated. It consists of at least two parts, with some (edge-router-specified) separator between them: the identity of the gate that was allocated, and a security code that must be given to the Edge Router in order to affect any change in the gate parameters.

10.6.5.1 GATEINFO Acknowledgment

The message is sent by the Gate Controller to the Edge Router to modify the operational parameters of an existing gate. A sample GATEINFOACK message is:
GATEINFOACK 0T5082 v1.0; GATEID 17S63224;
STATE commit;
SRCIP 10.3.7.151; DESTIP 10.0.0.1:4724; BANDWIDTH 53B,6 ms,G.711;
ROLE term; REMGATEIP 135.207.31.1:7682; REMGATEID 17S63224;
REFID 135.207.31.2:36123E5C:93178;
BILLDATA 5123-0123-4567-8900/9733608718/9733608766

GATEID gives the string that identifies the gate, with security code.

STATE gives the internal state of the gate, one of the following: setup, reserved, commit, or hold.

SRCIP identifies the source IP address that will appear in all the data packets that go through the gate. Note that the source port number is not specified, and is generally not known or always constant.

DESTIP is the destination IP address that will appear in the IP header, and the destination UDP port number that will appear in the UDP header. Only packets that match the SourceIP/DestinationIP/DestinationPort will obtain the higher Quality of Service provided by the gate.

BANDWIDTH specifies the maximum bandwidth that may be requested through this gate. Although the parameter includes the coding style, it is not used by the gate.

ROLE specifies whether the Edge Router is the originator or terminating side of this conversation. This has importance only if the backbone reservation is bi-directional, and only one of the Edge Routers need do the reservation.

REMGATEIP is the address of the Edge Router at the other end of this connection. All ER—ER gate coordination messages are to be sent to this address and port.

REMGATEID is the identity of the gate at the other end of the connection.

REFID is the unique string that is to appear in billing records for this conversation.

BILLDATA is the charging information that is to appear in billing records for this conversation.

10.6.5.2 GATEINFO Error

Errors in fetching gate information are reported by a GATEINFONAK message. A sample is:
GATEINFONAK 0T5082 v1.0; ERROR Illegal Gate Identification ERROR gives an error message string, which could be displayed if the Gate Controller has some method to do so, and can be passed back to the BTI in a SETUPNAK message.

10.7 Edge Router to Gate Controller

No messages are initiated by the Edge Router.

10.8 Edge Router to Edge Router

To prevent some types of theft of service fraud, it is necessary for the Edge Routers to synchronize the gates at opposite ends of a connection. In particular, a gate that is "committed" at one end of a connection, but not at the other, can be used as a high quality data connection, or can be used to fraudulently charge an unsuspecting customer for a lengthy connection.

Messages exchanged between the Edge Routers include GATEOPEN, and GATECLOSE. GATEOPEN is exchanged with the gate that has resources committed to it, and GATECLOSE is exchanged when those resources are released.

Timers within the gate implementation impose strict controls on the length of time these exchanges may occupy.

10.8.1 GATEOPEN

The GATEOPEN message is sent by the Edge Router to its corresponding Edge Router at the other end of a connection on receipt of the COMMIT message from the BTI. A sample message is:

GATEOPEN 21T6572; GATEID 17S63224; BANDWIDTH 53B,6 ms

GATEID is the identification string for the remote gate, including the security code required.

BANDWIDTH is the bandwidth request received in the COMMIT message.

10.8.1.1 GATEOPEN Acknowledgment

On receipt of a GATEOPEN message, the Edge Router responds with a GATEOPENACK. A sample message is:

GATEOPENACK 21T6572 v1.0;

10.8.1.2 GATEOPEN Error

If some error occurs in the processing of a GATEOPEN, the Edge Router responds with GATEOPENNAK. Such a situation can occur when the remote gate times out and releases the gate before the commit sequence completes. A sample message is:

GATEOPENNAK 21T6572 v1.0; ERROR Invalid gate identifier

ERROR gives an error message string, which could be displayed if the Gate Controller has some method to do so, and can be passed back to the BTI in a SETUPNAK message.

10.8.2 GATECLOSE

The GATECLOSE message is sent by the Edge Router to its corresponding Edge Router at the other end of a connection on receipt of the RELEASE message from the BTI. The Edge Router releases any resources held by that gate, stops any unsolicited grants offered on the upstream channel, and frees the gate. A sample message is:

GATECLOSE 21T6583; GATEID 17S63224;

GATEID is the identification string for the remote gate, including the security code required.

10.8.2.1 GATECLOSE Acknowledgment

On receipt of a GATECLOSE message, the Edge Router responds with a GATECLOSEACK. A sample message is:

GATECLOSEACK 21T6583 v1.0;

10.8.2.2 GATECLOSE Error

A GATECLOSE message always results in a response of GATECLOSEACK. If the GATEID parameter specifies an invalid gate, the Edge Router assumes the gate has already been closed.

10.9 Gate Controller to Gate Controller

Messages exchanged between the Gate Controllers include GCSETUP, GCREDIRECT, and GCSPLICE. All occur in situations where the Gate Controller realizes that it cannot complete a request due to the destination being served by a different Gate Controller. These messages package up all the internal state, ask the remote Gate Controller to complete the desired function, then respond with the updated state information. In an implementation of the Gate Controller it is likely that these messages will exist in some internal form to share the implementation of call termination services.

10.9.1 GCSETUP

The GCSETUP message is exchanged between Gate Controllers when different Gate Controllers serve the originating and terminating endpoints of a call. It is basically formed by packaging all the partial state information the originating Gate Controller has assembled, and requesting the terminating Gate Controller to complete the work necessary to initiate the connection.

A sample GCSETUP message is:

GCSETUP 4T93177 v1.0; DEST E164 9733608766; CALLER 9733608718 Bill Marshall;
CRV 21; SIGADDR 135.207.31.1:6000; DATAADDR 135.207.31.1:6002 2 2; REMGATEIP 135.207.31.1:7682;
REMGATEID 17S63224;
CODING 53B,6 ms,G.711; REFID 135.207.31.2:36123E5C:93178;
BILLDATA 5123-0123-4567-8900/9733608718/9733608766;
CINFO 135.207.31.2:7650/135.207.31.1:7682/17S63224/10.0.12.221: 7685/10.0.12.221:7000-2-2/9733608718/21/10.0.12.221:7685

DEST is the destination address for this connection. Its format is the same as in the SETUP message received from the BTI, except that the E164 number, if present, is expanded from the local numbering plan of the customer to the global numbering plan.

CALLER is the caller-id and calling name of the originator of the connection. From the SETUP message received from the BTI, the originating Gate Controller expanded the E164 number to a global numbering plan, and looked up the calling name.

CRV is the Call Reference Value assigned by the originating BTI. Copied from the SETUP message.

SIGADDR is the IP address and port number the destination should use for BTI—BTI signaling messages. This is a global version of the address given in the SETUP message from the BTI, with name to ip-address translation done, and with any NAT/PAT server translation included.

DATAADDR is the IP address and port number the destination should use for data packets. This is a global version of the address given in the SETUP message from the BTI, with name and ip-address translation done, and with any NAT/PAT server translation included. The second and third parameters (optional) in this element give the number of consecutive ports used, and the alignment information needed for the starting port number.

REMGATEIP is the IP address and port number of the Edge Router that contains the gate to be used for this conversation. This is the destination address for all ER—ER communication.

REMGATEID is the gate identifier and security code for the gate within that Edge Router.

CODING is the offered encapsulation methods and coding styles offered by the call originator.

REFID is a unique identifier assigned by the originating Gate Controller, which will appear in all the Billing Records. The REFID is intended to be unique within a period of several months.

BILLDATA is the billing/accounting data indicating the charging arrangement for this conversation.

CINFO is a string generated by the originating Gate Controller that contains all the information needed for future enhanced services that may involve the call originator. This will be encrypted and given to the destination BTI to store. The format is a list of many items separated by slashes, or which the first is the ip address and port of the Gate Controller that built the string. Subsequent items in this string include the address/port of the Edge Router, gate identifier, signaling endpoint address, data endpoint address, the originator's call reference value, and the originator's address for initial call signaling.

10.9.1.1 GCSETUP Acknowledgment

When the terminating Gate Controller has completed the call, it packages up all its assembled state information and passes it back to the originating Gate Controller in the GCSETUPACK message. A sample GCSETUPACK message is:

GCSETUPACK 4T93177 v1.0; CRV 3712;
SIGADDR 135.207.22.1:6142; DATAADDR 135.207.22.1:6146 2 2;
REMGATEIP 135.207.22.1:7682; REMGATEID 21S11018;
CODING 53B,6 ms,G.711;
CINFO 135.207.31.2:7650/135.207.22.1:7682/21S11018/ 10.3.7.151:7685/10.3.7.151: 7000-2-2/9733608766/ 3712/10.3.7.151:7685

CRV is the Call Reference Value assigned by the destination BTI for this conversation. It is passed transparently from the SETUPACK message from the destination BTI.

SIGADDR is the IP address and port number the originator should use for BTI—BTI signaling messages. This is a global version of the address given in the SETUPACK message from the terminating BTI, with name to ip-address translation done, and with any NAT/PAT server translation included.

DATAADDR is the IP address and port number the originator should use for data packets. This is a global version of the address given in the SETUPACK message from the terminating BTI, with name and ip-address translation done, and with any NAT/PAT server translation included. The second and third parameters (optional) in this element give the number of consecutive ports used, and the alignment information needed for the starting port number.

REMGATEIP is the IP address and port number of the Edge Router that contains the gate to be used at the terminating end for this conversation. This is the destination address for all ER—ER communication.

REMGATEID is the gate identifier and security code for the gate within that Edge Router.

CODING is the encapsulation method and coding style accepted by the call destination.

REFID (optional) is a unique identifier assigned by the Gate Controller, which will appear in all the Billing Records. The REFID is intended to be unique within a period of several months. If this parameter appears, it will override the REFID assigned by the originating Gate Controller BILLDATA (optional) is the billing/accounting data indicating the charging arrangement for this conversation. If this parameter appears, it will override the BILLDATA assigned by the originating Gate Controller.

CINFO is a string generated by the terminating Gate Controller that contains all the information needed for future enhanced services that may involve the terminating BTI. This will be encrypted and given to the originating BTI to store. The format is a list of many items separated by slashes, or which the first is the ip address and port of the Gate Controller that built the string. Subsequent items in this string include the address/port of the Edge Router, gate identifier, signaling endpoint address, data endpoint address, the destination's call reference value, and the destination's address for initial call signaling.

10.9.1.2 GCSETUP Error

If the terminating Gate Controller encounters an error while completing a connection request, it responds to the originating Gate Controller with a GCSETUPNAK message. A sample message is:

GCSETUPNAK 4T93 177 v1.0; ERROR No gates available

ERROR gives an error message string, which could be displayed if the Gate Controller has some method to do so, and can be passed back to the BTI in a SETUPNAK message.

10.9.2 GCREDIRECT

The GCREDIRECT message is exchanged between Gate Controllers when different Gate Controllers serve the originating and terminating endpoints of a call. It is basically formed by packaging all the partial state information the first Gate Controller has assembled in its processing of a REDIRECT message, and requesting the terminating Gate Controller to complete the work necessary to redirect the connection.

A sample GCREDIRECT message is:

GCREDIRECT 0T5081 v1.0; DEST E164 9733608800;
BILLDATA 5123-0123-4567-8900/9733608718/ 9733608800;
CINFO 135.207.31.2:7650/135.207.31.1:7682/17S63224/ 10.0.12.221:7685/10.0.12.221: 7000-2-2/ 9733608718/21/10.0.12.221:7685

DEST is the destination address for this new connection. Its format is the same as in the SETUP message received from the BTI, except that the E164 number, if present, is expanded from the local numbering plan of the customer to the global numbering plan.

BILLDATA is the billing/accounting data indicating the charging arrangement for the additional segment of this connection.

CINFO is a string generated by the originating Gate Controller that contains all the information needed for future enhanced services that may involve the call originator. This will be encrypted and given to the destination BTI to store. The format is a list of many items separated by slashes, or which the first is the ip address and port of the Gate Controller that built the string. Subsequent items in this string include the address/port of the Edge Router, gate identifier, signaling endpoint address, data endpoint address, the originator's call reference value, and the originator's address for initial call signaling.

10.9.2.1 GCREDIRECT Acknowledgment

If the terminating Gate Controller is able to successfully process a GCREDIRECT request, it responds with a GCREDIRECTACK message. A sample message is:

GCREDIRECTACK 0T5081 v1.0; REMGATEIP 135.207.22.1:7682; REMGATEID 21S11018

REMGATEIP is the IP address and port number of the Edge Router that is holding a gate for the previous connection that has now been redirected.

REMGATEID is the identification string for the gate at that Edge Router for the previous connection.

10.9.2.2 GCREDIRECT Error

If the terminating Gate Controller encounters an error while completing a redirect request, it responds to the originating Gate Controller with a GCREDIRECTNAK message. A sample message is:

GCREDIRECTNAK 0T5081 v1.0; ERROR No gates available

ERROR gives an error message string, which could be displayed if the Gate Controller has some method to do so, and can be passed back to the BTI in a NAK message.

10.9.3 GCSPLICE

If the Gate Controller receiving a SPLICE request from a BTI is not the one that generated the CINFO1 string, it sends to that Gate Controller a GCSPLICE message. A sample message of this type is:

GCSPLICE 7T1019 v1.0;
CINFO1
135.207.31.2:7650/135.207.22.1:7682/9S1077/
10.3.7.151:7685/10.3.7.151: 7006-2-2/9733608766/
3746/10.3.7.151:7685;
CINFO2
135.207.31.2:7650/135.207.22.1:7682/5S71731/
10.3.7.150:7685/10.3.7.150: 7000-2-2/9733608720/
8839/10.3.7.150:7685

If the Gate Controller receiving the above GCSPLICE request is not the one that generated the CINFO2 string, it sends to that third Gate Controller another GCSPLICE message. A sample message of this second type is:

GCSPLICE 7T1021 v1.0;
CINFO2
135.207.31.2:7650/135.207.22.1:7682/5S71731/
10.3.7.150:7685/10.3.7.150: 7000-2-2/9733608720/
8839/10.3.7.150:7685;
SIGADDR 135.207.22.1:6162; DATAADDR 135.207.22.1:6164 2 2;
CRV 3746; REMGATEIP 135.207.22.1:7682; REMGATEID 9S1077;
CODING 53B,6 ms,G.711; REFID 135.207.31.2:26124C90:7224;
BILLDATA 6010-0203-0456-7890/9733608766/BRIDGE;
CINFO
135.207.31.2:7650/135.207.22.1:7682/9S1077/
10.3.7.151:7685/10.3.7.151: 7006-2-2/9733608766/
3746/10.3.7.151:7685

CINFO1 is the string previously supplied by a Gate Controller, which tells that Gate Controller various pieces of information about the first endpoint. This string was stored encrypted by the BTI that originated the SPLICE request. Either CINFO1 must be present in the message, or the set of fields that are determined from the Gate Controller unpacking CINFO1: SIGADDR, DATAADDR, CRV, REMGATEIP, REMGATEID, CODING, REFID, and BILLDATA. With these fields present, the CINFO1 string is attached as CINFO.

CINFO2 is the string previously supplied by a Gate Controller, which tells that Gate Controller various pieces of information about the second endpoint. This string was stored encrypted by the BTI that originated the SPLICE request.

SIGADDR is the IP address and port number the second endpoint should use for BTI—BTI signaling messages. This is a global version of the address given in the SETUP/SETUPACK message from the first endpoint BTI, with name to ip-address translation done, and with any NAT/PAT server translation included.

DATAADDR is the IP address and port number the second endpoint should use for data packets. This is a global version of the address given in the SETUP/SETUPACK message from the first endpoint BTI, with name and ip-address translation done, and with any NAT/PAT server translation included. The second and third parameters (optional) in this element give the number of consecutive ports used, and the alignment information needed for the starting port number.

REMGATEIP is the IP address and port number of the Edge Router that contains the gate to be used at the first BTI's end for this conversation. This is the destination address for all ER—ER communication.

REMGATEID is the gate identifier and security code for the gate within that Edge Router.

CODING is the encapsulation method and coding style accepted by the first BTI.

REFID is a unique identifier assigned by the Gate Controller, which will appear in all the Billing Records. The REFID is intended to be unique within a period of several months.

BILLDATA is the billing/accounting data indicating the charging arrangement for this conversation.

CINFO is a string generated by a Gate Controller that contains all the information needed for future enhanced services that may involve that BTI. This will be encrypted and given to the other BTI to store. The format is a list of many items separated by slashes, or which the first is the ip address and port of the Gate Controller that built the string. Subsequent items in this string include the address/port of the Edge Router, gate identifier, signaling endpoint address, data endpoint address, the destination's call reference value, and the destination's address for initial call signaling.

10.9.3.1 GCSPLICE Acknowledgment

If the terminating Gate Controller is able to successfully process a GCSPLICE request, it responds with a GCSPLICEACK message. If the GCSPLICE request was of the first type above, a sample acknowledgment message is:

GCSPLICEACK 7T1019 v1.0;

If the GCSPLICE request was of the second type above, a sample acknowledgment message is:

GCSPLICEACK 7T1021 v1.0;
SIGADDR 135.207.22.1:6166; DATAADDR 135.207.22.1:6168 2 2;
CODING 53B,6 ms,G.711;
REMGATEIP 135.207.22.1:7682; REMGATEID 5S71731; CRV 8839;
REFID 135.207.31.2:26124C90:7224;
BILLDATA 6010-0203-0456-7890/9733608720/9733608766;
CINFO
135.207.31.2:7650/135.207.22.1:7682/5S71731/
10.3.7.150:7685/10.3.7.150: 7000-2-2/9733608720/
8839/10.3.7.150:7685

SIGADDR is the IP address and port number the first endpoint should use for BTI—BTI signaling messages. This is a global version of the address given in the SETUP/SETUPACK message from the second endpoint BTI, with name to ip-address translation done, and with any NAT/PAT server translation included.

DATAADDR is the IP address and port number the first endpoint should use for data packets. This is a global version of the address given in the SETUP/SETUPACK message from the second endpoint BTI, with name and ip-address translation done, and with any NAT/PAT server translation included. The second and third parameters (optional) in this element give the number of consecutive ports used, and the alignment information needed for the starting port number.

REMGATEIP is the IP address and port number of the Edge Router that contains the gate to be used at the second BTI's end for this conversation. This is the destination address for all ER—ER communication.

REMGATEID is the gate identifier and security code for the gate within that Edge Router.

CODING is the encapsulation method and coding style accepted by the second BTI.

REFID (optional) is a unique identifier assigned by the Gate Controller, which will appear in all the Billing Records. The REFID is intended to be unique within a period of several months. If this parameter appears, it will override the REFID assigned by the originating Gate Controller BILLDATA (optional) is the billing/accounting data indicating the charging arrangement for this conversation. If this parameter appears, it will override the BILLDATA assigned by the originating Gate Controller.

CINFO is a string generated by a Gate Controller that contains all the information needed for future enhanced services that may involve that BTI. This will be encrypted and given to the other BTI to store. The format is a list of many items separated by slashes, or which the first is the ip address and port of the Gate Controller that built the string. Subsequent items in this string include the address/port of the Edge Router, gate identifier, signaling endpoint address, data endpoint address, the destination's call reference value, and the destination's address for initial call signaling.

10.9.3.2 GCSPLICE Error

If the terminating Gate Controller encounters an error while completing a splice request, it responds to the originating Gate Controller with a GCSPLICENAK message. A sample message is:

GCSPLICENAK 4T93 177 v1.0; ERROR No gates available

ERROR gives an error message string, which could be displayed if the Gate Controller has some method to do so, and can be passed back to the BTI in a NAK message.

10.10 Edge Router to Billing Event Collector

Messages sent by the Edge Router include CALLSTART, CALLEND, and CALLPARTIALEND. These messages are sent over a reliable transport mechanism, such as TCP/IP, which performs all of the flow control and error control needed to ensure the reliable receipt of the messages at the Billing Event Collector. The format of the messages is slightly different than other messages, since they are not transaction based.

These messages must also include a timestamp. It is assumed here that the timestamp will be added by the Billing Event Collector, who will perform its function in real-time. If, however, the Edge Routers are expected to accumulate event records for some longer period of time and send them in a burst, then the Edge Router will need to record the time of each event and the messages must include that information as well.

10.10.1 CALLSTART

Whenever an Edge Router allocates resources for a gate, it issues a CALLSTART event record to the Billing Event Recorder. A sample message is:

CALLSTART 135.207.31.2:36123E5C:93178
5123-4567-8900/9733608718/8733608766
53B,6 ms

The parameters to this message are:
The unique reference ID for this call, which will be common in all billing records related to the call
The billing data for this call, which consists of multiple sets of three items:
the account number to be charged for the call
the source E.164 number for the call
the termination E.164 number for the call
the above three fields repeated as needed for multiple call segment
The bandwidth resources used by this call.

10.10.2 CALLEND

Whenever an Edge Router releases resources for a gate, it issues a CALLEND event record to the Billing Event Recorder. Note that this does not occur when a call is placed on HOLD, since the resources are still reserved for future use. A sample message is:

CALLEND 135.207.31.2:36123E5C:93178
5123-4567-8900/9733608718/8733608766
53B,6 ms

The parameters to this message are:
The unique reference ID for this call, which will be common in all billing records related to the call
The billing data for this call, which consists of multiple sets of three items:
the account number to be charged for the call
the source E.164 number for the call
the termination E.164 number for the call
the above three fields repeated as needed for multiple call segment
The bandwidth resources used by this call.

10.10.3 CALLPARTIALEND

Whenever an Edge Router is instructed by a Gate Controller to releases resources at one end of a conversation, but told not to coordinate with the remote gate and release all the resources at both ends, it issues a CALLPARTIALEND event record to the Billing Event Recorder. A sample message is:

CALLPARTIALEND 135.207.31.2:36123 E5C:93178
5123-4567-8900/9733608718/8733608766
53B,6 ms

The parameters to this message are:
The unique reference ID for this call, which will be common in all billing records related to the call
The billing data for this call, which consists of multiple sets of three items:
the account number to be charged for the call
the source E.164 number for the call
the termination E.164 number for the call
the above three fields repeated as needed for multiple call segment
The bandwidth resources used by this call.

10.11 Gate Controller to NAT/PAT Server

Messages sent by the Gate Controller include NATENQ, and NATSETUP. Inquiry messages to the NAT/PAT server have a common structure for message element names. The first letter of the type name is either "L" or "G", indicating a request about a local or global address. The last portion of the type name is a number, which is used by the sender to match up responses with the requests. For example, a request message with a parameter GADDR3 will give a response with a parameter LADDR3, and a request message with a parameter LADDR7 will give a response with a parameter GADDR7. There is no requirement that the digit sequences in parameter names by consecutive, but they must be unique within the message.

10.11.1 NATENQ

A NATENQ message is sent by the Gate Controller to the NAT server to inquire about a possible entry in the translation tables, but without creating an entry if none currently exists.

A sample message is:
NATENQ 4T93174 v1.0; LADDR1 10.0.12.221:7685

LADDRx/GADDRx is the local/global address and port number that the Gate Controller is asking about.

10.11.1.1 NATENQ Acknowledgment

The response to a NATENQ message gives the translations found in the tables for the specified addresses. If no entry was found, its element is not present in the response message. A sample NATENQACK message is:
NATENQACK 4T93174 v1.0; GADDR1 135.207.31.1:6000

GADDRx/GADDRx is the global/local address and port number that the Gate Controller is asking about.

10.11.1.2 NATENQ Error

The only anticipated error that can occur in a NATENQ message is that the server does not perform a NAT/PAT function, and therefore does not recognize the request. A sample error response is:
NATENQNAK 4T93174 v1.0; ERROR Unrecognized request ERROR gives an error message string, which could be displayed if the Gate Controller has some method to do so. Otherwise it provides some useful debugging information. It can also be passed back as part of the error indication from the Gate Controller request.

10.11.2 NATSETUP

A NATSETUP message is sent by the Gate Controller to the NAT server to create entries in the translation tables. A sample message is:
NATSETUP 4T93175 v1.0; LADDR1 10.0.12.221:7685; LADDR2 10.0.12.221:7000 2 2

LADDRx/GADDRx is the local/global address and port number that the Gate Controller desires entries to be established in the translation table. The second parameter, if present, gives the number of consecutive ports requested. The third parameter, if present, gives any alignment restrictions on the port number assigned.

10.11.2.1 NATSETUP Acknowledgment

The response to a NATSETUP message gives the translation entries either found or established in the translation tables. A sample NATSETUPACK message is:
NATSETUPACK 4T93175 v1.0; GADDR1 135.207.31.1:6000; GADDR2 135.207.31.1:60022

GADDRx/GADDRx is the global/local address and port number that the Gate Controller asked to be established. The second parameter (if present) indicates the number of consecutive ports assigned.

10.11.2.2 NATSETUP Error

Any error encountered while creating NAT/PAT entries will result in a NATSETUPNAK message. A sample error response is:
NATSETUPNAK 4T93175 v1.0; ERROR Translation table full ERROR gives an error message string, which could be displayed if the Gate Controller has some method to do so. Otherwise it provides some useful debugging information. It can also be passed back as part of the error indication from the Gate Controller request.

11. Signaling Architecture Call Flows

In this section call flows are presented to show the signaling exchange for both basic telephony services as well as many CLASS and Custom Calling features.

11.1 Call Flow Terminology

The following terminology describes signaling call flows that can be used by embodiments of the present invention. Symbols are used to represent parties involved in the call flow (e.g. Gate Controllers) and information that is exchanged (e.g. Call Parameters). Each of these is often followed by a subscript indicating which one specifically is being referenced. Common subscripts are O for originating, T for terminating, F for forwarding, B for bridging, and TR for transferring. For example, in a simple telephone conversation, $BTI_O$ refers to the originating BTI, and $BTI_T$ to the terminating BTI, and similarly for $E.164_T$, $ER_O$, $ER_T$, $GC_O$, $GC_T$, etc.

All the messages and parameters are described in detail in the next section: Protocol Description.

Call Flow Symbols:
BTI—Broadband Telephony Interface—or a telephony-equipped cable modem
ER—Edge Router: Cable modem termination system that serves the BTI
GID—Gate ID: Identification of the "gate" within the edge router assigned to this call.
GC—Gate Controller that serves the BTI
CI—Call Information: Information about the call through the network. This information includes the E.164 address, the IP address of the BTI, the IP address of the serving Gate Controller, the IP address of the serving ER, and the GID of the gate in the ER.
[CI](GC)—Encrypted information about the BTI that is given to others outside the network to store. It is signed and encrypted by the Gate Controller indicated.
BID—Billing ID: Identifier of the call for billing purposes; intended to be unique not only within the entire network, but to not be reused for a significant period of time. Both Edge routers involved in a call report this identifier in the call detail records.
TID—Transaction ID: Identifier of a message; intended to only be locally unique for the duration of a message/response transaction.
E.164—Telephone number
CN—Directory name of caller
LA—local IP address (set when BTI powers on)
GA—global IP address (set via NAT when BTI begins a session)
PN—Port number used by BTIs for a particular connection
AI—Authentication Information, single string per subscriber, common across all lines served by one BTI. This string is signed and encrypted by a network server, and is verified by Gate Controllers for every transaction.
$ —call accounting information, such as customer account number, to be included in billing information for the current call. Given to ER as part of the permission to open gate. In some cases, e.g. call forwarding, two separate account numbers will be included to indicate a split charging arrangement for the call. In addition to charging information, accounting information includes parameters that place bounds on the call that is to be established. Some parameters may include maximum call duration and transmission priority.

CP—Call parameters (e.g. compression standard) for this call. $CP_O$ are the parameters offered by the call originator, $CP_T$ are those accepted by the terminating system.

o—indicates that network address translation is done in the ER

ANN-INFO—Announcement Information: Parameter indicating to an announcement server which announcement to play.

CF—Flag that indicates call forwarding on all calls or busy is active.

T—Flag that indicates call transfer is active.

CTOR—Cut Through On Release Flag: Indicates that the Edge Router should cut through the call in the receive direction when the BTI reserves the bandwidth.

SGCP Parameters:

S-R—SGCP parameter indicating a connection should be opened in both the send and receive directions.

S-NR—SGCP parameter indicating a connection should be opened only in the send (upstream) direction.

NS-R—SGCP parameter indicating a connection should be opened in only the receive (downstream) direction.

Figure 6:
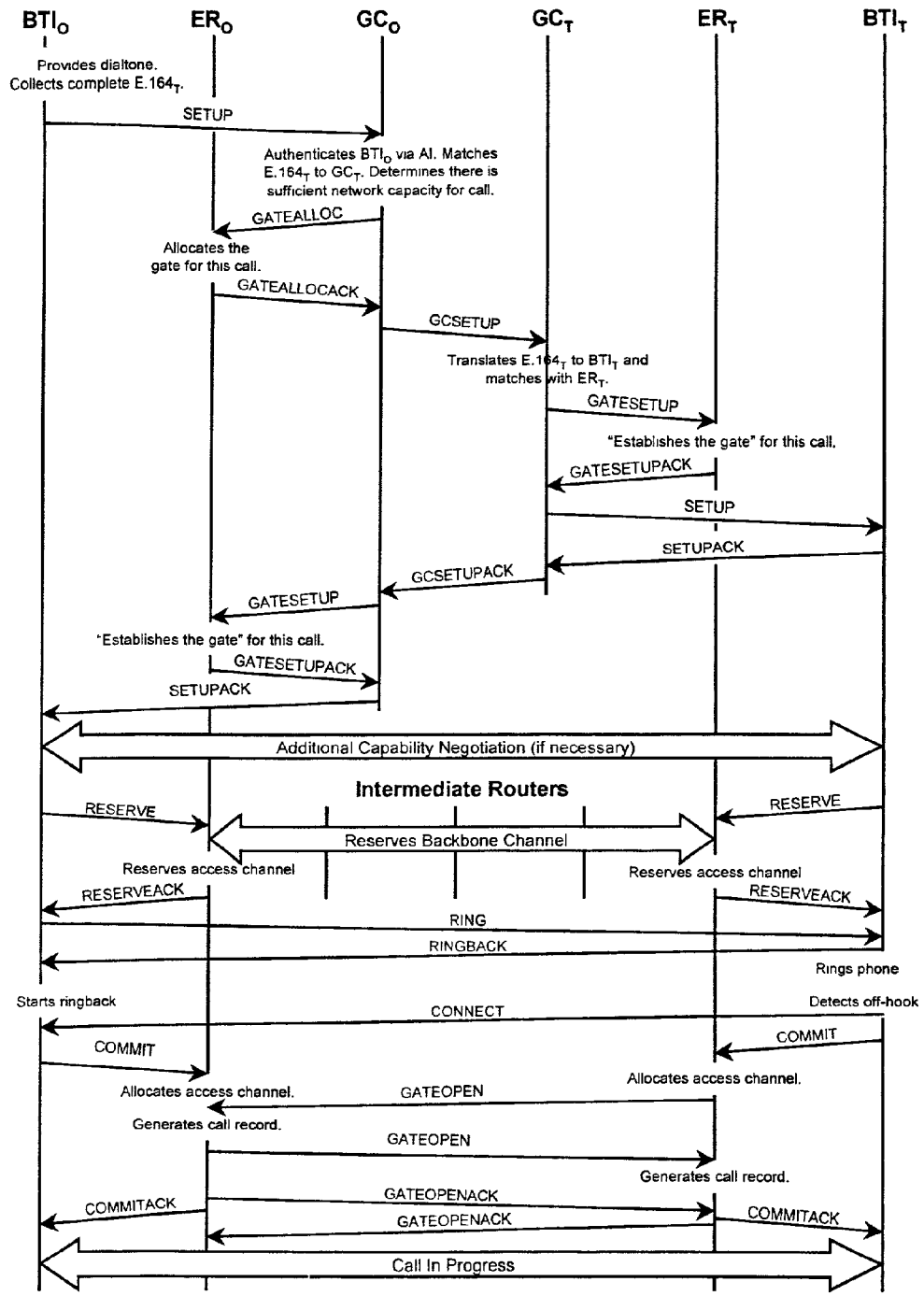
FIG. 6 shows the call flow for a normal call setup, according to an embodiment of the present invention.

SS7 Symbols:
  IAM—Initial Address Message
  ACM—Address Complete Message
  E-ACM—Early Address Complete Message
  ANM—Answer Message
  REL—Release Message
  RLC—Release Complete Message
  SUS—Suspend Message
  RES—Resume Message 11.2 Basic Call Flows 11.2.1 Connect FIG. 6 shows the call flow for a normal call setup, according to an embodiment of the present invention. Call setup involves establishing an IP signaling and bearer channel between BTIs across a packet network. The signaling channel uses "better than best effort" IP transmission across the network. Signaling reliability is ensured within the application. In the access portion of the network (between the edge router (ER) and the BTI), the bearer channel uses an "unsolicited grant" as defined by the MCNS v1.1 to maintain a constant bit rate channel. The ER "colors" the "high QoS" bearer channel packets to give them higher priority than "best-effort QoS" packets over the backbone portion of the network (between the ERs).

Some of the aspects of the basic Connect call flow are:

Digit Collection—The $BTI_O$ needs to recognize when a complete telephone number is dialed so it can package the number in a SETUP message and send it on to $GC_O$ for translation.

Network Address Translation (NAT) for the Originating BTI—The ER does network address translation between local (Net10) addresses for each of the BTIs and global addresses. Each ER is assigned a set of global addresses. The ER assigns a global address to a BTI when the BTI attempts to communicate outside of its local area, or when a Gate Controller requests that a global address be assigned to a BTI.

BTI Authentication—$GC_O$ authenticates the BTI upon receipt of a SETUP message. The Authentication Information (AI) needs to be provisioned in the BTI at BTI registration. $GC_O$ also performs service-specific admission control. For instance, if a Gate Controller knew that a specific destination area was overloaded with traffic, it could block a call setup.

Gate Allocation—$GC_O$ requests a gate be allocated in $ER_o$ for this call. $ER_O$ replies with a Gate ID ($GID_O$) to be used for the call. $GC_O$ adds this information to the Call Information ($CI_O$) record for this call.

Billing Identifier (BID)—While processing an initial call attempt, the Gate Controller assigns a globally unique Billing Identifier (BID) to the call. Such a unique identifier could be, for example, the IP address of the Gate Controller, followed by a timestamp, followed by a call sequence number. It is intended that this identifier be unique over several billing cycles, and enable the billing system to correctly match all records related to a single call.

Number Translation—The $E.164_T$ address is translated by the Gate Controllers to the local IP address of the terminating BTI and the terminating ER. If $GC_O$ cannot translate the $E.164_T$ address on its own, it identifies a Gate Controller ($GC_T$) that can do the translation. $GC_O$ sends the GCSETUP message, with additional information in it, on to $GC_T$ for processing. This simplifies the security of the ER, in that it only accepts commands from a small group of well-known Gate Controllers.

Accounting Information ($)—In addition to charging information (e.g. account number), accounting information includes parameters that place bounds on the call that is to be established. Some parameters may include maximum call duration and transmission priority. In several situations involving call forwarding, the charging for the call will be split among two or more subscribers. Thus the "$" parameter in messages may contain several account codes with information as to the proper allocation of charges to each.

"Opening The Gate"—The Gate Controller gives permission for an ER to allow a BTI to set up an "unsolicited grant". The ER also "colors" the bearer-channel packets so they have "high-QoS" to a specific destination address. If an ER does not receive the permission to "open the gate" for high-priority packets, it does not allow the unsolicited grant or the high-priority packets. This permission is based on a specific source IP address and a specific destination IP address, and bounds on the resources the endpoints can use. The account information ($) in the gate setup message to the ER provides the bounds on these resources.

Call Information ($CI_O$ and $CI_T$)—information about a BTI, including its E.164 address, its Gate Controller's address, its ER's address, and the GID within the ER. Each endpoint of a call receives this information about the other endpoint, signed and encrypted by the local Gate Controller to prevent unauthorized disclosure or tampering by the BTI. This call information is used later for Call Trace (*57), Call Return (*69), and in setting up Three-Way Calling.

Capability Negotiation—The BTIs have the ability to negotiate Call Parameters (CP) (e.g. encoding) in the SETUP message exchange. If additional negotiation is needed, it can be accomplished before resource commitment is made.

Access Resource Reservation—An MCNS unsolicited grant protocol is used to reserve a constant bit rate channel in the access portion of the network. The access reservation comes in two parts, which is required for the telephony application. In first step, the "reservation" ensures the bandwidth will be available when needed, but does not actually assign the bandwidth nor does it "open the gate." The reservation is obtained prior to ringing the destination telephone. Only when the destination user answers does the second step, the "commitment," allocate the bandwidth and start the billing for the call. To protect resources, only a certain number of outstanding reservations are allowed per BTI.

Backbone Resource Reservation—DOSA allows for the possibility of a different backbone resource reservation protocol than that used for the access portion of the network. It is the job of the ER to process the access reservation message and translate it into the proper message sequence for backbone resources. When the ER acknowledges the reservation with an ACK message, it means that the access resources are available for the call and whatever backbone resources this CMTS needed to reserve to support the flow has been reserved. At this point it is safe to begin the ring phase. An example of backbone resource reservation is shown in Section 6.2.2.

Commit—This is the second step of the access reservation sequence. The commitment is made when an actual connection is to be made and billing is started. The ER and the network previously reserved the resources, and held them for this particular conversation. The ER emits a call-detail-record to the billing system at this time.

Gate Coordination—In order to avoid certain theft of service scenarios, the opening and closing of gates within the network needs to be coordinated between ERs. GATEOPEN is an ER to ER message indicating that the gate has opened on the far end of the call. Far end Call Parameters are passed to the BTI for it to check whether it agrees with the parameters that are in the far end gate.

11.2.2 Backbone Reservation

FIG. 7 shows an example signaling call flow for reservation of resources in the segment of the network between the edge routers for a voice call, according to an embodiment of the present invention. This is one potential model of backbone reservation; however, different approaches may achieve the same result. In one embodiment, a separate the mechanism for access reservation from the backbone reservation is used. This leaves the BTI interaction with the ER independent of the backbone network between ERs.

In one embodiment, the resource reservation is initiated by a sender and only reserves resources for packets being generated by that sender i.e. reservations are unidirectional. This matches the forwarding model used in IP networks in which paths can be asymmetric. However, the RESERVE message used over the access network has different semantics: reserve bi-directional capacity over the access network.

Because the end to end route between two edge routers may change during the duration of a call, the RESERVE messages can be periodically transmitted from either end to refresh the reservation (although this is not shown in the FIG. 7). The IP source address in the RESERVE message contains the source address of $ER_O$. The IP destination address in the RESERVE message is that of $BTI_T$. The reservation message identifies: $GA_O$ ($BTI_O$'s global IP address), $PN_O$ ($BTI_O$'s port number for this call), $GA_T$ ($BTI_T$'s global IP address), $PN_T$ ($BTI_O$'s port number for this call) as the owner of the reservation. After setting up the bidirectional access reservation, the ER sends a BACKBONERESERVE message through intermediate backbone routers towards $BTI_T$. Routers that are incapable of processing the BACKBONERESERVE message forward them without any processing.

In this example, the receipt of the RESERVEACK to a BTI indicates that resources have been reserved in both the send and receive directions in the access channel, and in the send direction in the backbone.

11.2.3 Disconnect

FIG. 8 shows the call flow for a normal call termination, according to an embodiment of the present invention. When a BTI detects on-hook, it sends an end-to-end HANGUP message to the other BTI and a RELEASE message to the ER. In response to the RELEASE command, the ER closes the gate and emits a CALLEND to the billing system that indicates the call has completed and that billing should stop.

Note that there are a number of error conditions that will cause this disconnect sequence, such as BTI failures, power failures, cable plant failures, and backbone network failures. In all cases, it is desirable to stop the billing at the end of the useful connection, and to not charge the customer for a (possibly lengthy) service outage.

11.2.4 Calls Terminating in the PSTN

Figure 9:
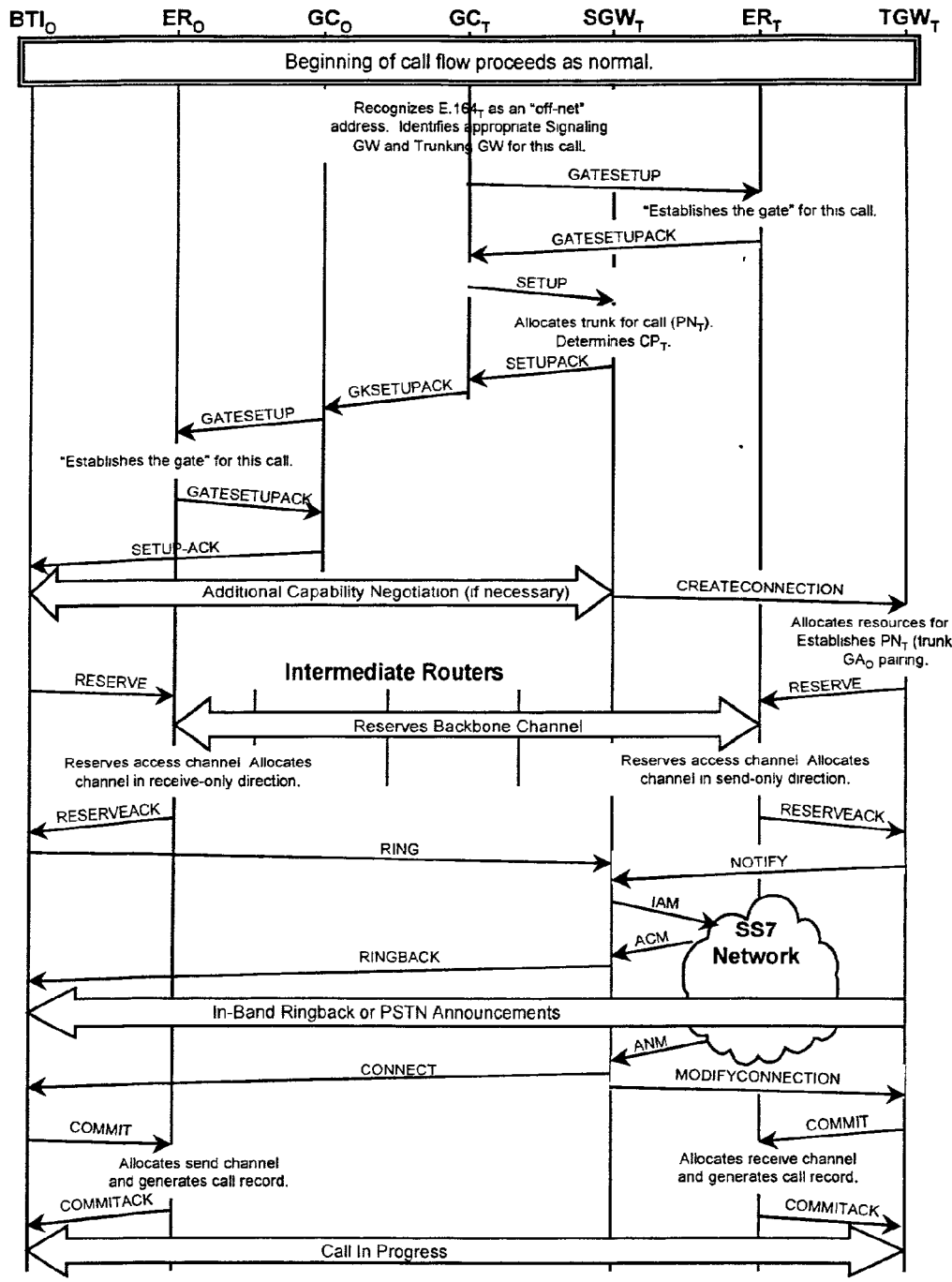
FIG. 9 shows the call flow for a call originating from a BTI but terminating in the PSTN, according to an embodiment of the present invention.

FIG. 9 shows the call flow for a call originating from a BTI but terminating in the PSTN, according to an embodiment of the present invention. In the call flow, $GC_T$ recognizes that $E.164_T$ terminates outside of the IP network. $GC_T$ identifies the appropriate $SGW_T$ and $TGW_T$. $GC_T$ initiates a GATESETUP to $ER_T$ with the Cut Through On Reserve (CTOR) flag set to indicate that a one-way voice path from the PSTN to $BTI_O$ should be established once the reserve is requested. $GC_T$ then sends the SETUP to $SGW_T$. $SGW_T$ allocates a trunk identified by the IP port number PNT on $TGW_T$ for the call. $SGW_T$ also looks at $CP_O$ to determine the call parameters that will be used for this call ($CP_T$).

Upon receiving the SETUPACK from $SGW_T$, $GC_T$ replies to $GC_O$, including the CTOR flag. $GC_O$ sets up the gate on the originating end of the call including the CTOR flag indicating that $ER_O$, should open the voice path toward $BTI_O$ on reserve. $GC_O$ also includes the CTOR flag on the SETUPACK message to $BTI_O$ so $BTI_O$ does not generate its own ringback, but uses the ringback from the far end of the network. If additional capability negotiation is needed, it can be done at this point.

Once the call parameters are known, $SGW_T$ uses the SGCP message CREATECONNECTION to inform $TGW_T$ about the potential call. Included in this message are all the parameters that $TGW_T$ needs to reserve the necessary bandwidth and to translate between the IP packets and the TDM trunk. Also included in this message is an SGCP NOTIFICATIONREQUEST, requesting $TGW_T$ to notify $SGW_T$ when the reservation is acknowledged by $ER_T$. $TGW_T$ sends a reserve message requesting the appropriate QoS in the network for the call. The trunking gateway needs to send this reserve message (versus the SGW) since the reservation needs to be along the path of the bearer channel. Upon a successful reservation, $TGW_T$ sends the SGCP NOTIFY to $SGW_T$.

Once $SGW_T$ receives both the RING message from $BTI_O$ and the NOTIFY from $TGW_T$, $SGW_T$ sends the SS7 Initial Address Message (IAM) into the PSTN to set up the connection between $TGW_T$ and the ultimate destination. Upon receipt of the SS7 Address Complete Message (ACM), indicating that the destination phone is available and ringing, $SGW_T$ sends $BTI_O$ the RINGBACK message and $BTI_O$ plays ringback tone it is receiving from the network to the customer.

When the destination phone goes off-hook, an SS7 Answer Message (ANM) is received by $SGW_T$. $SGW_T$ sends the CONNECT back to $BTI_O$ and uses the SGCP message MODIFYCONNECTION to indicate to $TGW_T$ that it needs to change the connection to a two-way connection, and send the COMMIT into the network to open the gate in both directions.

There are special cases when SS7 messages are received that cause the call flow to change. Some of these cases are described below:

Early Address Complete Message (E-ACM)—When an E-ACM message is received from the SS7 network instead of ACM, the voice connection needs to be established in both directions (send and receive). One example of how this is used by the PSTN is to indicate when an 800 call is being routed to an IVR system to determine where the call should be ultimately routed. After the call is routed and the far end answers, $SGW_O$ receives an ANM.

Busy—If either the PSTN network or the called party is busy, the SS7 network returns a busy indication with a cause code in response to the IAM. $SGW_O$ needs to send a BUSY message with a cause code in place of RINGBACK to $BTI_O$ so $BTI_O$ will play fast busy or slow busy to the customer.

11.2.5 Calls Originating from the PSTN

Figure 10:
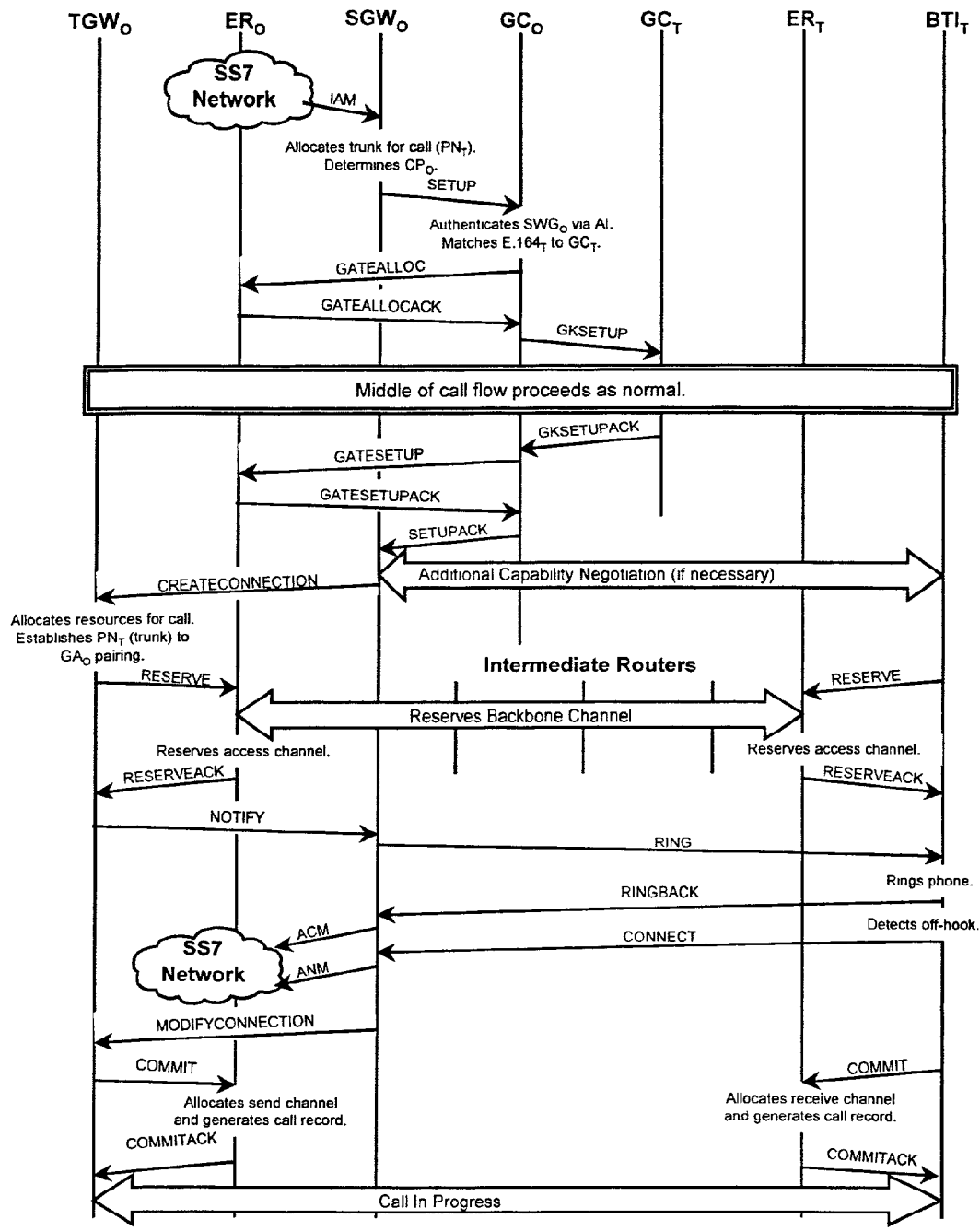
FIG. 10 shows the call flow for a call originating in the PSTN, but terminating in the IP telephony network, according to an embodiment of the present invention.

FIG. 10 shows the call flow for a call originating in the PSTN, but terminating in the IP telephony network, according to an embodiment of the present invention. The IAM message is the first indication that a call is destined from the PSTN to a BTI. The IAM message is received by $SGW_O$ which subsequently sends a SETUP message to $GC_O$. setup proceeds as normal through the IP network. The CTOR flag is not needed since ringback or terminating announcements will not be generated from the IP network.

The signaling flow is similar to when a call is destined for the PSTN (see previous section). SGCP messages are used between $SGW_O$ and $TGW_O$.

11.2.6 Call Release to the PSTN

Figure 11:
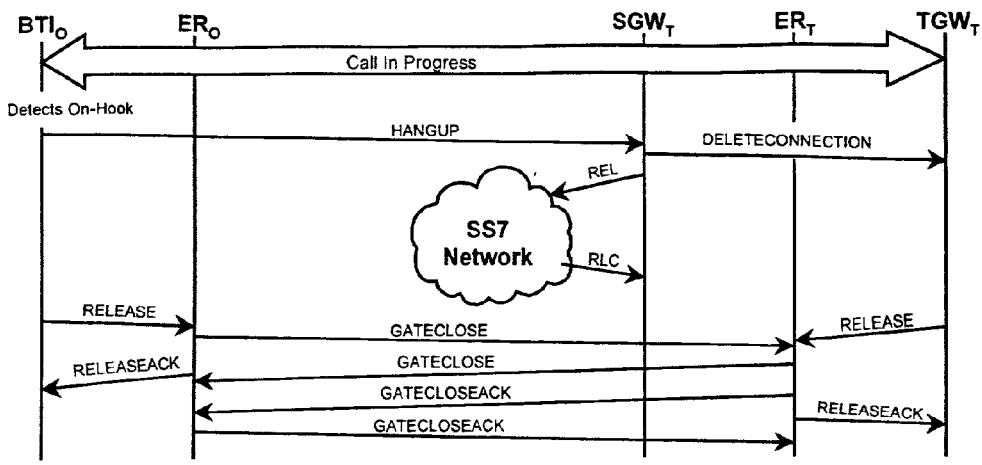
FIG. 11 shows the call flow for a normal release to the PSTN, according to an embodiment of the present invention.

FIG. 11 shows the call flow for a normal release to the PSTN, according to an embodiment of the present invention. This call flow assumes that the BTI originated the call. If the call originated in the PSTN, $SGW_T$ would send an SS7 Suspend (SUS) message. This indicates to the PSTN that the phone at the BTI went on-hook, but the call is not released until a timer expires (for example, 14 seconds). If the phone goes off-hook before the timer expires, an SS7 Resume (RES) message is sent.

11.2.7 Call Release from the PSTN

Figure 12:
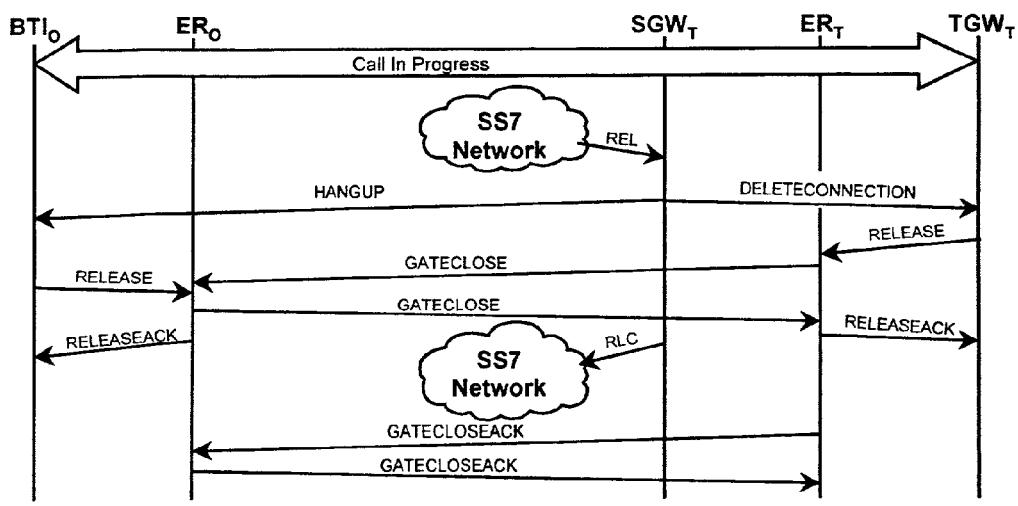
FIG. 12 shows the call flow for a call released from the PSTN, according to an embodiment of the present invention.

FIG. 12 shows the call flow for a call released from the PSTN, according to an embodiment of the present invention. The call flow assumes that the call originated in the PSTN.

11.2.8 E911 Emergency Service

To support E911 emergency calls, $GC_O$ must route the call to the E911 call center associated with the calling number. The E911 call center may be reached via a gateway or may be an E911 call center that is supported on the packet network. The originating phone number and additional information can be obtained by having the E911 call center send a SETUPNACK message to $GC_T$ as in the call flows for caller ID/calling name delivery. Otherwise, the call flows for call setup are unchanged.

The BTI originating a 911 call must not disconnect the call when the user hangs up. This requires $BTI_O$ to detect that the dialed number is 911 and to alter its local hangup processing accordingly.

A call to an operator for assistance may be transferred by the operator to an E911 center. In this case, the gateway or end-system that the operator is connected to must send an end-to-end message to $BTI_O$ instructing it to alter its hangup processing. This message must be authenticated by $BTI_O$ as being sent by a trusted network entity before $BTI_O$ alters its hangup processing. Authentication is required so that an arbitrary endpoint cannot instruct a BTI to alter its hangup processing.

11.2.9 Terminating Announcements

In some cases when a call cannot be completed, the customer hears a terminating announcement. Terminating announcement handling may be invoked when the dialed number has changed or cannot be translated, or as a result of a network resource limitation (e.g., "trunk busy") or network problem.

Because the BTI contains processing and storage, common terminating announcements may be handled locally by the BTI in response to an error indication. For example, common messages such as "The number you have dialed is not in service. Please check the number and dial again" or the "trunk busy" signal may be stored locally in the BTI. In the first case, $GC_O$ returns an error message to $BTI_O$ indicating that the dialed number cannot be translated. In the second case, a router returns an error message to $BTI_O$ as a result of an admission control failure during the processing of a COMMIT message. The error messages indicate to $BTI_O$ which announcement should be played.

Some services require the announcement to be customized, perhaps based on the originating number, dialed number, time-of-day, or administrative controls. Thus, in general, announcements are a function of conditions known to the Gate Controller. In this case, there are two options for supporting terminating announcements. The Gate Controller may send the announcement to the BTI as a data message to be played out by the BTI. Alternatively, the BTI may connect to a terminating announcement server. These alternatives may also be used to support the common terminating announcements described above.

Figure 13:
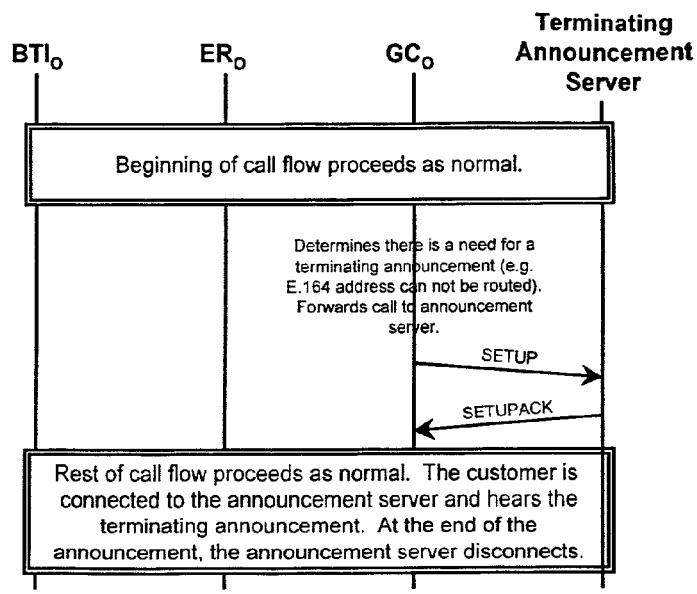
FIG. 13 shows a call flow where the BTI connects to a terminating announcement server, according to an embodiment of the present invention.

FIG. 13 shows a call flow where the BTI connects to a terminating announcement server, according to an embodiment of the present invention. Terminating announcement handling may be invoked either by $GC_O$ or $GC_T$ in response to a SETUP message. The Gate Controller routes the call to a terminating announcement server and interacts with the server to control the announcement that it plays. The call accounting information ("$") that is used for the call indicates that the call is not billed.

11.2.10 CALEA Wiretapping

CALEA requires the ability to intercept (wiretap) calls from a subscriber line and to provide additional information associated with these calls, such as the dialed number, and the time and duration of the call. Given that the BTI is not considered to be a trusted device, support for CALEA wiretapping must be implemented within the network, and must not be detectable by any party participating in the call. Our solution to the problem requires the ER to be able to multicast information flowing from each party in the call to both the other party or parties, and an additional end-system or gateway (a "wiretap server") that can deliver the bearer channel information to the authorities. This multicast capability requires every packet that matches a filter function to be routed to the wiretap server, in addition to being routed normally. The filter function is discussed below.

One proposed approach to the problem does not rely on per-connection processing in the ER to wiretap a line. In this approach, when the authorities ask that a line be wiretapped, an administrative system sends a message to the originating ER instructing it to multicast the bearer channel to the wiretap server. The filter specifies the local IP address of the BTI associated with the line that is being tapped, the address of the wiretap server, and it might additionally specify the port number associated with the bearer channel. However, since the port numbers associated with the bearer (voice) channel may be dynamically assigned by the originating and terminating BTI's, the administrative server is unable to specify this information. If the filter function does not contain the port number information, it would cause all packets associated with the BTI to be intercepted, which may not be desirable since these packets may include data packets that cannot legally be intercepted. Thus, this approach is possible in our architecture, but it may be desirable to have an approach that only intercepts the bearer channel without intercepting additional channels.

In another embodiment, the Gate Controller support a wiretapping. When the authorities ask that a line be tapped, the database record associated with the line is modified to indicate that the line should be tapped. When a SETUP message arrives the Gate Controller (it may be either an originating Gate Controller or a terminating Gate Controller), the Gate Controller looks up the database record and notes that the line should be tapped. The Gate Controller sends a message containing the address of the wiretap server to the ER. This information may be included as part of the "gate open" message. The Gate Controller also sends a message containing the dialed number to the wiretap server. The ER sends messages at the beginning and the end of the call to the wiretap server. These additional messages provide the additional information required by CALEA. In this solution, only new calls may be wiretapped. Calls that exist before the wiretapping information is provisioned in the GC will not be multicast to the wiretap server.

11.2.11 Call Trace

Figure 14:
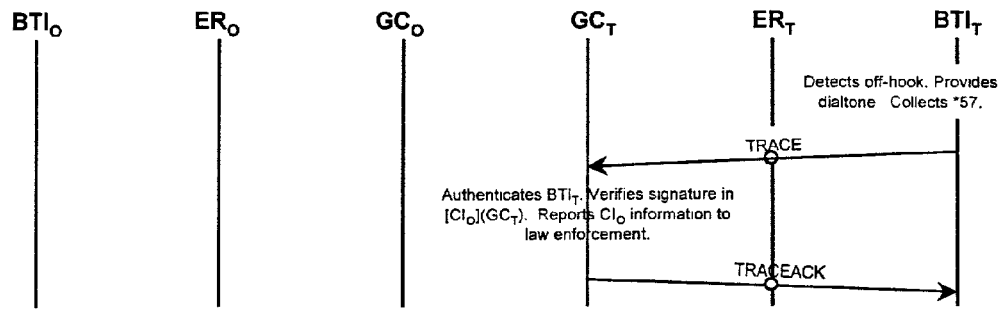
FIG. 14 shows the call flow for Call Trace, according to an embodiment of the present invention.

FIG. 14 shows the call flow for Call Trace, according to an embodiment of the present invention. $BTI_T$ (the recipient of the call that needs to be traced) sends a single TRACE message to $GC_T$, containing its own authentication information, and the connection information received from $GC_T$ for the most recent incoming call. $GC_T$ verifies the connection information (CI) by decrypting and checking the signature. If valid, the E.164 number contained within CI is reported to law enforcement, along with the identity of the customer making the report.

11.2.12 Operator Break-In

Operator Break-In is a combination of the CALEA wiretapping described in Section 7.2.10 and Three-Way Calling described in Section 7.3.4.

11.2.13 Operator Services

Operator services will initially be supported for IP phone customers by going through a PSTN Gateway. In the future, operator services may be on the IP network.

11.2.14 Mid-Call Resource Change

Figure 15:
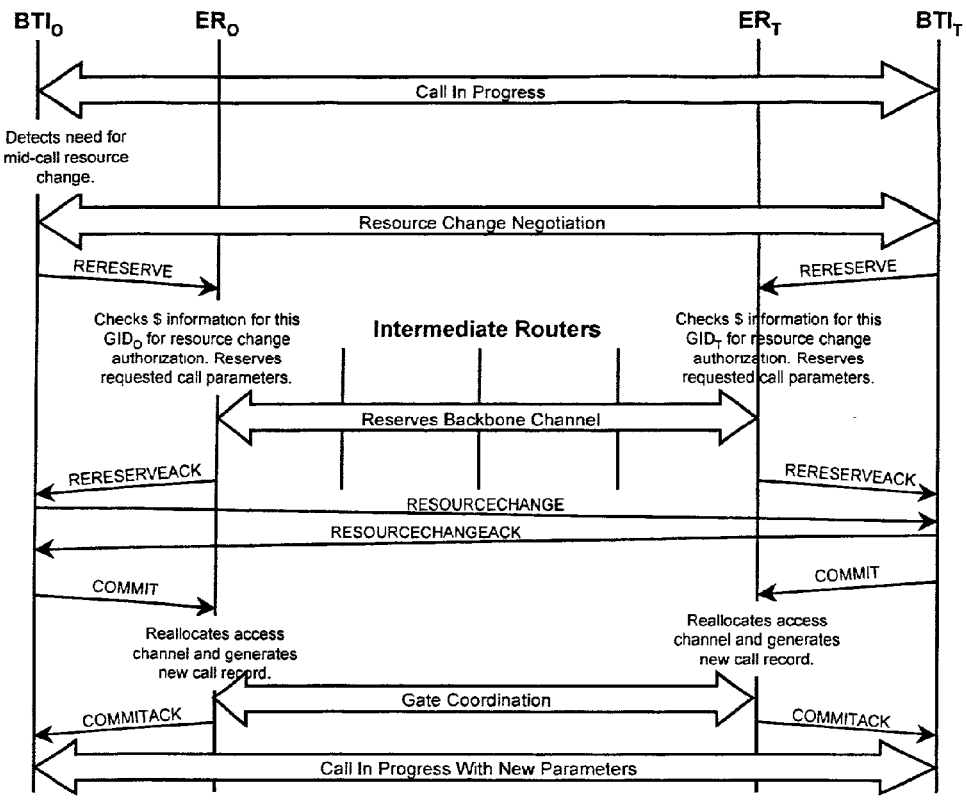
FIG. 15 shows the call flow for changing the established call parameters, according to an embodiment of the present invention.

In some cases, a call in progress may need to change the established call parameters. For instance, if a call is set up using a low-bit-rate compression (e.g. 16 kbps G.728) and after the call is answered the BTI detects a modem tone, the BTI needs to change the bearer channel to a non-compressed 64 kbps G.711 channel. FIG. 15 shows the call flow for changing the established call parameters, according to an embodiment of the present invention. Gate Controllers do not need to be involved in a mid-call resource change as long as the account information the Gate Controller delivered to the ER during call set up is consistent with the resource change request. For example, if the BTI requests a channel with higher bandwidth or higher priority than the account information allows, the ER would deny the request. As with the normal call set up, there is a two step—Reserve then Commit—process for changing call parameters mid-call.

11.3 Feature Call Flows 11.3.1 Call Forwarding

Call Forwarding service allows a call destined for one E.164 address to be redirected to another E.164 address. The redirection may happen on all calls, only on busy, only on no answer, or on a combination of either busy or no-answer. Call Forwarding is a popular service, and is used by other services (e.g. voice mail) to redirect calls. If a BTI is unavailable and call forwarding is active, all calls destined for the BTI should be forwarded.

At least three parties are involved in all types of Call Forwarding service:

The Originating Location ($BTI_O$)—the location that places the call to be forwarded.

The Terminating Location ($BTI_T$)—the location that has Call Forwarding active.

The Forwarding Location ($BTI_F$)—the location to which the calls are being forwarded.

Regardless of the type of Call Forwarding (All Calls, Busy, No Answer), the forwarding number may be specified by the customer on a per-use basis, or be pre-provisioned (specified when the customer signs up for Call Forwarding service). If the forwarding number is pre-provisioned, the BTI and the Gate Controller serving that customer stores the forwarding number. If the forwarding number is specified on a per-use basis, the customer dials a code (e.g. *72) and the forwarding number to activate Call Forwarding.

In all cases, the Originating Location must not receive the forwarding number. In the case of Call Forwarding—No Answer, the Originating Location may know that the call is being forwarded.

Figure 16:
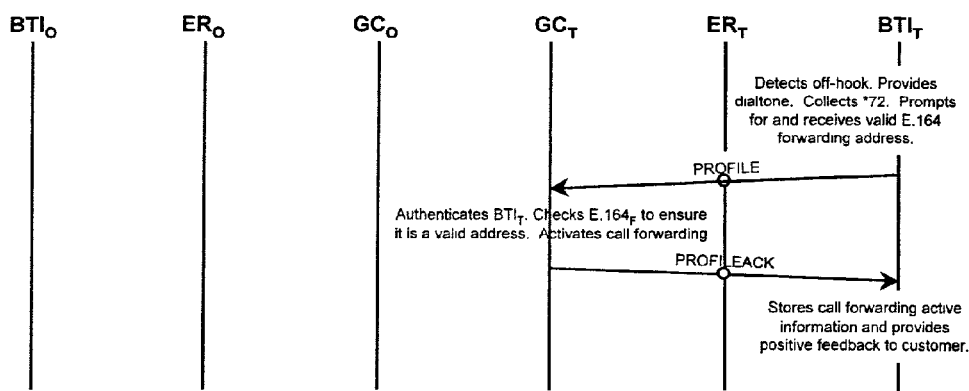
FIG. 16 shows the call flow for activating a per-use Call Forwarding service, according to an embodiment of the present invention.

FIG. 16 shows the call flow for activating a per-use Call Forwarding service, according to an embodiment of the present invention. The BTI recognizes that the customer dialed the code to active Call Forwarding, and prompts the customer for the forwarding telephone number. This information is sent to the Gate Controller in a PROFILE message. The Gate Controller validates that the forwarding number maps to either a BTI that the Gate Controller knows or to another Gate Controller. The Gate Controller checks to make sure the customer subscribes to Call Forwarding service, and if so activates the service and stores the forwarding number for later use.

The following sections describe the call flows for each of the types of Call Forwarding service for both when the BTI is available and when the BTI is unavailable.

11.3.1.1 Call Forwarding—All Calls

Figure 17:
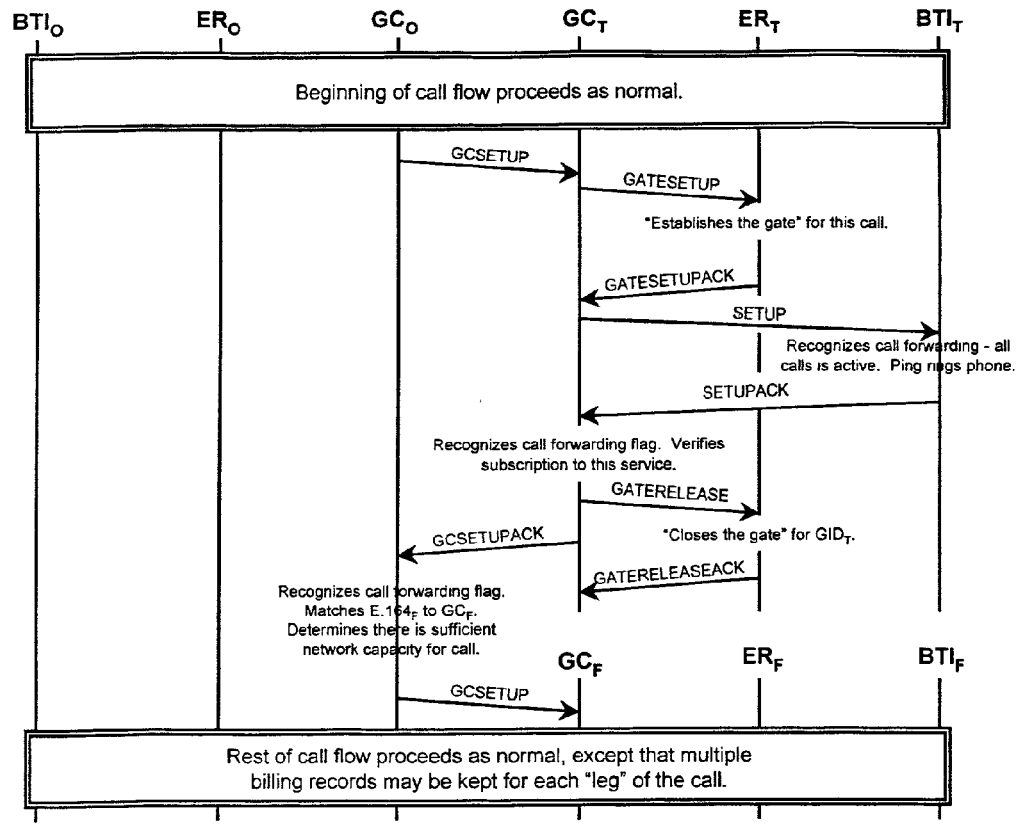
FIG. 17 shows the call flow for Call Forwarding—All Calls when the BTI is available, according to an embodiment of the present invention.

FIG. 17 shows the call flow for Call Forwarding—All Calls when the BTI is available, according to an embodiment of the present invention. The first part of the call flow is the same as shown in FIG. 6: Connect Call Flow. When the SETUP message is received by the Terminating BTI, it recognizes that Call Forwarding—All Calls is active. It sends a special SETUPACK to the Terminating Gate Controller indicating that Call Forwarding is active. The Gate Controller recognizes the Call Forwarding response, closes the gate at the ER that it opened for this call (using the GATERELEASE message), and sends the forwarding number on to $GC_O$ along with account information so that the forwarded leg of the call can be billed to $BTI_T$. The Originating Gate Controller sets up the call to the forwarding number as normal, except that billing information may be kept for both legs of the call.

Figure 18:
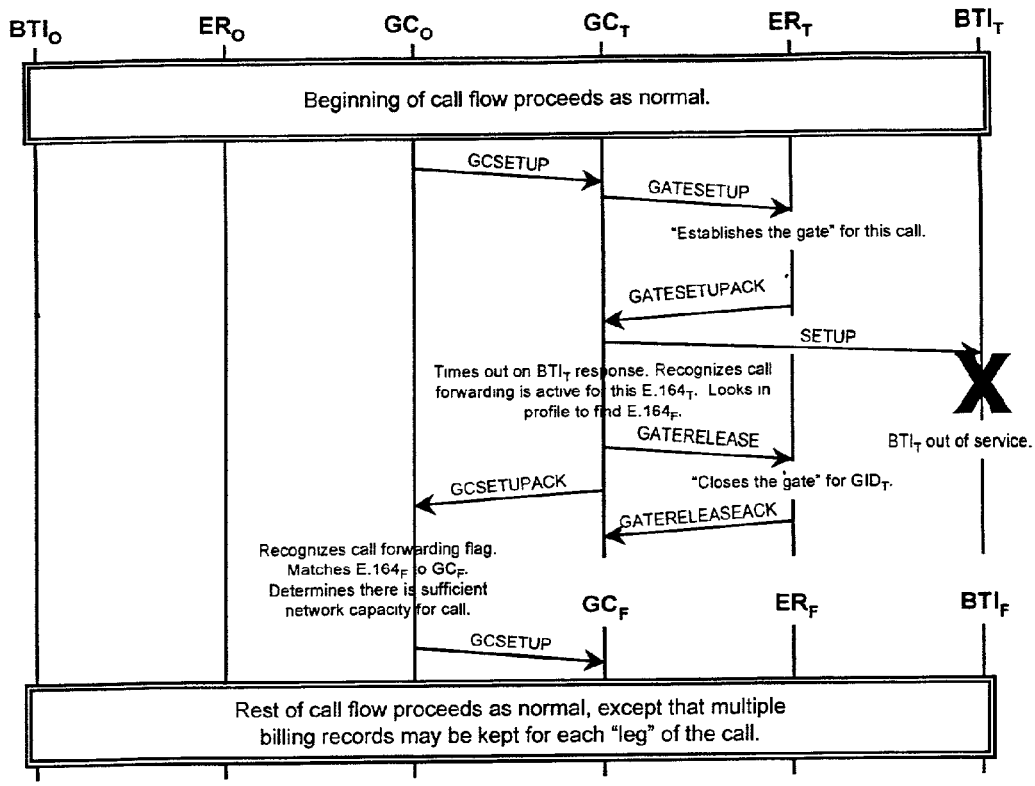
FIG. 18 shows the call flow for Call Forwarding—All Calls when the Terminating BTI is not available, according to an embodiment of the present invention.

FIG. 18 shows the call flow for Call Forwarding—All Calls when the Terminating BTI is not available, according to an embodiment of the present invention. In this case, $GC_T$ times out on the $BTI_T$ SETUP message. The $GC_T$ checks the customer profile and determines that Call Forwarding is active and proceeds as if it got a Call Forwarding response from $BTI_T$.

11.3.1.2 Call Forwarding—Busy

Figure 19:
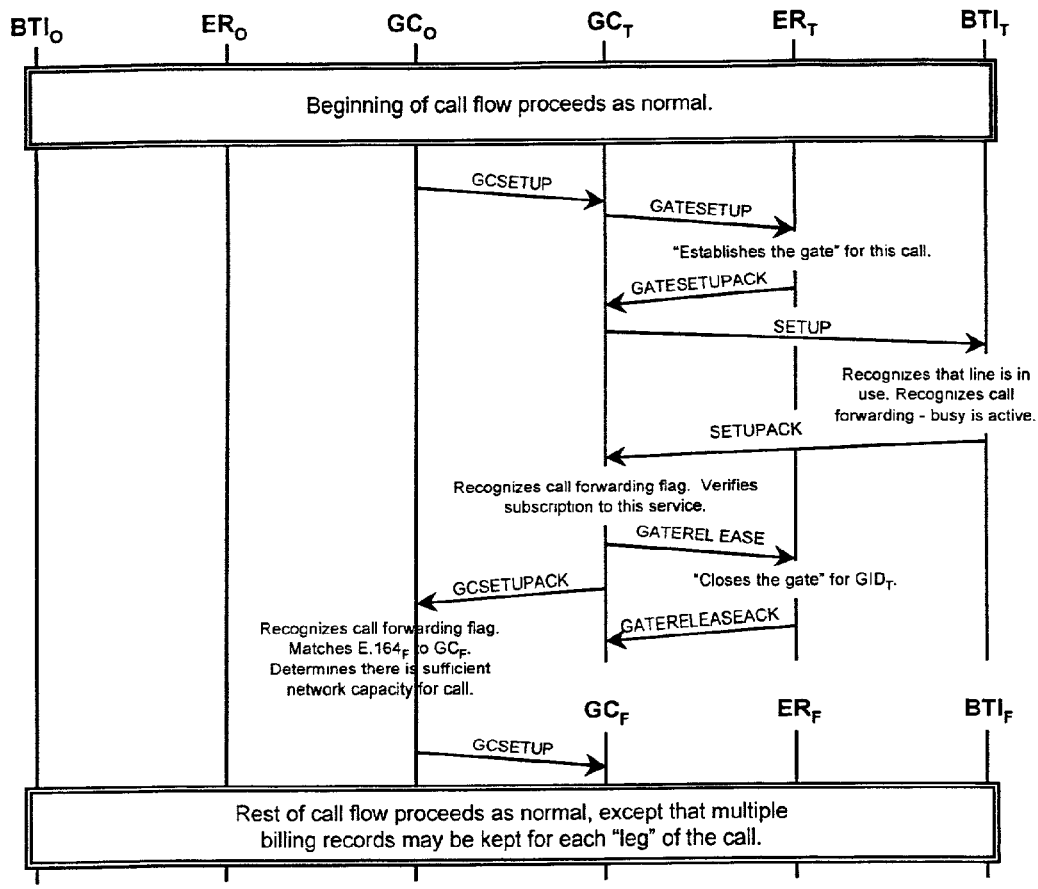
FIG. 19 shows the call flow for Call Forwarding—Busy when $BTI_T$ is available, according to an embodiment of the present invention.

FIG. 19 shows the call flow for Call Forwarding—Busy when $BTI_T$ is available, according to an embodiment of the present invention. The first part of the call flow is the same as shown in FIG. 6: Connect Call Flow. When the SETUP message is received by $BTI_T$, it recognizes that the designated line is currently off-hook and that Call Forwarding—Busy is active. It sends a special SETUPACK to $GC_T$ indicating that Call Forwarding is active. $GC_T$ recognizes the Call Forwarding response. The rest of the call flow is identical to FIG. 17: Call Forwarding—All Calls/BTI Available.

Figure 20:
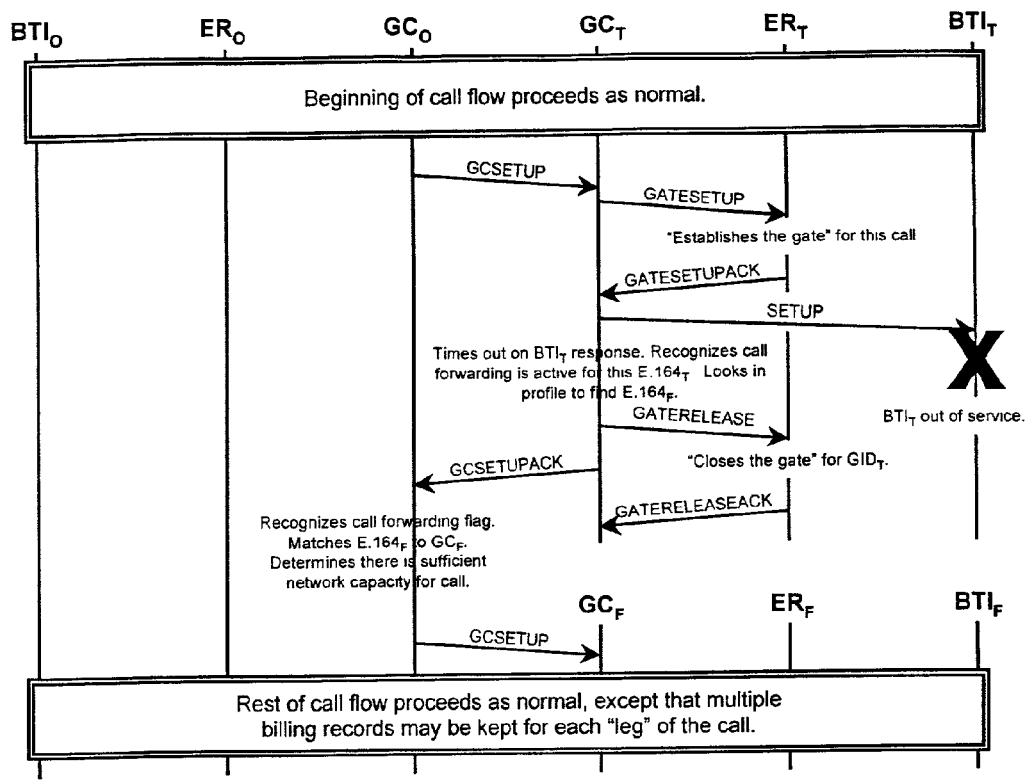
FIG. 20 shows the call flow for Call Forwarding—Busy when the BTI is unavailable, according to an embodiment of the present invention.

FIG. 20 shows the call flow for Call Forwarding—Busy when the BTI is unavailable, according to an embodiment of the present invention. This flow is identical to FIG. 18: Call Forwarding—All Calls/BTI Unavailable Call Flow.

11.3.1.3 Call Forwarding—No Answer

Figure 21:
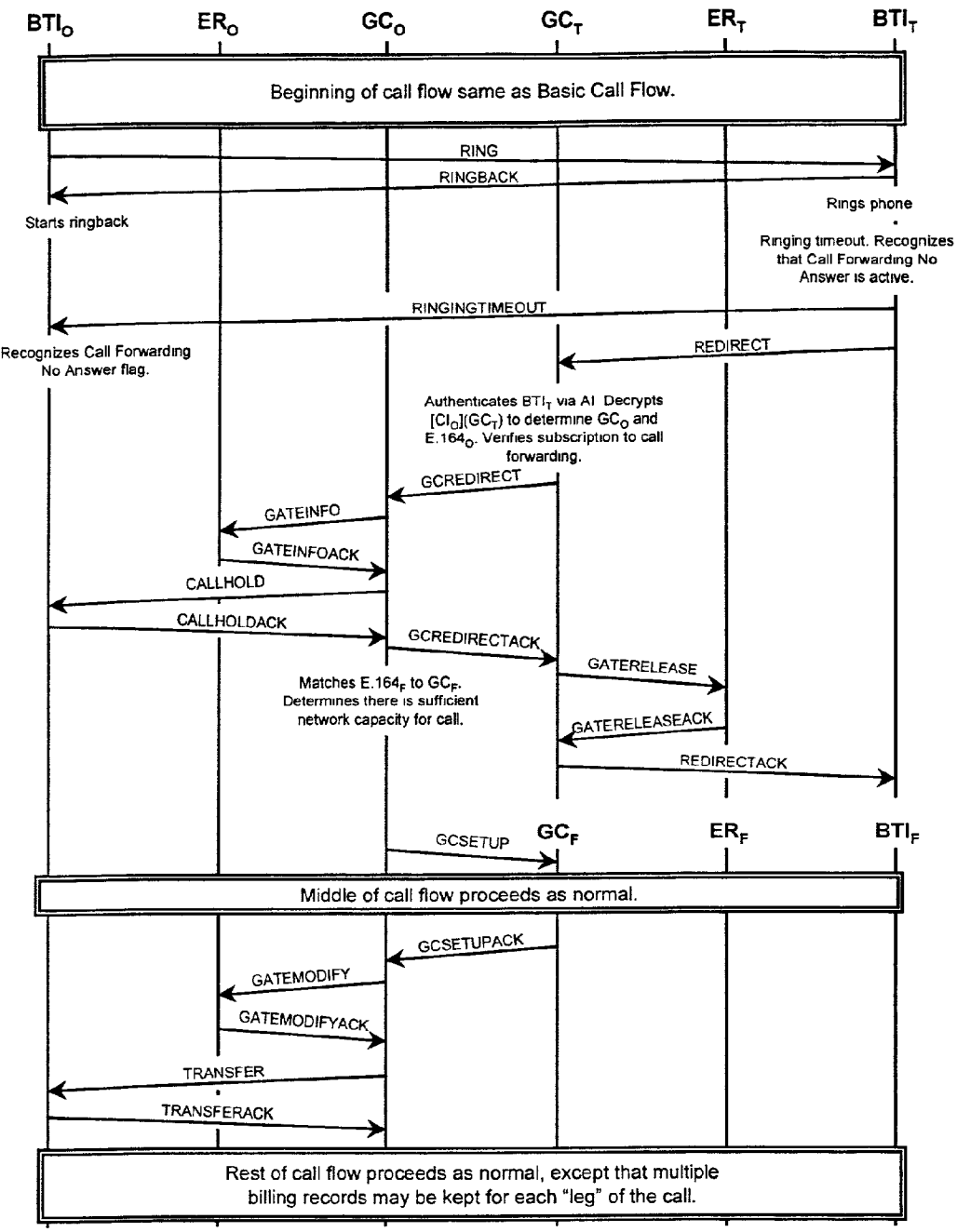
FIG. 21 shows the call flow for Call Forwarding—No Answer when $BTI_T$ is available, according to an embodiment of the present invention.

FIG. 21 shows the call flow for Call Forwarding—No Answer when $BTI_T$ is available, according to an embodiment of the present invention. The first part of the call flow is the same as shown in FIG. 6: Connect Call Flow. $BTI_T$ recognizes the Call Forward-No Answer feature is active and times out after the correct number of rings. A RING-TIMEOUT message is sent to the originator to stop the ringback, and a REDIRECT message is sent to the $GC_T$ to start the forwarding operation. The REDIRECT message contains the new $E.164_F$ address.

$GC_T$ decrypts the call information, and retrieves the billing information for this subscriber. If the call forwarding or transfer feature is subscribed it passes the GCREDIRECT message back to the $GC_O$ with the appropriate billing information.

The REDIRECT messages serves two purposes, this call forwarding function and also a blind transfer function (transfer without consultation). Since the Gate Controller does not know which application is active, it must assume a data transfer is in progress and inform $BTI_O$ that it will be interrupted. This is done via the CALLHOLD/CALLHOLDACK exchange. If $BTI_O$ was in a talking state, $BTI_O$ tells $ER_O$ to temporarily suspend its resource reservation; then acknowledges the CALLHOLD command of the $GC_O$. $GC_T$ then acknowledges to $BTI_T$ that the REDIRECT was successful.

At this point, the $GC_O$ treats this call identically to the initial call, by translating $E.164_F$ into a Gate Controller address and passing a GCSETUP message to $GC_F$. The actions of $GC_F$, $ER_F$, and $BTI_F$ are identical to those shown in FIG. 6 for $GC_T$, $ER_T$, and $BTI_T$.

When $GC_O$ receives the acknowledgment to its GCSETUP message, instead of performing a GATESETUP it modifies the settings of the already allocated gate via a GATEMODIFY command. When complete, the new destination information is passed to the $BTI_O$ via a TRANSFER message. GATEMODIFY and TRANSFER are identical to the messages used for 3-way calling and for call transfer.

After resources are reserved for this call, $BTI_O$ sends a RING command, and the response is either RINGBACK (if the new destination is on hook and now ringing) or CONNECT (if the new destination is ready now). The latter would typically be the case within interactive voice response systems. After the CONNECT message, the resources are committed and the communication path is opened.

Figure 22:
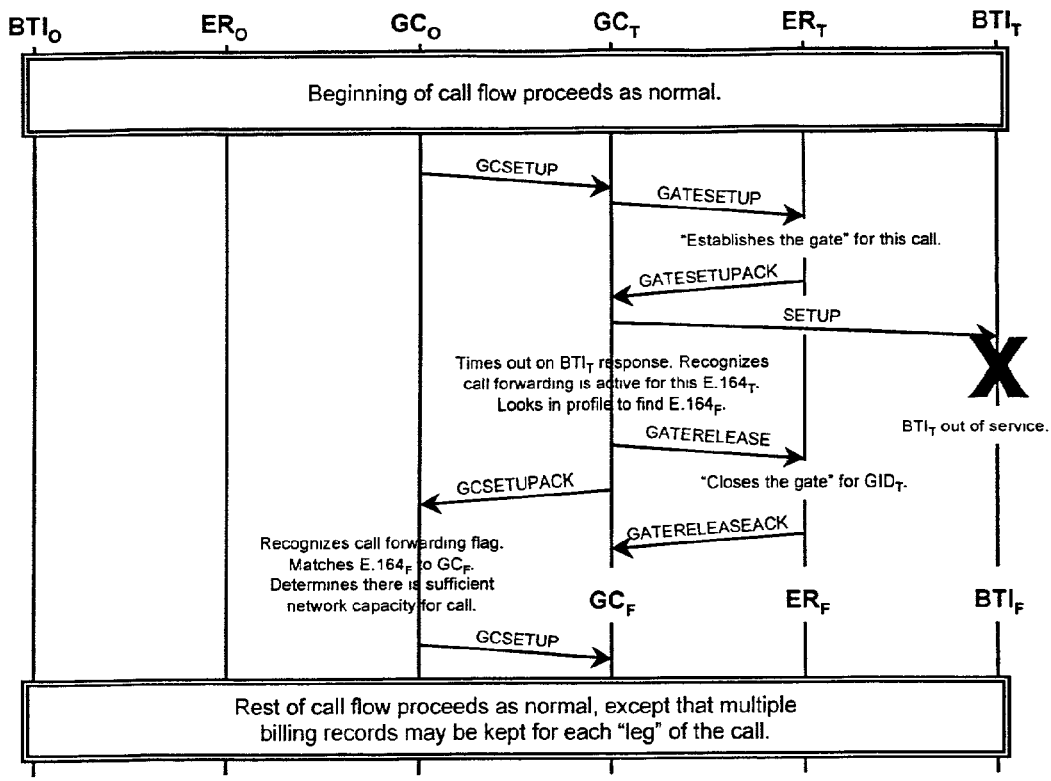
FIG. 22 shows the call flow for Call Forwarding—No Answer when the BTI is unavailable, according to an embodiment of the present invention.

FIG. 22 shows the call flow for Call Forwarding—No Answer when the BTI is unavailable, according to an embodiment of the present invention. This flow is identical to FIG. 18: Call Forwarding—All Calls/BTI Unavailable Call Flow.

11.3.2 Caller ID/Calling Name Delivery

The following describes two alternatives for implementing Caller ID/Calling Name Delivery with embodiments of the present invention.

Figure 23:
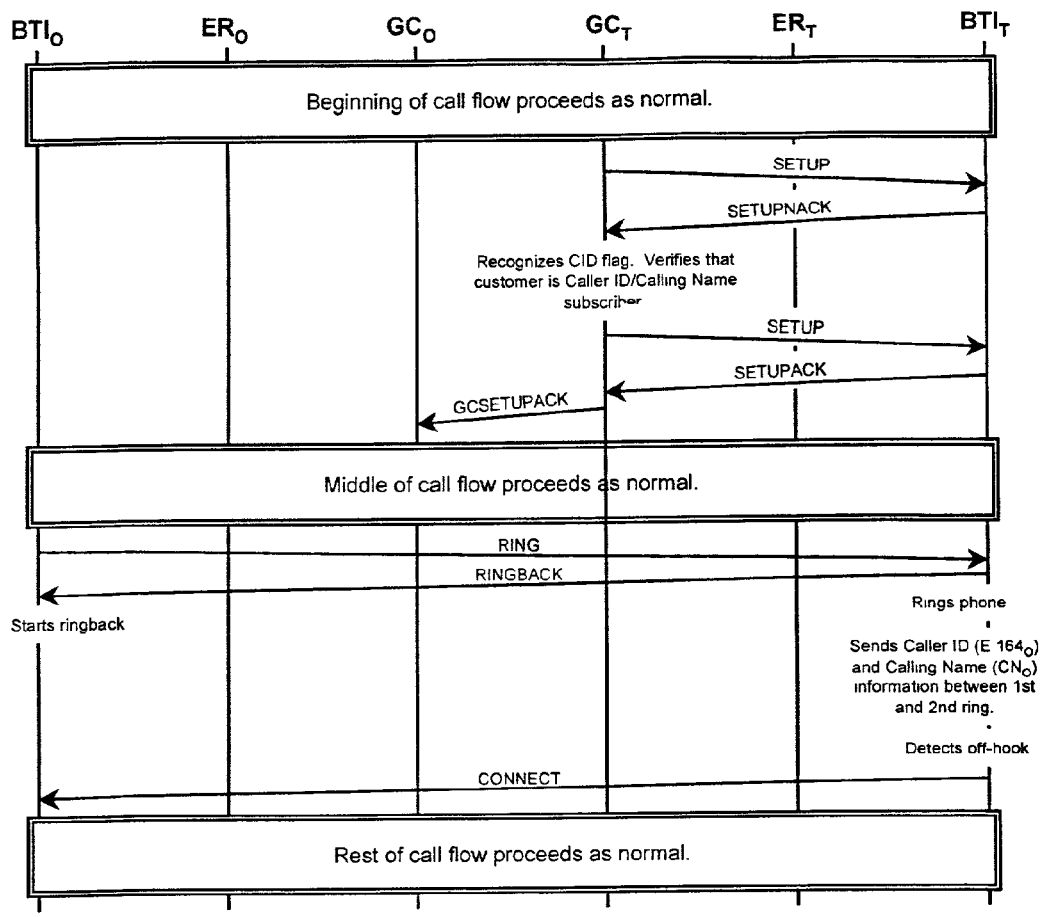
FIG. 23 shows the call flow for Caller ID/Calling Name Delivery Call Flow, according to an embodiment of the present invention.

The first is to have $BTI_T$ request caller ID information upon receipt of the SETUP from the $GC_T$. This request is sent to $GC_T$, which recognizes the Caller ID flag and checks if the customer line has subscribed for Caller ID/Calling Name services. $GC_T$ returns the phone number ($E.164_O$) and the Calling Name ($CN_O$) of the call originator. Subsequently, $BTI_T$ returns a SETUPACK as usual. If the subscriber at $BTI_T$ subscribes to services such as Anonymous Call Rejection or Call Screening, then the SETUPACK may not be returned by $BTI_T$. Finally, when $BTI_T$ rings the phone (assuming it is a simple "black phone" with the traditional Caller ID box), then the Caller ID and Calling Name are presented to the Caller ID box between the $1^{st}$ and $2^{nd}$ ring. If the user's telephone is more intelligent, this information may be presented as a message that is interpreted and displayed. FIG. 23 shows the call flow for this alternative.

1. Another alternative for implementing Caller ID/Calling Name Delivery is to have $GC_T$ check if $BTI_T$ subscribes to the service on receipt of every call. If so, the caller's phone number ($E.164_O$) and the Calling name ($CN_O$) are sent in the SETUP message to $BTI_T$ on every incoming call. The BTI can either accept (SETUPACK) or reject (SETUPNACK) the call based upon $E.164_O$ and $CN_O$. This alternative does not require additional messaging between $GC_T$ and $BTI_T$ for achieving Caller ID/Calling Name Delivery services.

11.3.3 Call Waiting

Figure 24:
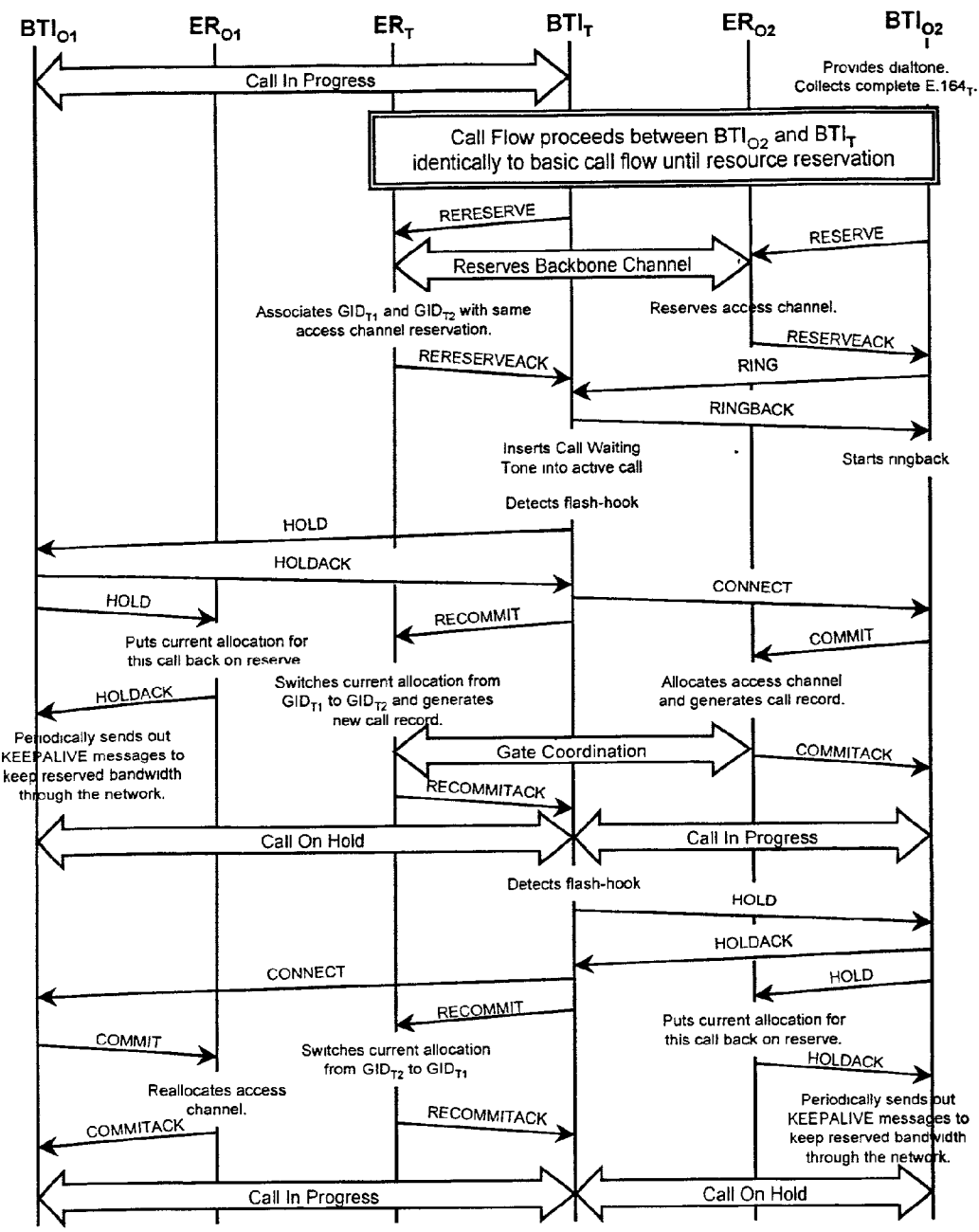
FIG. 24 shows a call flow for Call Waiting, according to an embodiment of the present invention.

FIG. 24 shows a call flow for Call Waiting, according to an embodiment of the present invention. Initially, there is a call in progress between the BTIO, and $BTI_T$. A second call from $BTI_{O2}$ to $BTI_T$ is established up to the point of reserving access and backbone bandwidth. $BTI_{O2}$ reserves the channel as normal, but $BTI_T$ uses a RERESERVE message to indicate that it does not need a new access reservation, but just needs to associate the new gate ($GID_{T2}$) in the ER with the existing access reservation for gate ($GID_{T1}$). "RING" and "RINGBACK" messages are exchanged between the new $BTI_{O2}$ and $BTI_T$. $BTI_T$ now inserts a "call waiting tone" into the original call in progress to indicate to the user that there is a second incoming call. When the user does a "flash-hook", then $BTI_T$ sends a HOLD message to $BTI_{O1}$ and receives an acknowledgment for this message. Subsequently, $BTI_T$ completes the call to $BTI_{O2}$ by sending a CONNECT message. Instead of having another allocation of resources for $BTI_T$ for this new call, embodiments of the present invention reallocate existing resources. The $BTI_T$ sends a RECOMMIT message with the Gate IDs of the two calls ($GID_{T1}$ and $GID_{T2}$) so that $ER_T$ may reallocate the resources from the first to the second call. In addition, a new CALLSTART event is sent to the billing server. When $BTI_{O1}$ gets the HOLD message, it requests $ER_{O1}$ to suspend allocation of its resources on the MCNS channel using the HOLD message until a future COMMIT message is sent from $BTI_{O1}$. $BTI_{O1}$ sends periodic KEEPALIVE message both to $ER_{O1}$ and $BTI_T$ to ensure that the bandwidth is not reallocated to other calls.

11.3.4 Three-Way Calling 11.3.4.1 Three-Way Calling—Bridging in BTI

Figure 25:
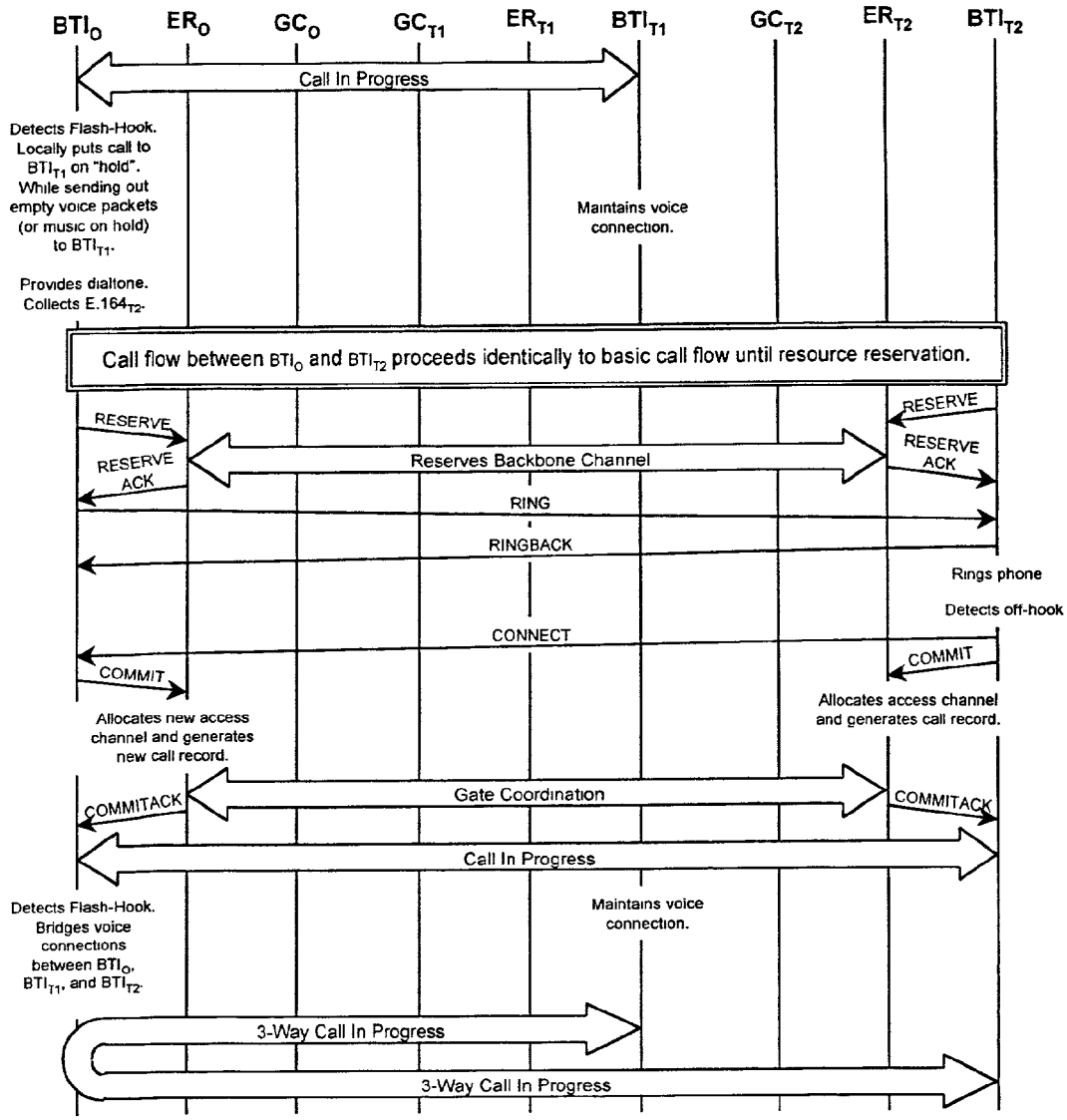
FIG. 25 shows the call flow for the simple Three-Way Calling alternative with bridging in $BTI_O$, according to an embodiment of the present invention.

FIG. 25 shows the call flow for the simple Three-Way Calling alternative with bridging in $BTI_O$, according to an embodiment of the present invention. In the flow, a second call is set up as a totally new call using separate resources in $BTI_O$, the access network, and the backbone network. When the customer wants to complete the three-way call (indicated by the second flash-hook), $BTI_O$ bridges the calls together.

11.3.4.2 Three-Way Calling—Bridging in Network

Figure 26:
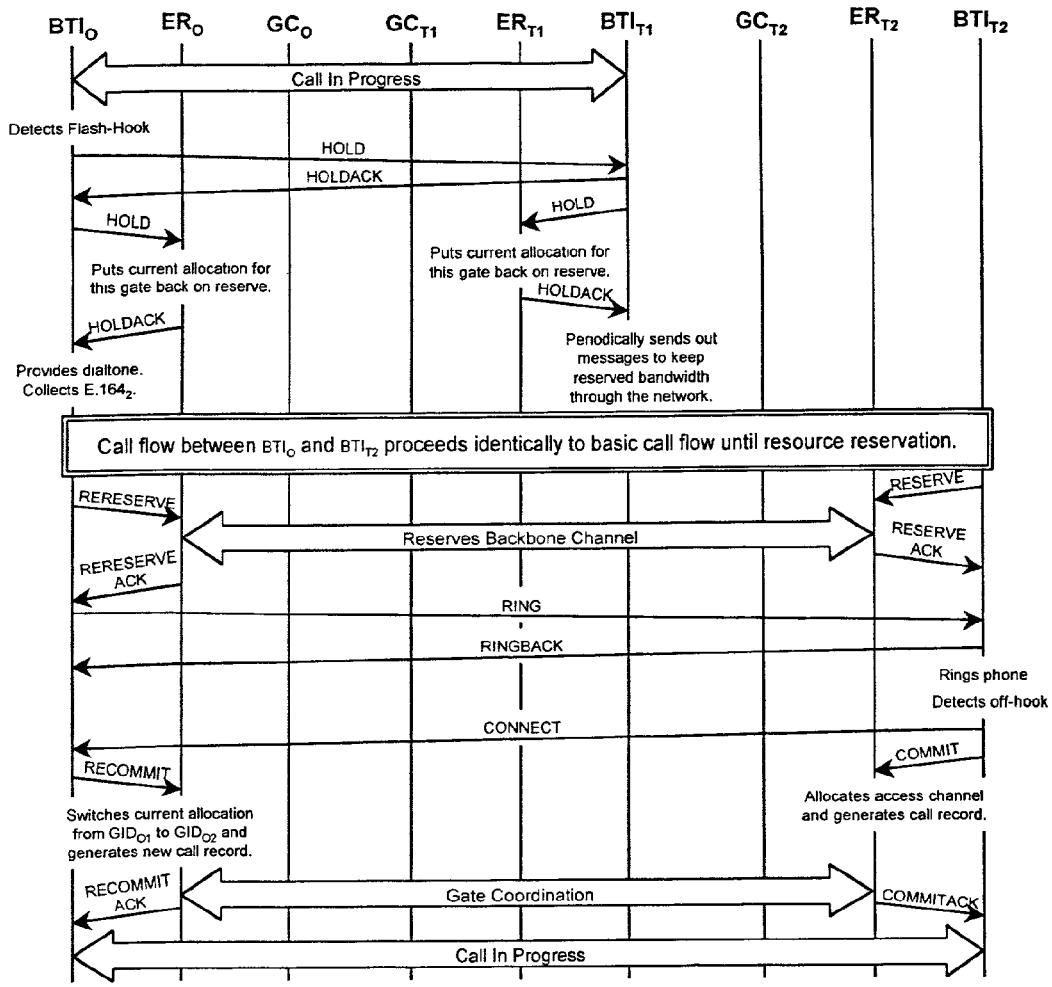
FIG. 26 illustrates the first steps of a three-way call, according to an embodiment of the present invention.

This section describes the use of a bridge located on a server inside the network. FIG. 26 illustrates the first steps of a three-way call, according to an embodiment of the present invention. The customer starts with an existing call, either one he or she placed or one that he or she received. By flashing the switchhook, that call is placed on hold. A HOLD message is sent to the destination indicating this change, and HOLDACK is sent in response. Both ends then inform their ERs that the isochronous transmission will be temporarily halted, but to keep the committed resources, via the HOLD message to the ER. Periodic KEEPALIVE messages are sent to each end and the ERs to accomplish this.

$BTI_O$ then plays the originator dialtone, and receives the full E.164 address of the additional party to call. This new call proceeds as shown in FIG. 6 for normal call setup. At the point of the resource reservation exchange, $ER_O$ has allocated two gates (the original one with the parameters of the first call, and the new one with parameters for this call), upstream access resources are reserved for one call, and the backbone has reserved resources for both of the calls. When the third party answers, the second call is established using the resources reserved for $GID_{O2}$. This state is identical to that of call-waiting, when one call is on hold and the subscriber is talking on a second call. Because the subscriber initiated the second call, however, instead of receiving that call, the later hookflash commands a three-way call instead of a switch back to the first conversation.

Figure 27:
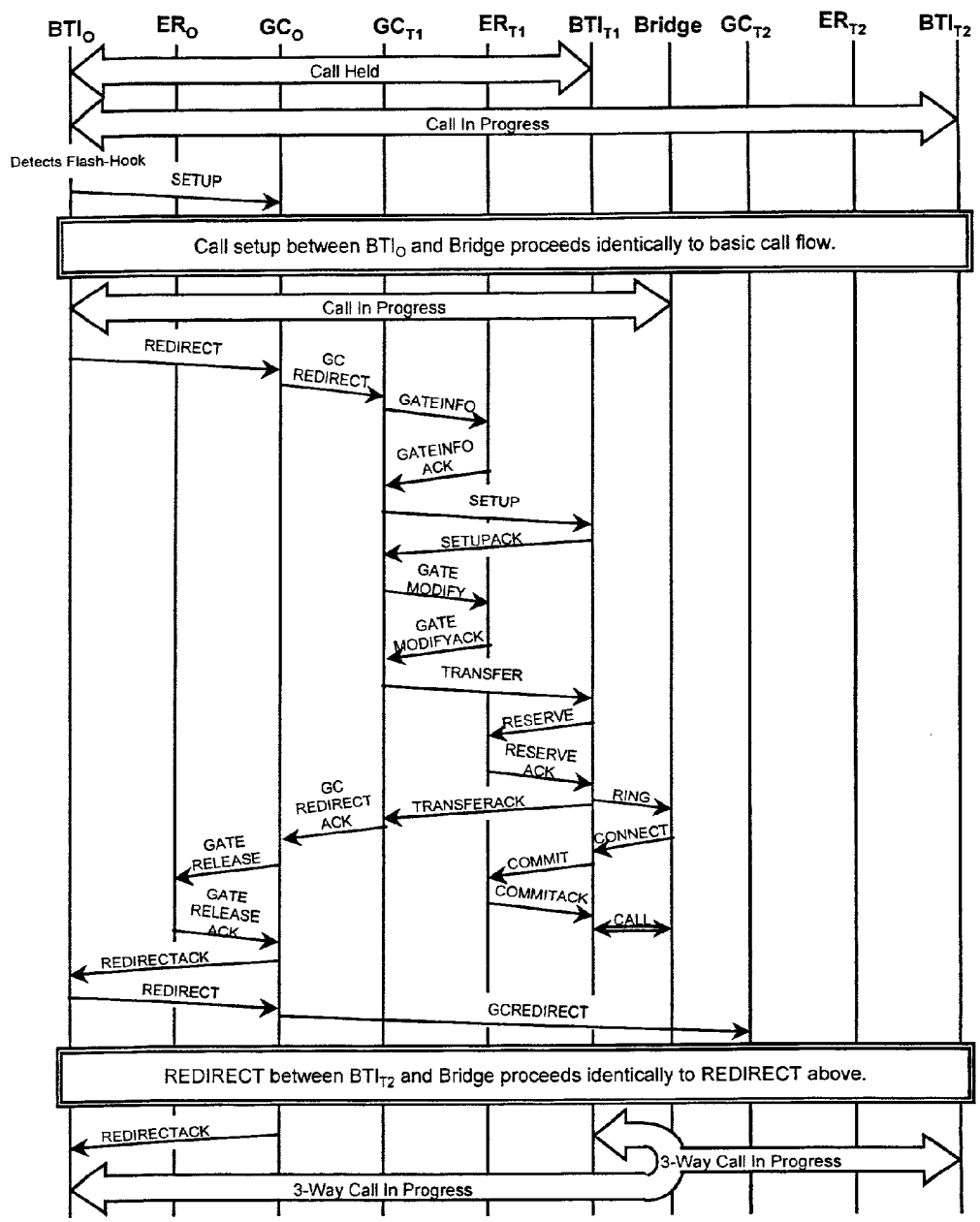
FIG. 27 shows the sequence of signaling messages exchanged in the conversion of two separate calls into one three-way call, according to an embodiment of the present invention.

FIG. 27 shows the sequence of signaling messages exchanged in the conversion of two separate calls into one three-way call, according to an embodiment of the present invention. $BTI_O$ allocates a conference bridge by creating a third connection to a special network server. The bridge server will take an arbitrary number of input streams and generate an output stream for each; each output is the sum of all inputs except for the contribution from the corresponding input. When the number of inputs exceeds a small number (e.g. 3), the bridge does silence detection on each input to reduce the accumulated noise.

Once the host establishes the connection to the bridge, each of the participants of the three-way call need to be informed of the new destination, and need to have their gates modified appropriately. This function is identical to that done for Call Forwarding with No Answer, and involves $BTI_Q$ sending a REDIRECT message for each existing connection.

The REDIRECT function involves two steps. First is a GATEMODIFY message to the ER modifying the parameters of the gate. This message includes the new destination address for data packets, as well as new billing information. Second is a TRANSFER message to the BTI, telling it to switch to a new destination for sending and receiving packets. Before acknowledging this message, the BTI performs a resource reservation exchange with the indicated endpoint (in this case, the bridge) to ensure network resources are available.

The GATEMODIFY message sent to the ER includes charging information ($). Calls from each endpoint to the bridge involve split-charging; the originator of the call pays only for the equivalent call to his/her dialed destination, and the party making the three-way call pays for the extra segment to the bridge. This is similar to that done for Call Forwarding.

The GATEMODIFY message sent to the ER also includes a Billing Identifier, BID. This unique identifier is given to all of the ERs involved in the three-way call, so that all billing records produced can be matched later. The BID used for the call is the unique ID assigned for the $BTI_O$ to Bridge connection.

The TRANSFER message sent to the BTI includes updated $CI_B$ information, encrypted by the local GC. This information replaces the previous CI information. $CI_B$ contains sufficient information to allow one of the participants in this 3-way call to add another party and allocate an additional bridge; use of this $CI_B$ for a return-call or for call-trace will result in errors.

It is possible for one of the participants in a 3-way call, who also subscribes to the 3-way calling service, to add another party. The call flow is identical to FIG. 27, except that one of the endpoints is not a BTI but rather the first Bridge. The Bridge handles TRANSFER messages in the same way as the BTI, allowing this service to cascade.

This sequence assumes the Bridge is located within the network, and does not need global address or gates to be allocated. $GC_O$ is identified as the Gate Controller serving the bridge, and there is no ER and no need for upstream scheduling of access lines. If the bridge were instead located outside of the network, then additional exchanges would be required to establish the gates and allocation of upstream bandwidth. These exchanges would be identical to those for normal call establishment.

Figure 28:
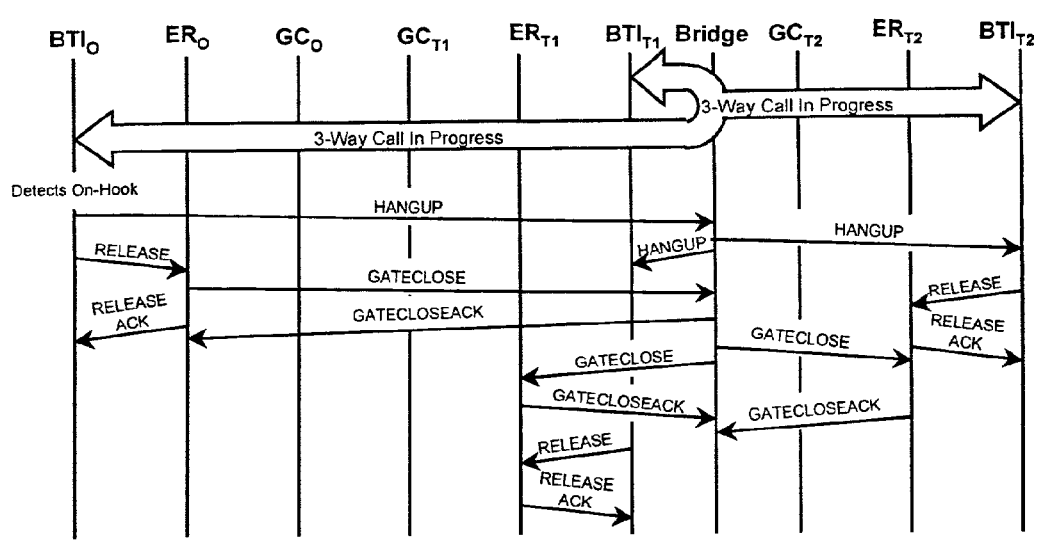
FIG. 28 shows the call flow for Three-way Calling Bridge in Network Call Flow—Hangup of Host, according to an embodiment of the present invention.

There are two separate cases for hangup sequences. If the originator of the 3-way call hangs up, it sends the RELEASE message to its local ER and a HANGUP message to the bridge. The bridge, sends HANGUP messages to the other two legs of the call and also GATECLOSE messages to their ERs. This sequence is shown in FIG. 28.

If a participant in the 3-way call disconnects, it is desired that the bridge be released and the call revert back to a normal two-party call. FIG. 20 shows the sequence of messages needed to perform this function. The Bridge receives a HANGUP message from a participant BTI, and sends a SPLICE message to its GC, giving the connection information (CI) for the two call legs to be spliced together.

The GCs inform the ERs, via a GATEMODIFY command, of the new destination of the data packets, and inform the BTIs, via a TRANSFER command, of the new destination. In case of errors, such as when the resource reservation exchange fails to allocate backbone bandwidth for the direct connection, the bridge can stay involved in the call with the two remaining parties.

11.3.5 Call Transfer

There are two different call transfer services. Call Transfer With Consultation is a service very similar to Three-Way Calling except that when the originator of the three-way call disconnects, the remaining two parties can still talk. Call Transfer Without Consultation is similar to Call Forwarding, except the forwarding can be done after a call is established.

11.3.5.1 Call Transfer With Consultation

Call Transfer With Consultation is very similar to Three-Way Calling except that when the customer (or host) hangs up the phone, the call between the two participants can continue. Also billing continues as if both legs of the call are still in place.

Figure 29:
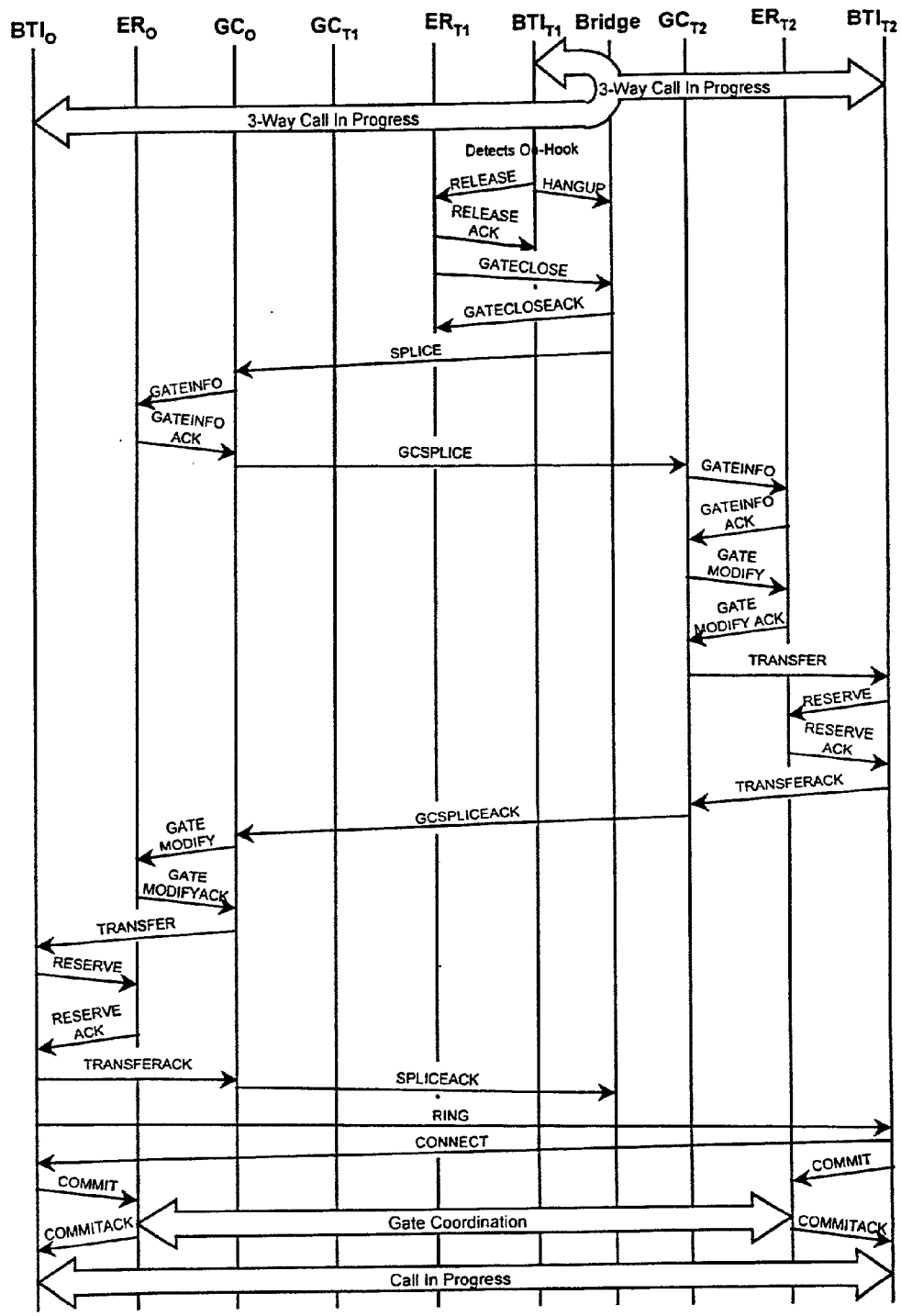
FIG. 29 shows the call flow for Three-way Calling Bridge in Network Call Flow—Hangup of Participant, according to an embodiment of the present invention.
Figure 30:
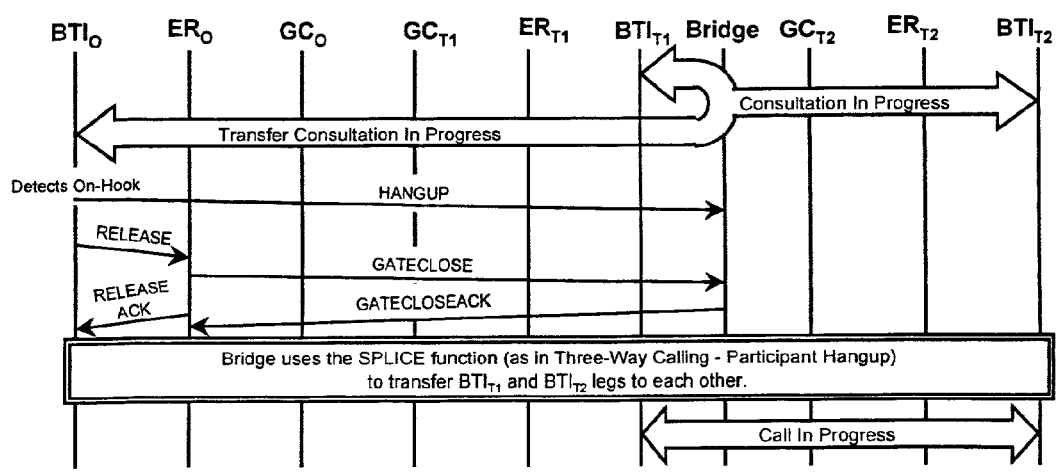
FIG. 30 shows the call flow for Call Transfer With Consultation service when the host disconnects, according to an embodiment of the present intention.

Most of the call flows for setting up a Call Transfer With Consultation are identical to those for Three-Way Calling (FIG. 26, FIG. 27, and FIG. 29). The only call flow that is different is when a host disconnects. FIG. 30 shows the call flow for Call Transfer With Consultation service when the host disconnects, according to an embodiment of the present invention. As with Three-Way Calling, the call reverts to a simple two-way call between the two participants. However, the billing for the call continues as if it is a three-way call.

For the Call Transfer With Consultation call flow, the following events have preceeded the hangup of the host:

- $BTI_{T1}$ has originated a call to $BTI_O$ and billing records ($BID_{T1/O}$) for this leg of the call are being generated by $ER_{T1}$.
- $BTI_O$ has put $BTI_{T1}$ on hold and set up a new call to $BTI_{T2}$. The billing records ($BID_{O/T2}$) for this leg of the call are being generated by $ER_O$.
- $BTI_O$ has joined the two legs of the call into a three-way call using a network bridge.

At the point when the host hangs up, the gate at the host's edge router ($ER_O$) is closed and billing associated with that gate ($BID_{O/T2}$) is terminated. $GC_O$ retrieves the information associated with this billing record (including the globally unique BID) from $ER_O$ using the GATEINFO request and transfers the billing information to one of the participant's ERs. The participant ER that receives this information ($ER_{T2}$ in the call flow), generates a new billing record for the leg associated with $BID_{O/T2}$. During bill processing, the two billing records for $BID_{O/T2}$ are associated using the unique BID so the call can be billed properly.

11.3.5.2 Call Transfer without Consultation

Figure 31:
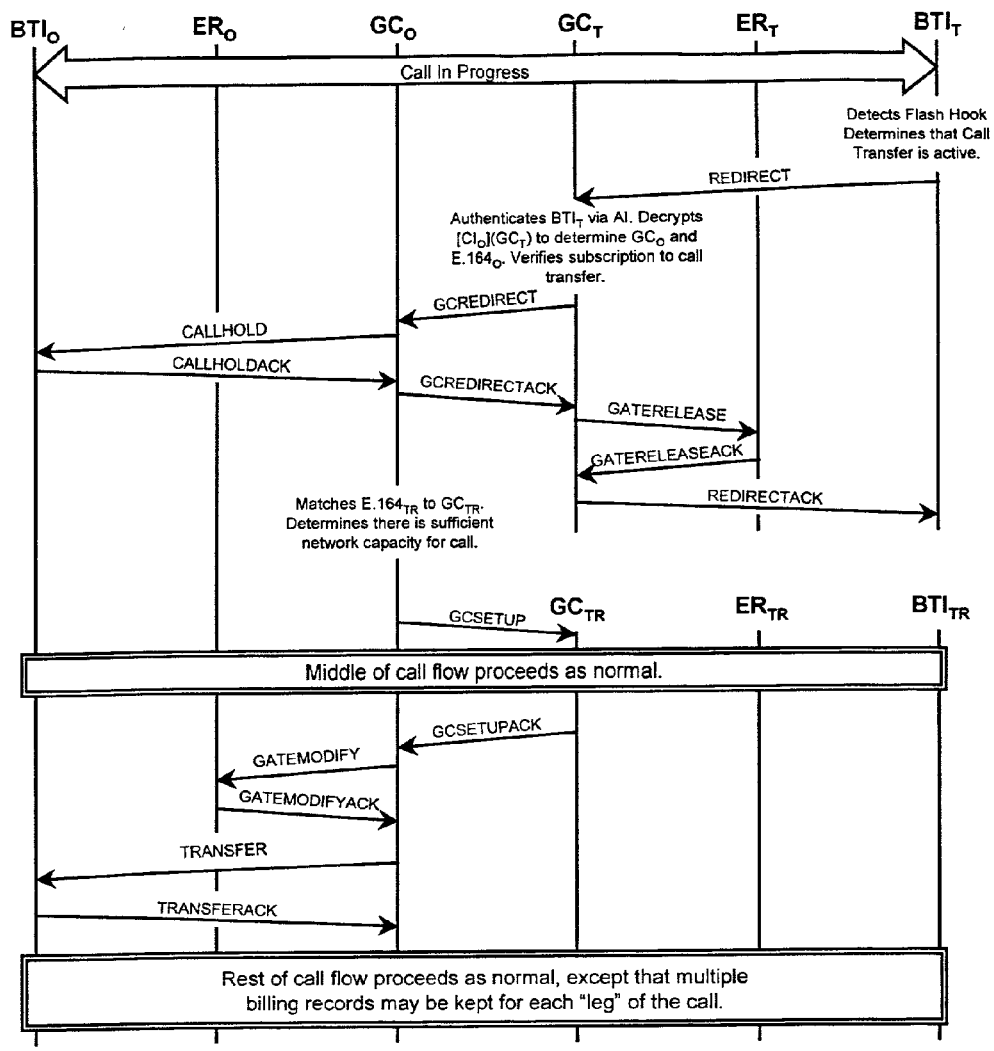
FIG. 31 shows the call flow for Call Transfer Without Consultation service, according to an embodiment of the present invention.
Figure 32:
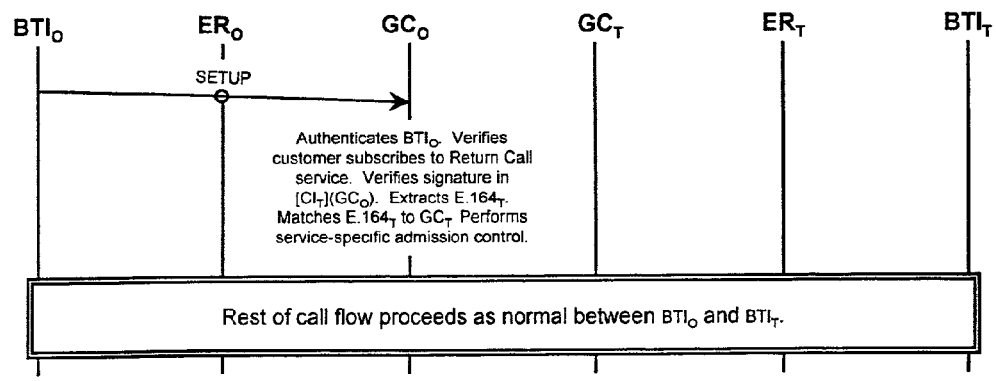
FIG. 32 shows the call flow for Return Call, according to an embodiment of the present invention.

As shown in FIG. 31, Call Transfer Without Consultation is very similar to Call Forwarding—No Answer.

11.3.6 Return Call

It is possible for $GC_O$ to implement the return call service by storing the number of the most recent incoming call (caller id) in the Gate Controller, and then returning the call on a SETUP request. However, this requires the Gate Controller to retain state associated for every telephone. It would be desirable to allow the end-system (e.g., BTI) to retain this state, simplifying the Gate Controller. Unfortunately, if the incoming call was from a subscriber that has blocked caller id, it is important to keep the caller id information private, hence it cannot be made available to the end-system.

The solution is for the GC to send the caller id information to the BTI in a digitally signed and encrypted form, with every SETUP request. When a user dials the *69 code to activate the return call service, $BTI_O$ includes the encrypted information in the SETUP request to $GC_O$. If $GC_O$ successfully decrypts and validates the information, and the customer subscribes to Return Call service, it returns the call as if processing a normal SETUP request to the number associated with the most recent incoming call.

What is claimed is:

1. A method for performing lawfully-authorized electronic surveillance, comprising:
   verifying, on a per-call basis, that a call associated with a first party is to be surveilled; and
   multicasting packets associated with the call to a second party and to a surveillance receiver,
   wherein packets associated with the call are multicast by a network edge device connecting a trusted network to an untrusted network, at least one from the group of the first party and the second party being connected to the untrusted network.

2. A method for performing lawfully-authorized electronic surveillance, comprising:
   verifying, on a per-call basis, that a call associated with a first party is to be surveilled; multicasting packets associated with the call to a second party and to a surveillance receiver, and
   sending a surveilling message to the surveillance receiver after said verifying for the call and before multicasting packets to the surveillance receiver,
   the surveilling message indicating an address of the first party and an address of the second party.

3. A method for performing lawfully-authorized electronic surveillance, comprising:
   verifying, on a per-call basis, that a call associated with a first party is to be surveilled; and
   multicasting packets associated with the call to a second party and to a surveillance receiver;
   wherein verifying for the call is performed by a gate controller associated with a network edge device that connects a trusted network to an untrusted network, at least one from the group of the first party and the second party being associated with the untrusted network.

4. A method for performing lawfully-authorized electronic surveillance, comprising:
   receiving a gate open message having an address of a surveillance receiver associated with a first party, the gate open message associated with one call between the first party and a second party; and
   multicasting packets associated with the one call to: i) the surveillance receiver based on the surveillance receiver address, and ii) at least one from the group of the first party and the second party.

5. The method of claim 4, wherein:
   the call includes a bearer channel,
   the multicasted packets are only those packets associated with the bearer channel of the call.

6. The method of claim 4, wherein the receiving and multicasting are performed by a network edge device connecting a trusted network to an untrusted network, the gate open message being received from a gate controller coupled to the network edge device.

7. The method of claim 4, wherein the received gate open message has a quality-of-service indicator.

8. The method of claim 5, further comprising:
   distinguishing the bearer channel from a data channel based on a quality-of-service indicator of the received gate open message.

9. A method for performing lawfully-authorized electronic surveillance, comprising:
   sending, from a surveillance receiver, a request for surveillance of calls associated with a first party;

receiving packets associated with a call between the first party and a second party the received packets being multicast from a network edge device to the second party and the surveillance party; and receiving a surveillance message before receiving the multicast packets from the network edge device;

the surveillance message indicating an address associated with the first party and an address associated with the second party.

10. A method for performing lawfully-authorized electronic surveillance, comprising:

sending, from a surveillance receiver, a request for surveillance of calls associated with a first party; and receiving packets associated with a call between the first party and a second party, the received packets being multicast from a network edge device to the second party and the surveillance party;

wherein the network edge device that multicast the received packets connects a trusted network to an untrusted network, at least one from the group of the first party and the second party being associated with the untrusted network.

* * * * *